US011542032B2

(12) United States Patent
Long et al.

(10) Patent No.: US 11,542,032 B2
(45) Date of Patent: Jan. 3, 2023

(54) METHOD AND TOOL FOR OPTIMIZING FUEL/ELECTRICAL ENERGY STORAGE ALLOCATION FOR HYBRID-ELECTRIC AIRCRAFT

(71) Applicant: Rolls-Royce North American Technologies Inc., Indianapolis, IN (US)

(72) Inventors: Stephen Long, Carmel, IN (US); Dwayne Bevis, Bloomington, IN (US); Sean Guitar, Indianapolis, IN (US); Michael J. Armstrong, Avon, IN (US)

(73) Assignee: ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 845 days.

(21) Appl. No.: 16/508,932

(22) Filed: Jul. 11, 2019

(65) Prior Publication Data
US 2021/0009282 A1    Jan. 14, 2021

(51) Int. Cl.
*B64D 45/00* (2006.01)
*B64D 31/00* (2006.01)
*B64D 27/24* (2006.01)
*B60L 50/50* (2019.01)
(Continued)

(52) U.S. Cl.
CPC ............. *B64D 45/00* (2013.01); *B60L 50/50* (2019.02); *B64D 27/24* (2013.01); *B64D 31/00* (2013.01); *G06Q 10/0631* (2013.01); *B64D 2027/026* (2013.01); *G06Q 10/06315* (2013.01); *Y02T 50/60* (2013.01)

(58) Field of Classification Search
CPC ........ B64D 45/00; B64D 27/24; B64D 31/00; B64D 2027/026; B60L 50/50; G06Q 10/0631; G06Q 10/06315; Y02T 50/60; Y02T 50/40
See application file for complete search history.

(56) References Cited

U.S. PATENT DOCUMENTS

| 2018/0273209 | A1* | 9/2018 | Chang | H01M 50/569 |
| 2021/0009282 | A1* | 1/2021 | Long | B60L 50/50 |
| 2022/0057451 | A1* | 2/2022 | Viswanathan | G01R 31/378 |

FOREIGN PATENT DOCUMENTS

EP    2 859 419 B1    9/2017

OTHER PUBLICATIONS

Arne Seitz et al., "Electronically Powered Propulsion: Comparison and Contrast to Gas Turbines," dated Sep. 2012, pp. 1-14, Conference 61: Deutscher Luft-und Raumfahrtkongress 2012, Berlin, Germany.

(Continued)

*Primary Examiner* — Bhavesh V Amin
(74) *Attorney, Agent, or Firm* — Crowell & Moring LLC

(57) ABSTRACT

A hybrid interchangeable battery evaluation tool (HIBET) is provided. HIBET determines an amount of electrical energy and an amount of jet fuel necessary for a hybrid electric aircraft to complete a flight based on a range of the flight, a payload of the hybrid electric aircraft, an indication of a battery mass limitation of the hybrid electric aircraft, and an optimization of an energy split between the electrical energy and the jet fuel. HIBET causes an indication of the amount of electrical energy to be displayed in a graphical user interface and/or to be otherwise outputted.

21 Claims, 39 Drawing Sheets

(51) Int. Cl.
   *G06Q 10/06*     (2012.01)
   *B64D 27/02*     (2006.01)

(56) References Cited

OTHER PUBLICATIONS

C. Pornet et al., "Methodology for Sizing and Performance Assessment of Hybrid Energy Aircraft," DOI 10.2514/62013-4415, dated Aug. 12, 2013, pp. 1-20, 2013 Aviation Technology, Integration, and Operations Conference, Los Angeles, CA, American Institute of Aeronautics and Astronautics.

* cited by examiner

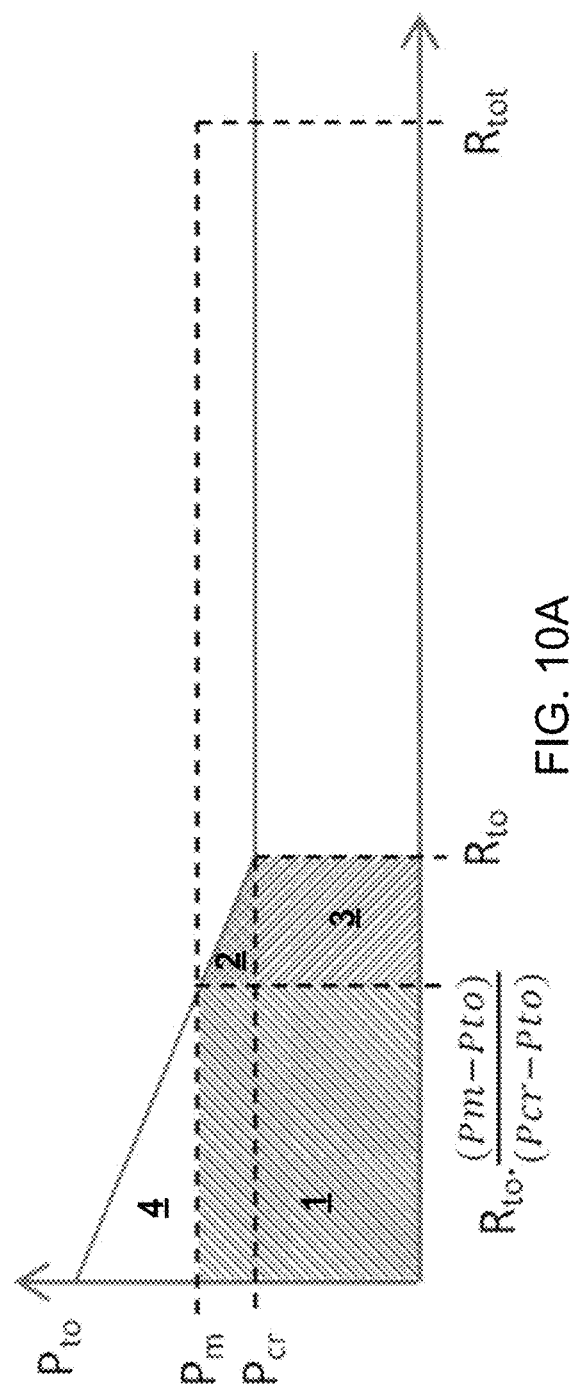
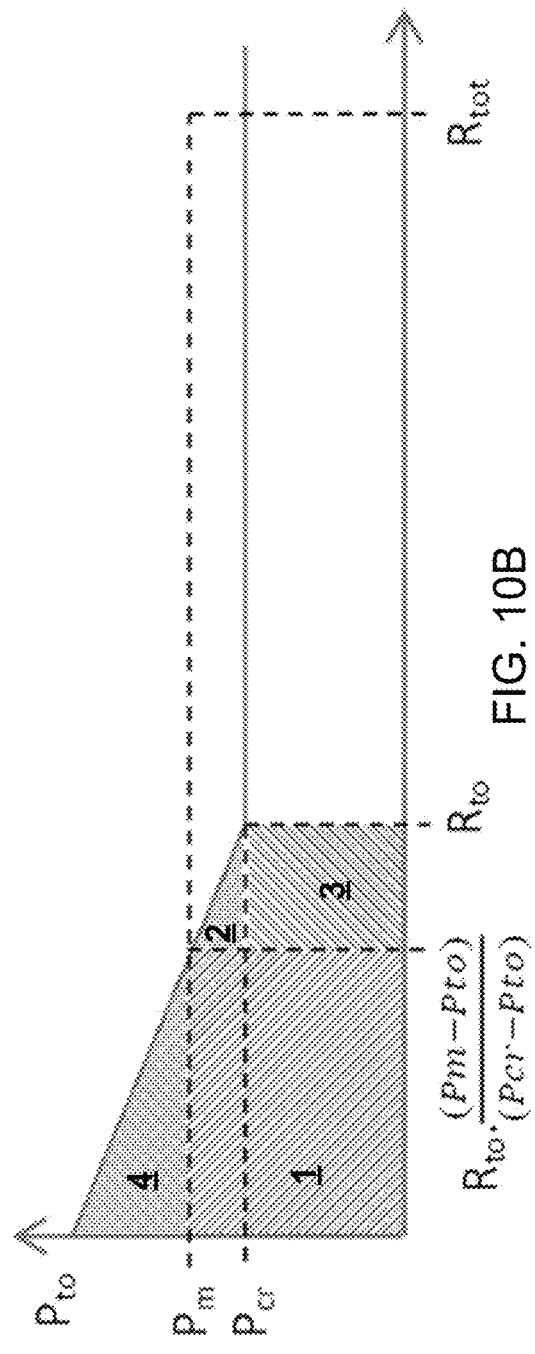
FIG. 10A
FIG. 10B

|  |  |
|---|---|
| Max Payload (lb) | 46000 |
| MTOW | 2E+05 |
| OEW | 97265 |
| % Weight Reduction with Optionally Hybrid | 75% |
| TeDP (Yes=1, No=0) | 1 |
| Maximum Battery Mass (lb) | 50000 |

| | Range (nm) | Time (min) | Thrust Power | Hybrid (Y/N) |
|---|---|---|---|---|
| Taxi-out | | 10 | 0.5 | Y |
| Takeoff | | - | 16.5 | Y |
| Climb | 180 | 30 | - | Y |
| Cruise | Varies | - | 4.875 | Y |
| Descent | 150 | 30 | 1.5 | Y |
| Taxi-in | | 10 | 0.5 | Y |

| Field | Value |
|---|---|
| Projected Year | 2040 |
| Fuel Cost Projection (1=Low, 2=Med., 3=High) | 3 |
| Regional US Grid Composition (1 = Low Renewable, 2= Med. Renewable, 3=High Renewable) | 2 |
| Battery Salvage Value | 50% |
| Operating Mode (1=MTOV, 2=Min Cost, 3=Min Fuel, 4=Min Emissions) | 2 |
| Nuclear Discount Rate | 5% |
| Grid Electricity Rate (1=Industrial Rate, 2 = Commercial Rate) | 1 |
| Battery Cost Projection (1=Low, 2=Med., 3=High) | 1 |
| Grid Energy Cost Outlook (1=Low, 2=Med, 3=High) | 1 |
| % Nuclear Power Generation | 100% |
| Carbon Tax Projection on Energy (1=low, 2=medium, 3=high) | 1 |
| Carbon Tax Projection (1=low, 2=medium, 3=high) | 1.2 |

| Payload / Max Payload | 1 | Thermal, Mechanical System, Tech Progress (1=Low, 2=Med, 3=High) | 1 | Motor Rating (MW) per Engine | 2.5 |
|---|---|---|---|---|---|
| Propulsive Efficiency | 0.7 | Machines and Drives Tech Progress (1=Low, 2=Med, 3=High) | 1 | Battery Progress (1=Low, 2=Med, 3=High) | 2 |
| Core Thermal Efficiency | 0.45 | Battery Construction - lb Carbon / lb Battery | 0 | Battery Cycle Life | 2500 |

FIG. 23

| | | | |
|---|---|---|---|
| Thrust Work Ratio Power Factor Correction | Cruise Power per Engine (MW) | % Weight Reduction with Optionally Hybrid | Takeoff Power per Engine (MW) |
| 1.05 | 4.875 | 75% | 16.5 |
| SubFleet Max Payload | SubFleet Max Range | Maximum Battery Mass (lbm) | TeDP (Yes=1, No=0) |
| 46000 | 900 | 50000 | 1 |

| $/gallon | $/kWh | Charging CO2 (lb Carbon / kWh) | Carbon Tax on Energy Emissions ($/lb) | Carbon Tax on Fuel Emissions ($/lb) |
|---|---|---|---|---|
| 5.85 | 0.07 | 0 | 0 | 0.0854 |

| Battery Cost ($/kWh) | Total Drive System Power Density (kW/kg) | Energy Density (Wh/kg) | Overall Electrical Drive Efficiency | Max Payload (lb) | MTOW (lb) |
|---|---|---|---|---|---|
| $1.35 | 6.52 | 764 | 96.26% | 45000 | 190000 |

| Range (nm) | Baseline Emissions (lb) | Fuel Cost ($) | Carbon Tax ($) | Baseline Cost ($) |
|---:|---:|---:|---:|---:|
| 0 | 6430.845003 | 1788.064822 | 543.1341633 | 2337.258985 |
| 100 | 8703.754274 | 2421.704336 | 743.813015 | 3165.517351 |
| 200 | 11059.30192 | 3075.151328 | 944.5156238 | 4019.666952 |
| 300 | 13481.28793 | 3748.4058 | 1151.301363 | 4899.707783 |
| 400 | 15973.31232 | 4441.467751 | 1364.172112 | 5805.639863 |
| 500 | 18537.77508 | 5154.33718 | 1583.125392 | 6737.463172 |
| 600 | 21172.87621 | 5887.014088 | 1808.163628 | 7695.177717 |
| 700 | 23873.21571 | 6639.498476 | 2039.285022 | 8678.783498 |
| 800 | 26656.79353 | 7411.790342 | 2276.490173 | 9688.280515 |
| 900 | 29505.60384 | 8203.883687 | 2519.77308 | 10723.65677 |
| 1000 | 32425.66446 | 9015.796511 | 2769.151745 | 11784.94826 |
| 1100 | 35416.95745 | 9847.510815 | 3024.608166 | 12872.11898 |
| 1200 | 38473.48881 | 10699.0328 | 3286.148344 | 13985.18034 |
| 1300 | 41613.25855 | 11570.36186 | 3553.77228 | 15124.13414 |
| 1400 | 44815.26665 | 12461.4366 | 3827.473372 | 16288.97857 |
| 1500 | 48094.51313 | 13372.44282 | 4107.271422 | 17479.71424 |
| 1600 | 51441.99798 | 14303.19451 | 4393.146628 | 18696.34114 |
| 1700 | 54860.72121 | 15253.75369 | 4685.105531 | 19938.85928 |
| 1800 | 58350.6828 | 16224.12035 | 4983.148311 | 21207.26866 |
| 1900 | 61911.88277 | 17214.29448 | 5287.274769 | 22501.56927 |
| 2000 | 65544.32111 | 18224.27603 | 5597.485023 | 23821.76112 |
| 2100 | 69247.99782 | 19254.06519 | 5913.773014 | 25167.8442 |
| 2200 | 73022.3129 | 20303.66176 | 6236.156762 | 26539.81852 |
| 2300 | 76868.06636 | 21373.06581 | 6564.618267 | 27937.68408 |
| 2400 | 80786.45819 | 22462.27734 | 6899.163523 | 29361.44087 |
| 2500 | 84775.08833 | 23571.29635 | 7239.792548 | 30811.08889 |
| 2600 | 88834.95686 | 24700.12283 | 7586.505324 | 32286.62816 |
| 2700 | 92966.0633 | 25848.7568 | 7939.301857 | 33788.05866 |
| 2800 | 97168.40922 | 27017.19824 | 8298.162147 | 35315.36039 |
| 2900 | 101441.9323 | 28205.44717 | 8663.146134 | 36868.59336 |
| 3000 | 105786.615 | 29413.50357 | 9034.193398 | 38447.69757 |
| 3100 | 110202.8754 | 30641.36745 | 9411.325553 | 40052.69301 |
| 3200 | 114690.1742 | 31889.03881 | 9794.540876 | 41683.57969 |
| 3300 | 119248.7114 | 33156.51765 | 10183.83395 | 43340.35761 |
| 3400 | 123878.4863 | 34443.80397 | 10579.22278 | 45023.02676 |
| 3500 | 128579.5008 | 35750.89777 | 10980.68937 | 46731.58714 |

FIG. 27

| | | | Mission | | | |
|---|---|---|---|---|---|---|
| Taxi Energy (MJ) | Climb Energy (MJ) | Cruise Energy (MJ) | Descent Energy (MJ) | Taxi Energy (MJ) | | Total Energy Reference (MJ) |
| 300 | 0 | 0 | 0 | 300 | | 600 |
| 300 | 6831.257827 | 0 | 818.1818182 | 300 | | 8249.439645 |
| 300 | 12253.03359 | 0 | 1636.363636 | 300 | | 14489.39723 |
| 300 | 16290.7302 | 0 | 2454.545455 | 300 | | 19345.33566 |
| 300 | 17548.69342 | 2430.340838 | 2700 | 300 | | 23333.03431 |
| 300 | 18023.60776 | 6211.644935 | 2700 | 300 | | 27535.25269 |
| 300 | 18511.20856 | 10132.4439 | 2700 | 300 | | 31943.65646 |
| 300 | 19011.748 | 14260.664 | 2700 | 300 | | 36572.412 |
| 300 | 19246.21312 | 18338.30209 | 2700 | 300 | | 40884.51521 |
| 300 | 19246.2131 | 22240.06848 | 2700 | 300 | | 44786.28158 |
| 300 | 19246.21309 | 26141.83486 | 2700 | 300 | | 48688.04795 |
| 300 | 19246.21308 | 30043.60123 | 2700 | 300 | | 52589.81431 |
| 300 | 19246.21308 | 33945.3676 | 2700 | 300 | | 56491.58067 |
| 300 | 16824.32052 | 33085.73085 | 2700 | 300 | | 53210.05117 |
| 300 | 16342.07777 | 36750.7683 | 2700 | 300 | | 56392.84606 |
| 300 | 17061.32695 | 40469.6934 | 2700 | 300 | | 60631.62034 |
| 300 | 17184.47397 | 44244.15832 | 2700 | 300 | | 64728.63229 |
| 300 | 17303.72486 | 48075.82064 | 2700 | 300 | | 68669.5455 |
| 300 | 17437.66561 | 51366.3432 | 2700 | 300 | | 72704.029 |
| 300 | 17568.36311 | 55317.39434 | 2700 | 300 | | 76785.75745 |
| 300 | 17701.76325 | 59330.64797 | 2700 | 300 | | 80932.41122 |
| 300 | 17837.69281 | 64007.78379 | 2700 | 300 | | 85145.6766 |
| 300 | 17976.75854 | 68150.48735 | 2700 | 300 | | 89427.24589 |
| 300 | 18118.36733 | 72360.45029 | 2700 | 300 | | 93778.81762 |
| 300 | 18262.72622 | 76639.3704 | 2700 | 300 | | 98202.09662 |
| 300 | 18409.64233 | 80989.95186 | 2700 | 300 | | 102699.7942 |
| 300 | 18559.72316 | 85410.90502 | 2700 | 300 | | 107270.6285 |
| 300 | 18712.376 | 89906.9481 | 2700 | 300 | | 111919.3241 |
| 300 | 18867.80855 | 94478.80431 | 2700 | 300 | | 116646.6129 |
| 300 | 19026.02656 | 99128.20504 | 2700 | 300 | | 121454.2306 |
| 300 | 19187.04401 | 103856.8885 | 2700 | 300 | | 126343.9325 |
| 300 | 19350.66231 | 108666.6001 | 2700 | 300 | | 131317.4631 |
| 300 | 19517.49352 | 113559.0929 | 2700 | 300 | | 136376.5864 |
| 300 | 19686.34422 | 118536.1273 | 2700 | 300 | | 141522.0715 |
| 300 | 19859.22355 | 123599.4717 | 2700 | 300 | | 146758.6952 |
| 300 | 20034.3402 | 128750.9021 | 2700 | 300 | | 152085.2423 |

FIG. 28

Max Available Hybridization

| Taxi Energy (MJ) | Climb Energy (MJ) | Cruise Energy (MJ) | Descent Energy (MJ) | Taxi Energy (MJ) | Available Hybrid Energy Reference (MJ) |
|---|---|---|---|---|---|
| 300 | 0 | 0 | 0 | 300 | 600 |
| 300 | 1363.636364 | 0 | 818.1818182 | 300 | 2781.818182 |
| 300 | 2727.272727 | 0 | 1636.363636 | 300 | 4963.636364 |
| 300 | 4090.909091 | 0 | 2454.545455 | 300 | 7145.454545 |
| 300 | 4500 | 1400 | 2700 | 300 | 9200 |
| 300 | 4500 | 3400 | 2700 | 300 | 11200 |
| 300 | 4500 | 5400 | 2700 | 300 | 13200 |
| 300 | 4500 | 7400 | 2700 | 300 | 15200 |
| 300 | 4500 | 9400 | 2700 | 300 | 17200 |
| 300 | 4500 | 11400 | 2700 | 300 | 19200 |
| 300 | 4500 | 13400 | 2700 | 300 | 21200 |
| 300 | 4500 | 15400 | 2700 | 300 | 23200 |
| 300 | 4500 | 17400 | 2700 | 300 | 25200 |
| 300 | 4500 | 19400 | 2700 | 300 | 27200 |
| 300 | 4500 | 21400 | 2700 | 300 | 29200 |
| 300 | 4500 | 23400 | 2700 | 300 | 31200 |
| 300 | 4500 | 25400 | 2700 | 300 | 33200 |
| 300 | 4500 | 27400 | 2700 | 300 | 35200 |
| 300 | 4500 | 29400 | 2700 | 300 | 37200 |
| 300 | 4500 | 31400 | 2700 | 300 | 39200 |
| 300 | 4500 | 33400 | 2700 | 300 | 41200 |
| 300 | 4500 | 35400 | 2700 | 300 | 43200 |
| 300 | 4500 | 37400 | 2700 | 300 | 45200 |
| 300 | 4500 | 39400 | 2700 | 300 | 47200 |
| 300 | 4500 | 41400 | 2700 | 300 | 49200 |
| 300 | 4500 | 43400 | 2700 | 300 | 51200 |
| 300 | 4500 | 45400 | 2700 | 300 | 53200 |
| 300 | 4500 | 47400 | 2700 | 300 | 55200 |
| 300 | 4500 | 49400 | 2700 | 300 | 57200 |
| 300 | 4500 | 51400 | 2700 | 300 | 59200 |
| 300 | 4500 | 53400 | 2700 | 300 | 61200 |
| 300 | 4500 | 55400 | 2700 | 300 | 63200 |
| 300 | 4500 | 57400 | 2700 | 300 | 65200 |
| 300 | 4500 | 59400 | 2700 | 300 | 67200 |
| 300 | 4500 | 61400 | 2700 | 300 | 69200 |
| 300 | 4500 | 63400 | 2700 | 300 | 71200 |

| Energy Mass (lb) | Total Mass (lb) | MTOW Energy Limit |
|---|---|---|
| 17693.30873 | 160958.3087 | 193.55% |
| 9687.758125 | 152952.7581 | 144.01% |
| 12602.32271 | 155867.3227 | 110.71% |
| 16506.88366 | 159771.8837 | 88.54% |
| 20333.30097 | 164198.301 | 72.74% |
| 25376.94393 | 168641.9439 | 60.92% |
| 29939.27186 | 173204.2719 | 51.76% |
| 34622.70062 | 177887.7006 | 44.45% |
| 36816.52625 | 180081.5262 | 38.50% |
| 36816.52612 | 180081.5261 | 33.55% |
| 36816.526 | 180081.526 | 29.39% |
| 36816.52587 | 180081.5259 | 25.83% |
| 36816.52574 | 180081.5257 | 22.76% |
| 14161.15632 | 157426.1563 | 21.39% |
| 15257.36505 | 158522.3651 | 18.96% |
| 16378.76093 | 159643.7609 | 16.81% |
| 17525.33972 | 160790.3397 | 14.89% |
| 18697.33731 | 161962.3373 | 13.18% |
| 19894.63328 | 163159.6333 | 11.64% |
| 21117.34434 | 164382.3443 | 10.24% |
| 22365.53332 | 165630.5333 | 8.98% |
| 23639.2602 | 166904.2602 | 7.82% |
| 24938.58869 | 168203.5887 | 6.77% |
| 26263.58325 | 169528.5833 | 5.80% |
| 27614.3097 | 170879.3097 | 4.91% |
| 28990.83522 | 172255.8352 | 4.08% |
| 30393.22837 | 173658.2284 | 3.32% |
| 31821.5531 | 175086.5531 | 2.61% |
| 33275.89874 | 176540.8987 | 1.95% |
| 34756.32004 | 178021.32 | 1.34% |
| 36262.83713 | 179527.8371 | 0.77% |
| 37795.7056 | 181060.7056 | 0.23% |
| 39354.82243 | 182619.8224 | 0.00% |
| 40940.32607 | 184205.3261 | 0.00% |
| 42552.2964 | 185817.2964 | 0.00% |
| 44190.81477 | 187455.8148 | 0.00% |

FIG. 31

| Range (nm) | Baseline Emissions (lb) | Fuel Cost ($) | Carbon Tax ($) | Baseline Cost ($) |
|---|---|---|---|---|
| 0 | 6430.645003 | 1788.064822 | 549.1941633 | 2337.258985 |
| 100 | 8703.754274 | 2421.704336 | 743.813015 | 3165.517351 |
| 200 | 11053.30132 | 3075.151028 | 944.5156238 | 4019.666352 |
| 300 | 13481.26733 | 3748.4058 | 1151.301983 | 4899.707783 |
| 400 | 15973.31232 | 4441.467751 | 1364.172112 | 5805.639863 |
| 500 | 18537.77506 | 5154.33718 | 1583.125992 | 6737.463172 |
| 600 | 21172.87621 | 5887.014088 | 1808.163628 | 7695.177717 |
| 700 | 23879.21571 | 6633.438476 | 2039.285022 | 8678.763438 |
| 800 | 26656.79359 | 7411.730342 | 2276.490173 | 9688.260515 |
| 900 | 29505.60984 | 8203.889687 | 2519.77909 | 10723.66877 |
| 1000 | 32425.66446 | 9015.736511 | 2769.151745 | 11784.94826 |
| 1100 | 35416.95745 | 9847.510815 | 3024.608166 | 12872.11898 |
| 1200 | 38479.48881 | 10633.0326 | 3286.148344 | 13985.18034 |
| 1300 | 41613.25855 | 11570.36186 | 3553.77229 | 15124.13414 |
| 1400 | 44818.26665 | 12461.4986 | 3827.473972 | 16288.97257 |
| 1500 | 48094.51313 | 13372.44282 | 4107.271422 | 17479.71424 |
| 1600 | 51441.99738 | 14303.19451 | 4333.146628 | 18636.34114 |
| 1700 | 54860.72121 | 15253.75368 | 4685.105531 | 19938.85929 |
| 1800 | 58350.6828 | 16224.12035 | 4983.148311 | 21207.26866 |
| 1900 | 61911.88277 | 17214.29448 | 5287.274783 | 22501.56927 |
| 2000 | 65544.32111 | 18224.27609 | 5597.485023 | 23821.76112 |
| 2100 | 69247.99782 | 19254.06513 | 5913.779014 | 25167.8442 |
| 2200 | 73022.9129 | 20303.66176 | 6236.156762 | 26539.81852 |
| 2300 | 76869.06636 | 21373.06581 | 6564.618267 | 27937.68408 |
| 2400 | 80786.45819 | 22462.27734 | 6899.163523 | 29361.44087 |
| 2500 | 84775.08839 | 23571.29635 | 7239.792548 | 30811.08889 |
| 2600 | 88834.95696 | 24700.12283 | 7586.505324 | 32286.62816 |
| 2700 | 92966.0639 | 25848.7568 | 7939.301857 | 33788.05866 |
| 2800 | 97168.40922 | 27017.19824 | 8298.182147 | 35315.38039 |
| 2900 | 101441.9929 | 28205.44717 | 8663.146134 | 36868.59336 |
| 3000 | 105786.815 | 29413.50357 | 9034.193996 | 38447.69757 |
| 3100 | 110202.8754 | 30641.36745 | 9411.325553 | 40052.69301 |
| 3200 | 114689.1742 | 31889.03881 | 9794.540876 | 41683.57969 |
| 3300 | 119246.7114 | 33156.51765 | 10183.83995 | 43340.35761 |
| 3400 | 123875.4869 | 34443.80337 | 10579.22278 | 45023.02676 |
| 3500 | 128575.5008 | 35750.89777 | 10980.68907 | 46731.58714 |

Single Distribution

| Fleet Usage Distribution | | Baseline Fuel | Delta Fuel |
|---|---|---|---|
| 0 | 0.00% | 2074.46613 | 2074.46613 |
| 0 | 0.00% | 2809.598153 | 762.2574378 |
| 4.37235E-05 | 1.76% | 3567.710236 | 952.8058109 |
| 4.72855E-05 | 1.63% | 4348.802553 | 1231.982672 |
| 0.000243638 | 8.71% | 5152.874342 | 1526.620371 |
| 0.00025048 | 8.36% | 5979.927445 | 1770.839259 |
| 0.000410544 | 14.68% | 6829.360068 | 1974.061039 |
| 0.000708838 | 25.35% | 7702.972811 | 2133.563149 |
| 0.000718573 | 25.70% | 8598.965674 | 2013.985539 |
| 0.000365346 | 13.03% | 9517.338657 | 1630.660536 |
| 0 | 0.00% | 10459.83176 | 1374.66527 |
| 0 | 0.00% | 11424.82438 | 1066.846069 |
| 0 | 0.00% | 12412.73833 | 768.0419559 |
| 0 | 0.00% | 13423.63179 | -737.525133 |
| 0 | 0.00% | 14457.50537 | -799.859681 |
| 0 | 0.00% | 15514.35908 | -864.401854 |
| 0 | 0.00% | 16594.1929 | -931.206823 |
| 0 | 0.00% | 17697.00684 | -1000.33107 |
| 0 | 0.00% | 18822.8009 | -1071.83237 |
| 0 | 0.00% | 19971.57503 | -1145.76985 |
| 0 | 0.00% | 21143.32939 | -1222.20393 |
| 0 | 0.00% | 22338.06381 | -1301.19639 |
| 0 | 0.00% | 23555.77836 | -1382.81034 |
| 0 | 0.00% | 24796.47302 | -1467.11023 |
| 0 | 0.00% | 26060.1478 | -1554.16189 |
| 0 | 0.00% | 27346.80271 | -1644.03251 |
| 0 | 0.00% | 28656.43773 | -1736.79064 |
| 0 | 0.00% | 29989.05287 | -1832.50623 |
| 0 | 0.00% | 31344.64813 | -1931.25061 |
| 0 | 0.00% | 32723.22352 | -2033.09652 |
| 0 | 0.00% | 34124.77902 | -2138.11811 |
| 0 | 0.00% | 35549.31464 | -2246.39035 |
| 0 | 0.00% | 36996.83039 | -2357.99204 |
| 0 | 0.00% | 38467.32625 | -2472.99962 |
| 0 | 0.00% | 39960.80223 | -2591.49417 |
| 0 | 0.00% | 41477.25834 | -2713.55644 |
| 0.002796095 | | 7535.763403 | 1893.822209 |

FIG. 34

| Single Payload Results | | |
|---|---|---|
| Average Energy Cost Delta for Single Payload | Delta in Fuel Cost per Flight for Single Payload | Delta in Energy Cost per Flight for Single Payload (New Opportunity) |
| $-13291 (-15.6%) | $-1638 (-25.2%) | $811 (12.5%) |
| Max Battery Range for Single Payload | Max Battery Mass for Single Payload | Fleet Average Emissions Delta for Single Payload |
| 800 | 3023 lb | -5889.4 lb (-25.2%) |

FIG. 35

| Fleet Averaged Results | | | | | | | | |
|---|---|---|---|---|---|---|---|---|
| | Fleet Average Fuel Cost ($) | Fleet Average Electr. Cost ($) | Fleet Average Emissions (lb) | Fleet Average Carbon Tax ($) | Total Energy Cost ($) | Fleet Average Energy Cost Reduction | Fleet Average Emissions Reduction (lb) | Charging / Battery Revenue ($) |
| Conventional | $9,072.16 | $0.00 | 19054.18 | $1,905.42 | $10,977.57 | | | |
| Hybrid | $8,553.24 | $69.96 | 12772.57 | $1,090.74 | $9,713.94 | $1,263.63 | 6281.61 | $367.96 |

FIG. 36

| Total Savings (Assuming 10M flights per year) | | |
|---|---|---|
| Estimated Fleet Total Operator Energy Cost Savings ($M) | | $12,433.45 |
| Estimated Fleet Total Charging / Battery Revenue ($M) | | $6,879.89 |

FIG. 37

METHOD AND TOOL FOR OPTIMIZING FUEL/ELECTRICAL ENERGY STORAGE ALLOCATION FOR HYBRID-ELECTRIC AIRCRAFT

TECHNICAL FIELD

This disclosure relates to aircraft and, in particular, to hybrid-electric aircraft.

BACKGROUND

A hybrid-electric aircraft may include a propulsion system that comprises one or more gas turbine engines and an electrical system configured to provide propulsion or provide electrical energy used in propulsion of the hybrid-electric aircraft. The gas turbine engine(s) burn fuel for propulsion. The electrical system may include one or more electric motors and one or more batteries.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIGS. 10A and 10B illustrates a % Energy Limit calculation for the take-off flight segment under the condition where $Pm>Pcr$;

FIG. 19 is an example of a graphical user interface generated by HIBET through which aircraft data may be entered;

FIG. 20 illustrates an example of a fuel mass map;

FIG. 21 illustrates an example table of mission distributions for the aircraft;

FIG. 22 illustrates an example of a graphical user interface to receive economic and technological variables pertaining to energy and hybrid component cost;

FIG. 23 illustrates an example of a graphical user interface configured to receive additional technological factors and general characteristics of a conventional turbine engine;

FIG. 24 shows an example of a graphical user interface configured to receive details of the aircraft hybrid-electric system;

FIG. 25 illustrates an example of a graphical user interface showing a table of economic and technological variables that pertain to energy and hybrid system component costs;

FIG. 26 illustrates an example graphical user interface displaying energy requirement calculations of the aircraft;

FIG. 27 illustrates an example of a graphical user interface displaying energy cost calculation of conventional turbine-powered aircraft based on the output table of economic and technological variables;

FIG. 28 illustrates a graphical user interface displaying the required energy calculation during each stage of the mission for a hybrid-electric aircraft;

FIG. 29 illustrates an example of a graphical user interface displaying maximum energy during each stage of the mission for a hybrid-electric aircraft;

FIG. 30 illustrates an example of a graphical user interface that displays an indication 3002 of the amount of battery to install on the hybrid-electric aircraft for each interval of a mission range;

FIG. 31 shows the total energy and mass defined for the hybrid-electric aircraft and the MTOW Limit;

FIG. 32 illustrates an example of a graphical user interface displaying the emissions and the costs associated with the conventional gas-turbine version of the aircraft;

FIG. 33 illustrates an example of a graphical user interface displaying the emissions and the costs associated with the hybrid-electric version of the aircraft;

FIG. 34 illustrates an example of a graphical user interface displaying a table for normalizing the distribution of flights of the defined airframe with the defined payload;

FIG. 35 illustrates an example of a graphical user interface displaying average per-flight fuel cost and emissions savings of the defined aircraft and payload;

FIG. 36 illustrates an example of a graphical user interface displaying fleet-averaged results of aircraft hybridization;

FIG. 37 illustrates an example of a graphical user interface displaying the total annual fleet-wide savings due to hybridizing the fleet;

DETAILED DESCRIPTION

A hybrid interchangeable battery evaluation tool (HIBET) is described herein. HIBET generates information related to sizing batteries for a hybrid-electric aircraft. Alternatively or in addition, HIBET identifies and outputs the value of hybridization of the aircraft.

As mentioned above, the hybrid-electric aircraft may include a propulsion system that comprises one or more gas turbine engines and an electrical system configured to provide propulsion or provide electrical energy used in propulsion of the hybrid-electric aircraft. The gas turbine engine(s) burn fuel for propulsion. The electrical system may include one or more electric motors and one or more batteries. The battery and/or batteries may be interchangeable, which means that the battery and/or batteries may be swapped in or out of the hybrid-electric aircraft. The number and/or size of the interchangeable battery/batteries may vary. Accordingly, determining an optimal number and/or size for a flight having a specified range and a specified payload is useful.

Figure 1:
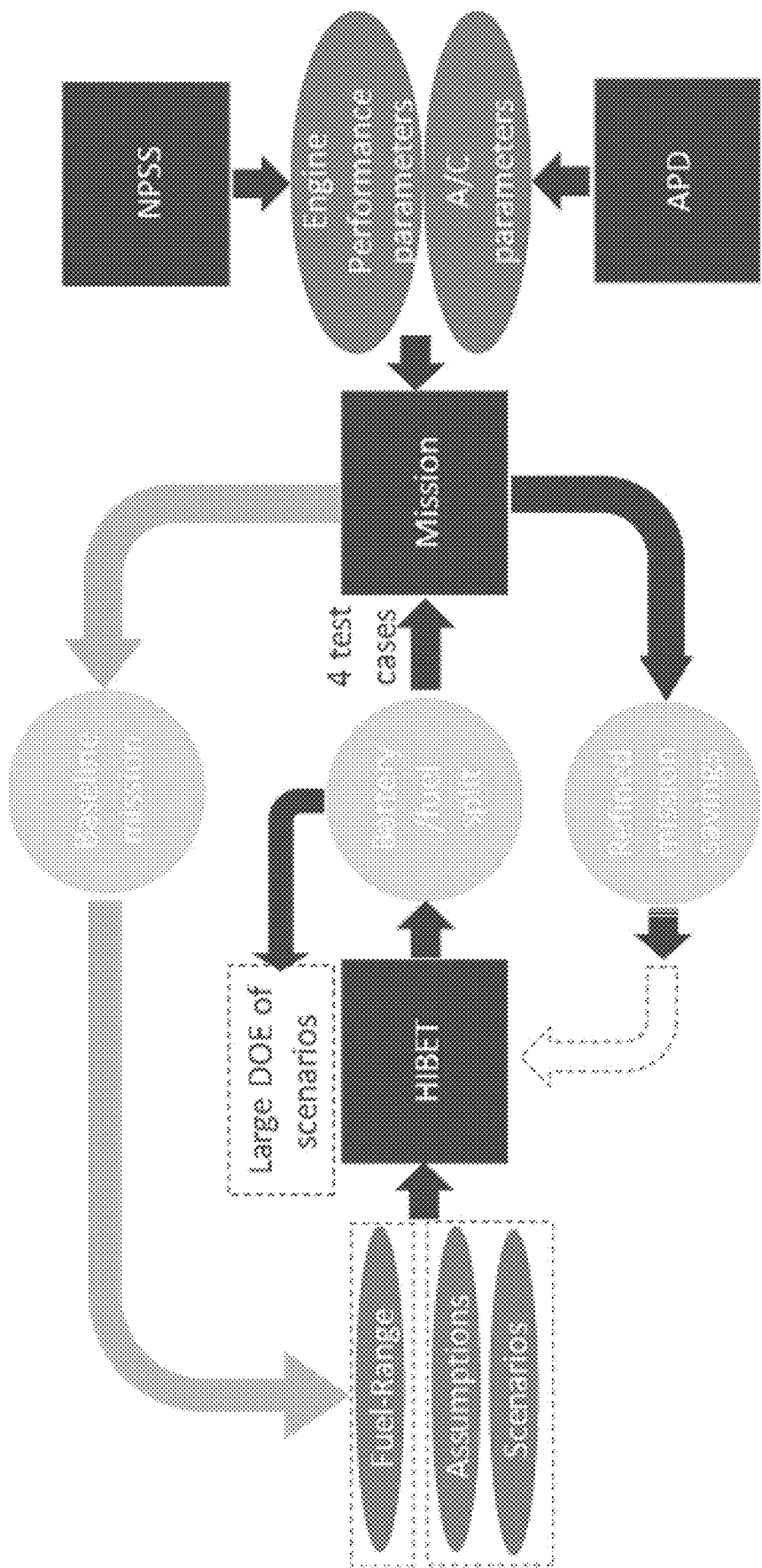
FIG. 1 illustrates an overall modelling framework for HIBET, which shows some inputs and outputs of HIBET.

Based on selected airframe parameters and other variables, HIBET optimizes an energy split between battery and fuel for flight missions ranging up to, for example, 3500 nm (nautical miles). HIBET evaluates the energy at a high level using a first principles evaluation and as such may not necessarily model the performance and weight of the gas turbine, the electrical distribution system, the thermal management system, or the physics of the electrical energy storage system. The tool may not necessarily consider the impact of changes in the propulsion system on the weight and drag of the aircraft or determine the total mission fuel and energy consumption. Such assessments may be determined, for example, using other simulation tools, such as NPSS (Numerical Propulsion System Simulation) and Pacelab ADP. FIG. 1 illustrates an overall modelling framework for HIBET, which shows some inputs and outputs of HIBET.

HIBET is implemented in a spreadsheet application in some of the following examples. In such examples, cells of the spreadsheet are occasionally identified for convenience. The identified cells may include input variables, output values, functions, and/or fields of a graphical user interface. However, as described in more detail further below, HIBET may be implemented in any type of software. In these other types of software, the cells mentioned herein may instead refer to variables, output values, functions, and/or fields of a graphical user interface for example.

In one aspect, a non-transitory computer readable storage medium comprising a plurality of computer executable instructions in provided, where the computer executable instructions executable by a processor. The computer executable instructions comprise: instructions executable to receive, prior to a flight by a hybrid electric aircraft, an indication of a limitation of battery mass for the hybrid electric aircraft; instructions executable to determine, based on the indication of the limitation of battery mass and prior to the flight, an amount of electrical energy and an amount of jet fuel necessary for the hybrid electric aircraft to complete the flight based on an optimization of an energy split between the electrical energy and the jet fuel; and instructions executable to cause an indication of the amount of electrical energy and the amount of jet fuel to be displayed in a graphical user interface and/or to be otherwise outputted.

In another aspect, a method is provided in which: an amount of electrical energy and an amount of jet fuel necessary for a hybrid electric aircraft to complete a flight is determined based on a range of the flight, a payload of the hybrid electric aircraft, an indication of a battery mass limitation of the hybrid electric aircraft, and an optimization of an energy split between the electrical energy and the jet fuel; and an indication of the amount of electrical energy is caused to be displayed in a graphical user interface and/or to be otherwise outputted.

In yet another aspect, a system is provided comprising an optimized battery works module and a graphical user interface. The optimized battery works module is configured to determine an amount of electrical energy and an amount of jet fuel necessary for a hybrid electric aircraft to complete a flight based on a range of the flight, a payload of the hybrid electric aircraft, an indication of a battery mass limitation of the hybrid electric aircraft, and an optimization of an energy split between the electrical energy and the jet fuel. The graphical user interface comprises the amount of electrical energy to be displayed.

Introduction

Figure 2:
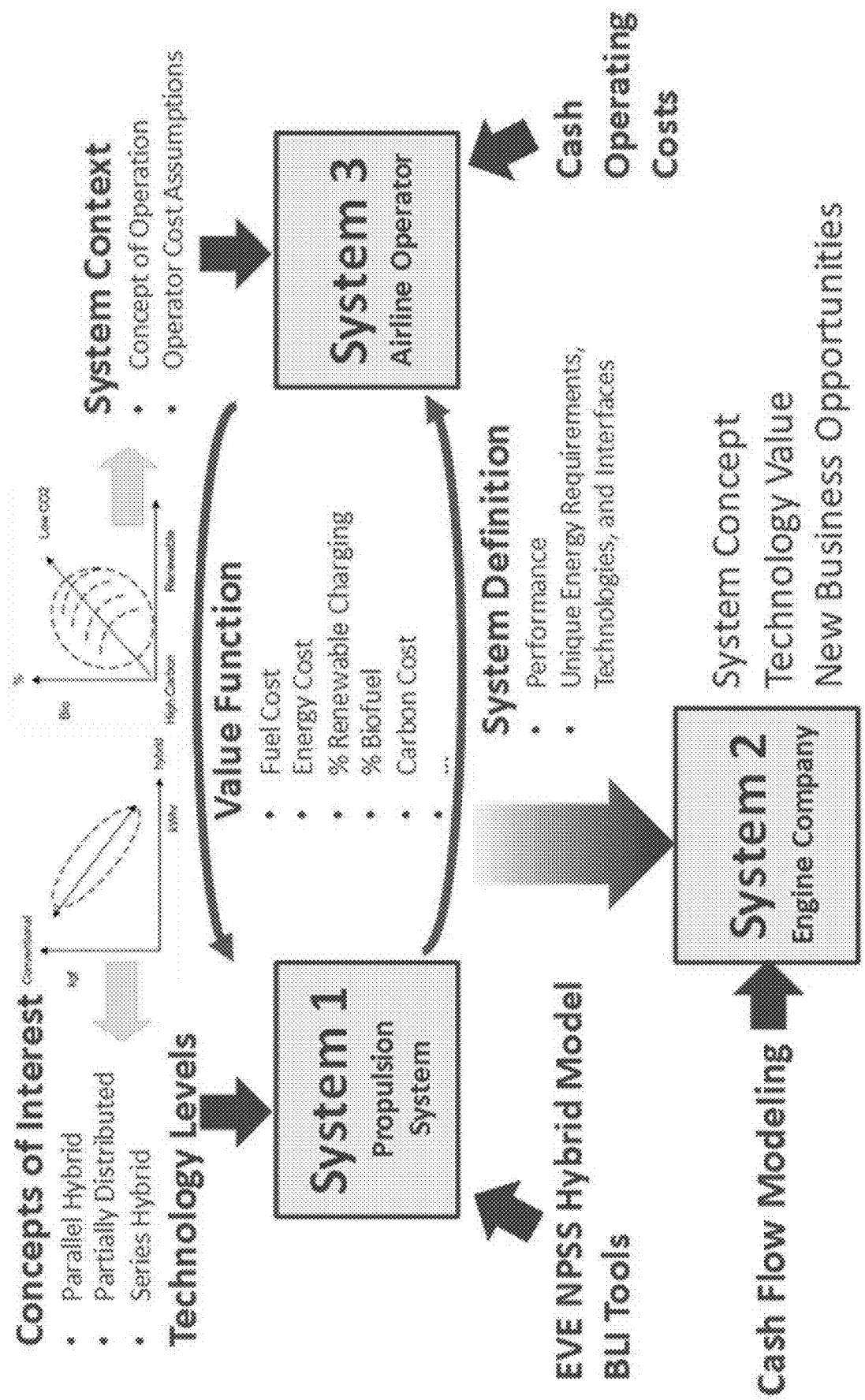
FIG. 2 illustrates three high-level systems that benefit from HIBET.

FIG. 2 illustrates three high-level systems that benefit from HIBET.

System 1 includes the aircraft carrying the passengers, and more specifically, the propulsion system of the aircraft. System 2 includes an engine manufacturer that continues to develop and/or implement engine technologies. System 3 includes airline operators who use the aircraft.

Figure 3:
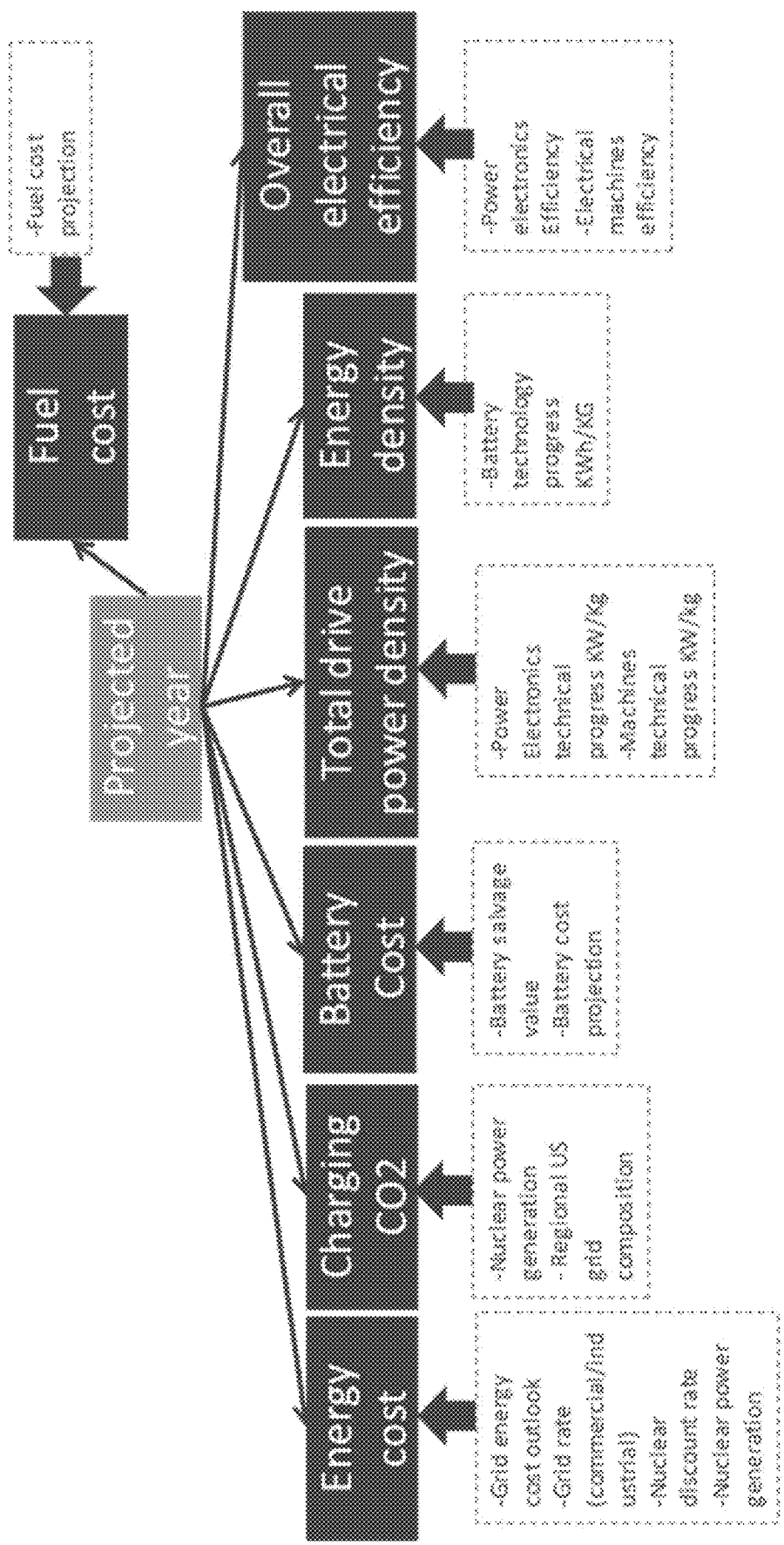
FIG. 3 illustrates examples of HIBET input assumptions on annual projections to a specified future date.

The hybrid interchangeable battery evaluation tool (HIBET) enables an assessment of hybridized aircrafts (system 1) operating in a defined world (system 3). HIBET takes a range of input parameters and input assumptions on annual projections to a specified future date, such as 2040 to calculate their impact on the value to the customer, and hence, the engine manufacturer. FIG. 3 illustrates examples of HIBET input assumptions on annual projections to a specified future date.

Figure 4:
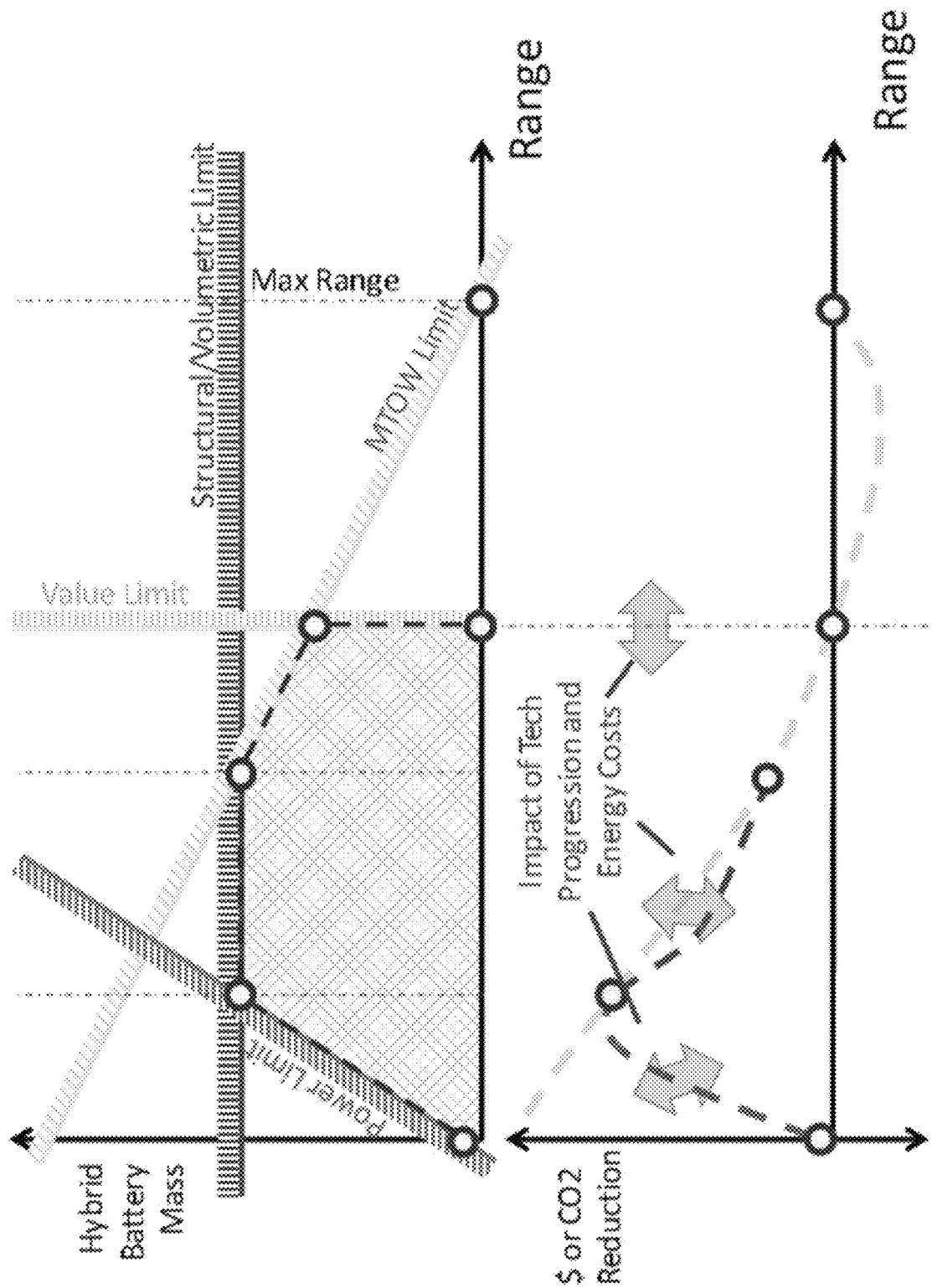
FIG. 4 illustrates physical constraints governing the split between battery and fuel and an example of an energy/cost optimization of the split.

The HIBET utilizes fundamental energy assessments to optimize the energy split between battery and fuel. The split between battery and fuel is governed by physical constraints that are defined by the aircraft architecture. FIG. 4 illustrates physical constraints governing the split between battery and fuel and an example of an energy/cost optimization of the split. Physical constraints governing the split may include: Power Limit, Structural/Volumetric Limit, MTOW Limt, and Value Limit.

Power Limit—defined by the power rating of the electrical machines. Limits the peak draw on battery energy during the flight profile. Tends to be more restrictive at take-off when the power requirement is at its highest.

Structural/Volumetric Limit—Structural: the maximum load bearing capability of the fuselage, often referred to as maximum zero fuel weight (MZFW); Volumetric: the maximum allowable space for locating energy storage.

MTOW Limit—Maximum Take-Off Weight of the aircraft based on the aerodynamic/thrust limitations of the aircraft.

Value Limit—the cost neutral point between a conventional and a hybridized aircraft above which the cost of carrying the additional weigh of the batteries exceeds energy cost savings from fuel displacement.

Hybridization

Cost and weight per MJ (megajoule) of applied (thrust) energy are two key values to assess the feasibility of hybridization at a high level. A fair comparison between a conventional and hybrid must account for the efficiency of energy extraction for useful applied work (thrust). One simple example approach to the determining cost is to assume that the conventional and hybridized aircraft are sufficiently similar in structure that any weight differences and other factors are judged to be insignificant. This demonstrates that electrical energy is cheaper than jet fuel based energy. Based on today's jet fuel and electrical energy prices, the cost per applied MJ of energy from jet fuel is approximately 1.5× more than for electricity. Electricity rates are predicted to remain largely flat into the future, yet jet fuel costs may increase significantly, whether the result of a direct rise in oil costs and or due to the introduction of an aviation emissions tax. Under such an example scenario, jet fuel applied (thrust) energy may be at 5× more than electricity in the future.

Figure 5:
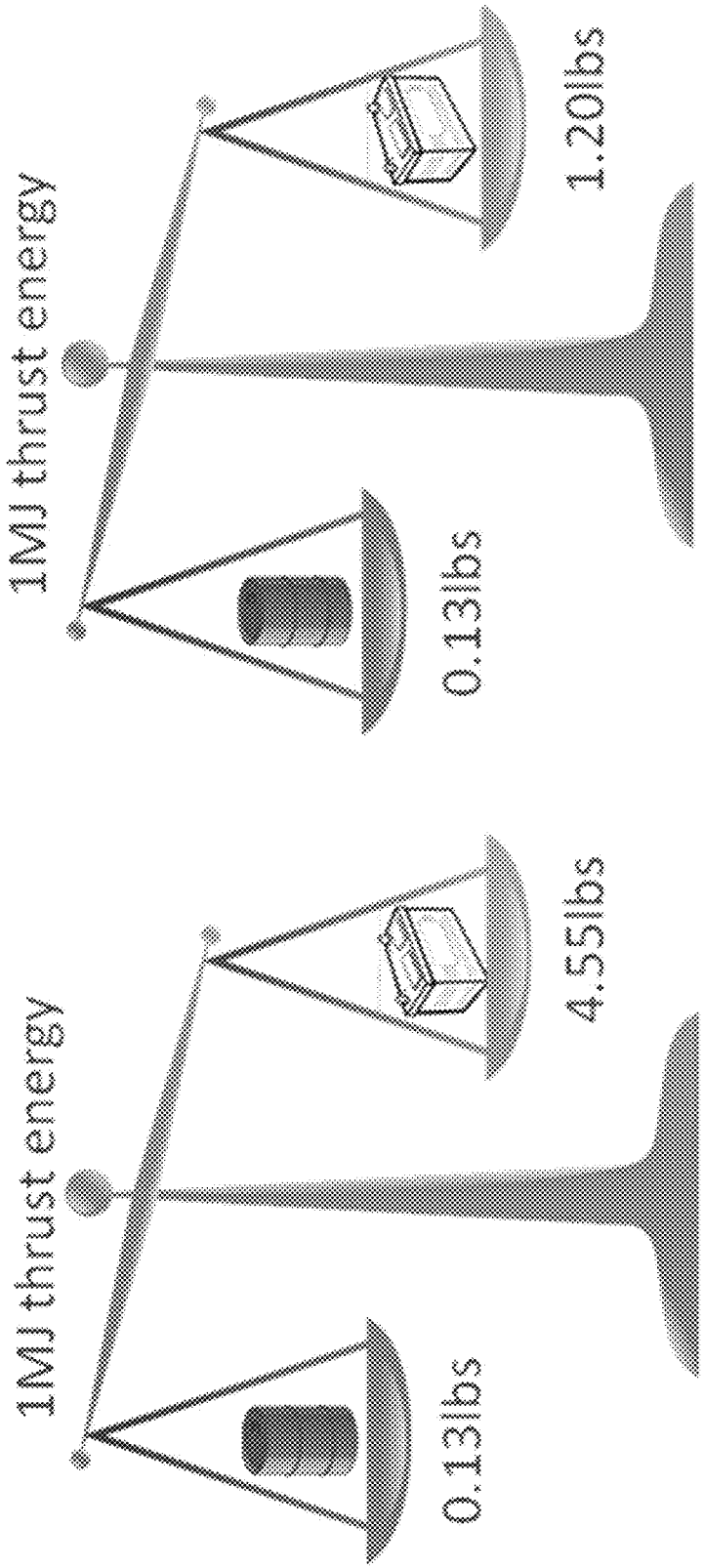
FIG. 5 illustrates a weight comparison of fuel energy and electrical energy per applied MJ of energy at two different times.

The argument for hybridization using today's technology is less favorable when viewed from a comparison of mass per MJ of applied (thrust) energy than it likely will be in the future. FIG. 5 illustrates a weight comparison of fuel energy and electrical energy per applied MJ of energy at two different times: today and in the future using hypothetical values. If the current state of the art batteries offers about 200 Wh/Kg (Watt-hours per Kilogram) for example, a hybridized aircraft would need to carry 35× more energy weight in the form of a battery per MJ of applied (thrust) energy than in the form of jet fuel. With some people estimating the projection of current lithium-ion technologies being a theoretical maximum energy density of approximately 850 Wh/Kg, this reduces to about 9× more energy weight in the form of a battery. For batteries to achieve comparable energy weight to that of applied (thrust) energy from jet fuel, new battery technologies may need to achieve energy densities of 7,764 Wh/Kg if all other factors, such as the price of jet fuel, remain unchanged.

Figure 6:
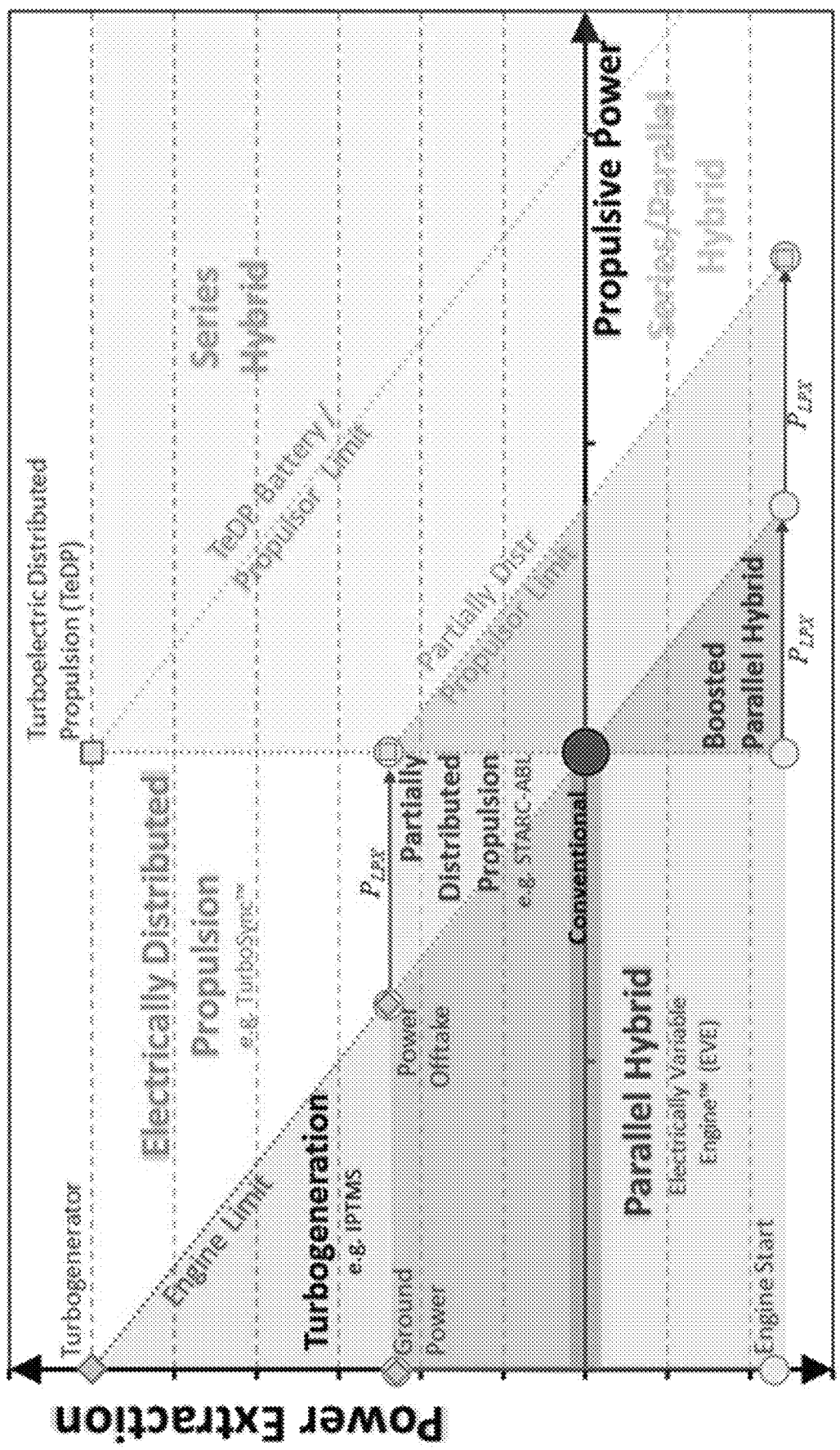
FIG. 6 illustrates a summary of a design envelope for aircraft propulsion.

FIG. 6 illustrates a summary of a design envelope for aircraft propulsion. The summary is defined in terms of propulsive power on the x-axis and power extraction on the y-axis. The relative power extraction and propulsive power for multiple types of electric hybrid propulsion systems are shown. Examples of the electric hybrid propulsion systems may include Parallel Hybrid, Boosted Parallel Hybrid, Series/Parallel Hybrid, Turbogeneration, Electrically Distributed Propulsion, Partially Distributed Propulsion, and Series Hybrid.

A hybrid interchangeable battery evaluation tool (HIBET) is described herein. Based on selected airframe parameters and assumptions, HIBET may optimize an energy split between battery and fuel for flight missions ranging up to 3500 nm (nautical miles).

HIBET Constants

Common constants and conversions embedded in the HIBET functions are shown in Table 1.

TABLE 1

Common constants and conversions

| Constant/Conversion | Function Description | Factor |
| --- | --- | --- |
| Mass | To convert from Kg to lb, Kg multiplied by factor | 2.2 |
| Energy | To convert from MJ to Wh, MJ multiplied by factor | 277.778 |
| Jet Fuel Energy content | Specific Energy Density of fuel | 43 MJ/Kg |
| Jet Fuel carbon production | The weight of carbon produced for the combustion of 1 lb of fuel is the fuel mass multiplied by factor | 3.1 |
| Jet Fuel weight per gallon | The weight of jet fuel in lbs is the number of gallons of fuel multiplied by factor | 6.79 |

Input Parameters

Airframe selection for the analysis determines the airframe dependent input variables to be used. Airframe input variables are shown in Table 2.

TABLE 2

Airframe Input Variables

| Independent input variables | Function Description | Excel column/cell |
| --- | --- | --- |
| Payload/Max Payload | Ratio of actual payload to maximum allowable payload | Cell P3 |
| Takeoff Power per Engine | MW rating of take-off power per engine | Cell P4 |
| Cruise Power per Engine | MW rating cruise power per engine | Cell P5 |
| Max Payload | Max allowable payload | Cell R7 |
| MTOW | Maximum Take-Off Weight | Cell T7 |
| Range (nm) | Flight range in segments of 100 nm | Column A |
| Fuel (lb) | Fuel required for conventional airframe for a given nm - fuel consumption derived from the aircraft model (APD and Mission software) converted to a regression based formula for range, max payload and MTOW | Column B |
| OEW (lb) | Operating Empty Weight;, or Basic Operating Weight for the conventional aircraft; the weight of the conventional aircraft, unfueled with no payload | Column C |
| Payload (lb) | Selected payload for the simulation - product of the maximum payload (Cell R7 and the ratio of Payload to Max Payload (Cell P3). Represents the weight of passengers and their baggage | Column D |

Table 3 describes additional independent variables.

TABLE 3

Independent Input Variables

| Independent input variables | Function Description | Excel column/cell |
|---|---|---|
| Projected Year | Year selected for all regression based projection functions/formulas | Cell B3 |
| Operating Mode | Selection of solving parameter. 1 = Solves for maximum displacement of the fuel using battery regardless of cost and emissions whiling achieving mission range, 2 = Solves for minimum cost of energy, 3 = Solves for minimum jet fuel consumption, 4 = Solves for minimum total emissions | Cell B4 |
| Grid Energy Cost Outlook | Level of projection for energy costs, Low through High (L = 1, M = 2, H = 3) | Cell B5 |
| Fuel Cost Projection | Level of projection for jet fuel costs, Low through High (L = 1, M = 2, H = 3) | Cell D3 |
| Nuclear Discount Rate | The discount rate, otherwise referred to as "discounted cash flow analysis" is the effective reduction in future projected profits when accounting for them in today's monetary value. Nuclear is significantly more sensitive to discount rate than coal or gas due to being capital intensive. The discount rate chosen to cost a nuclear power plant's capital over its lifetime is arguably the most sensitive parameter to overall costs and hence levelized cost of electricity (LOCE). At a 3% discount rate nuclear power is typically the cheapest form of energy production. At 7% it is comparable to coal, but still cheaper than gas. At 10% it is comparable to both. | Cell D4 |
| % Nuclear Generation | % of dedicated carbon free energy production for charging batteries, i.e. 40% nuclear would imply 60% is still based on regional grid mix composition | Cell D5 |
| Regional US Grid Composition | Represents the US grid mix of nuclear, renewables, coal and natural gas as per EIA projections | Cell F3 |
| Carbon Tax on Emissions ($/lb) | Tax on total emissions from jet fuel and battery charging | Cell F4 |
| Grid Electricity Rate | Electricity tariff: 1 for Industrial rate, 2 for Commercial rate. It is fair to assume that airport charging would be on the industrial rate. | Cell F5 |
| Battery Salvage Value | % of initial battery cost recaptured in a secondary market | Cell H3 |
| Battery Cost Projection | Level of projection for battery costs, Low through High (L = 1, M = 2, H = 3) | Cell H4 |
| Battery Cycle Life | Number of flights the battery supports prior to its secondary market use | Cell H5 |
| Battery Construction | Lbs carbon produced per lb of produced battery | Cell J3 |
| TeDP | Is the aircraft already a Turbo-electric Distributed Propulsion aircraft (Yes = 1, No = 0). This determines whether the mass of electric machines is already captured in the aircraft OEW mass | Cell J4 |
| Core Thermal Efficiency | Efficiency of extracting the energy from jet fuel to provide thrust energy | Cell J5 |
| Machines & Drives Tech Progress | Level of projection for power density of electrical system, Low through High (L = 1, M = 2, H = 3) | Cell L3 |
| Motor Rating (MW) per Engine | Power rating of each electrical machine in MW | Cell L4 |
| Propulsive Efficiency | Aerodynamic efficiency of the airframe | Cell L5 |
| Battery Progress | Level of projection for energy density of batteries, Low through High (L = 1, M = 2, H = 3). | Cell N3 |
| Maximum Battery Mass | Represents the structural/volumetric limitation of the airframe battery holding capacity | Column N & Cell N4 |
| % Weight Reduction with Optionally Hybrid Engine | If the aircraft is designed to be sold in ether a conventional or hybrid configuration, this represents the % of removal of hybrid equipment when operating in a conventional configuration. If all machines and drives, protection, etc are removed for non-hybrid feasible routes, this would be 100% weight reduction. 0% reduction implies that the motors and power electronics, etc, remain in the aircraft. Note: the batteries are not included in this parameter, their mass is treated separately. | Cell N5 |

The scenarios for exercising the aircraft may be created by selection of the dependent input variables. The selection of the aircraft and the dependent input variables determines the dependent input variables, such as those shown in Table 4. These are generated from regressions as discussed in the following section:

TABLE 4

Dependent Input Variables

| Dependent input variables | Function Description | Excel column/cell |
|---|---|---|
| $/gallon | Jet fuel price in $/gallon | Cell B7 |
| $/KWh | Electricity cost for charging the batteries in $/KWh | Cell D7 |
| Charging CO2 | Lb of carbon produced per KWh of electrical energy consumed in charging the battery | Cell F7 |
| Carbon Tax on emissions | $/lb of emissions - assumed the same tax rate is applied to jet fuel emissions and emissions from power stations | Cell H7 |
| Battery Cost | $/KWh of battery installed in the aircraft | Cell J7 |
| Total drive power system density | KW/Kg. Average combined power density of power electronics and electrical machines | Cell L7 |
| Energy Density | Battery energy density Wh/Kg | Cell N7 |
| Overall electrical drive efficiency | Average combine efficiency of the power electronics and electrical machine | Cell P7 |

Input Assumptions on Annual Projections

The annual projected assumptions used in HIBET are based on published industry forecasts as of 2016/2017. The forecasts are based on three different levels of progression, low, medium and high. Liner and quadratic regressions are used to characterize the forecasts to allow a mathematical representation of the trends such that intermediate values may be interpolated for specific cases of interest.

Fuel Costs

Fuel cost projections are based on those published by the Energy Information Administration (EAI) in the Annual Energy Outlook 2016$^{REF}$. Jet fuel price projections extracted from the Annual Energy Outlook are shown in Table 5. The regression based reproduction of this data is shown in Table 6.

TABLE 5

Jet fuel cost projections (2015 dollars per gallon)

| Year | Low | Medium | High |
|---|---|---|---|
| 2015 | 1.62 | 1.62 | 1.62 |
| 2020 | 1.16 | 2.18 | 3.99 |
| 2030 | 1.47 | 2.87 | 5.41 |
| 2040 | 2.15 | 3.74 | 6.04 |

TABLE 6

Regression reproduced jet fuel cost projections (2015 dollars per gallon)

| Year | Low | Medium | High |
|---|---|---|---|
| 2015 | 1.62 | 1.62 | 1.62 |
| 2020 | 1.18 | 2.04 | 3.47 |
| 2025 | 1.21 | 2.47 | 4.67 |
| 2030 | 1.47 | 2.89 | 5.38 |
| 2035 | 1.81 | 3.32 | 5.74 |
| 2040 | 2.15 | 3.74 | 5.85 |

Energy Costs

Energy cost projections are based on those published by the Energy Information Administration (EAI) in the Annual Energy Outlook 2016REF. Energy price projections extracted from the Annual Energy Outlook are shown in Table 7. The regression based reproduction of this data is shown in Table 8. Charging CO2 Costs

TABLE 7

Energy cost projections (2015 cents per kilowatthours)

| | 2015 | 2020 | 2025 | 2030 | 2035 | 2040 |
|---|---|---|---|---|---|---|
| Commercial | 10.5 | 10.7 | 10.9 | 11 | 10.7 | 10.5 |
| Industrial | 6.9 | 7.1 | 7.3 | 7.5 | 7.3 | 7.2 |

TABLE 8

Regression reproduced energy cost projections (2015 cents per kilowatthours)

| | 2015 | | | 2020 | | | 2025 | | | 2030 | | | 2035 | | | 2040 | | |
|---|---|---|---|---|---|---|---|---|---|---|---|---|---|---|---|---|---|---|
| RATE | L | M | H | L | M | H | L | M | H | L | M | H | L | M | H | L | M | H |
| Comm'l | 10.4 | 10.4 | 10.4 | 10.5 | 10.7 | 10.9 | 10.7 | 10.9 | 11.4 | 10.7 | 11.0 | 11.8 | 10.4 | 10.7 | 11.6 | 10.2 | 10.5 | 11.4 |
| Industrial | 6.9 | 6.9 | 6.9 | 7.0 | 7.1 | 7.3 | 7.1 | 7.3 | 7.6 | 7.3 | 7.6 | 8.2 | 7.3 | 7.5 | 8.2 | 7.1 | 7.3 | 8.0 |

Charging CO2 Costs

Charging CO2 costs are the product of CO2 emission projections and predictions of CO2 emission taxation. HIBET assumes grid emission taxation is the same cost basis as that applied to aviation emissions per lb of carbon.

CO2 emission projections are based on a combination of the projected grid composition and the projected individual power plant emissions. The projected grid composition of is based on the reference case from the EIA 2014 Annual Energy Outlook, Table 9:

TABLE 9

EIA Reference Case Future U.S. Grid Composition; Billions KWh installed capacity$^{REF}$

| Power Plant | 2011 | 2012 | 2020 | 2025 | 2030 | 2035 | 2040 |
|---|---|---|---|---|---|---|---|
| Coal | 1,733 | 1,512 | 1,646 | 1,689 | 1,692 | 1,679 | 1,675 |
| Petroleum | 30 | 23 | 18 | 19 | 19 | 19 | 19 |
| Natural Gas | 1,014 | 1,228 | 1,268 | 1,401 | 1,552 | 1,708 | 1,839 |
| Nuclear Power | 790 | 769 | 779 | 779 | 782 | 786 | 811 |
| Renewable Sources | 517 | 502 | 667 | 711 | 748 | 787 | 851 |
| Other | 19 | 19 | 24 | 24 | 24 | 24 | 24 |
| Total | 4,103 | 4,054 | 4,402 | 4,622 | 4,815 | 5,004 | 5,219 |

The individual energy source lifecycle emissions for energy production are based on estimates published by the Intergovernmental Panel on Climate Change (IPCC)$^{REF}$. These combined with installed capacity, Table 9, derives the basis for grid CO2 productions shown in Table 10. The regression based reproduction of this data is shown in Table 11 in terms of gCO2/KWh and lbCO2/KWh since the latter is used in the model. The % nuclear selected in HIBET reduces the CO2 by the same %.

TABLE 10

Projections gCO2/KWh$^{REF}$

| Year | Low | Medium | High |
|---|---|---|---|
| 2000 | 615 | 510 | 455 |
| 2010 | 600 | 490 | 435 |
| 2020 | 550 | 472 | 420 |
| 2030 | 545 | 470 | 415 |
| 2040 | 540 | 465 | 412 |

TABLE 11

Regression reproduced grid CO2 projections, gCO2/KWh (lbCO2/KWh)

| Year | Low | Medium | High |
|---|---|---|---|
| 2000 | 615 (1.3558) | 535 (1.1795) | 455 (1.0031) |
| 2010 | 565 (1.2451) | 493 (1.0875) | 422 (0.9299) |
| 2020 | 553 (1.2200) | 484 (1.0666) | 414 (0.9132) |
| 2030 | 551 (1.2142) | 482 (1.0618) | 413 (0.9094) |
| 2040 | 550 (1.2129) | 481 (1.0607) | 412 (0.9086) |

Fuel CO2 Emission Taxation

These costs are based on predictions of the taxation schemes being considered by the ICAO on carbon emissions in the aviation industry. ICAO and IATA recognizes the need to address the global challenge of climate change and adopted a set of ambitious targets to mitigate CO2 emissions from air transport. The aviation industry vision is to achieve the following:

An average improvement in fuel efficiency of 1.5% per year from 2009 to 2020;

A cap on net aviation CO2 emissions from 2020 (carbon-neutral growth); and

A reduction in net aviation CO2 emissions of 50% by 2050, relative to 2005 levels.

Figure 7:
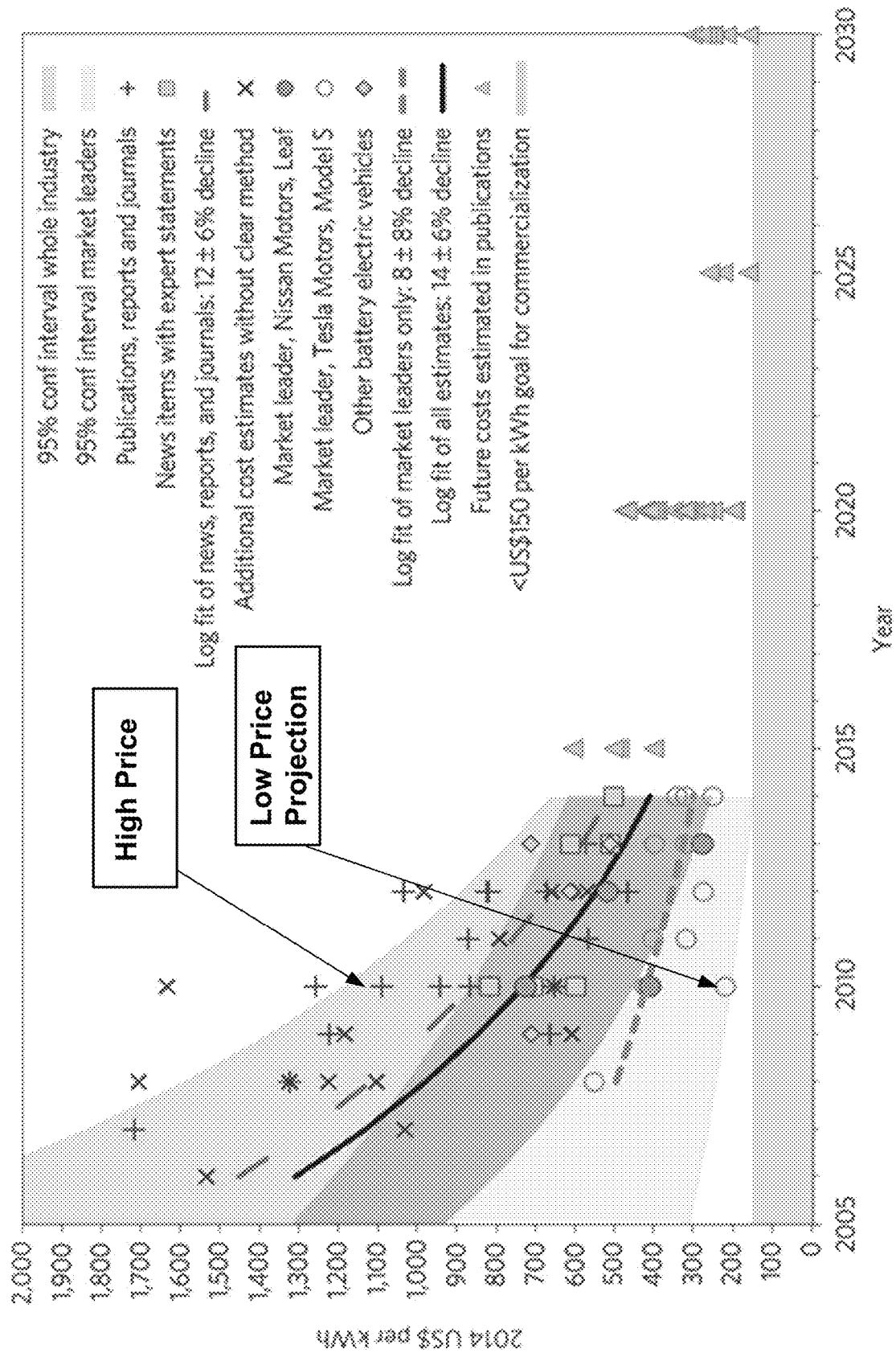
FIG. 7 illustrates an example of projected battery costs.

In October 2016 it was agreed that the Carbon Offset and Reduction Scheme for International Aviation (CORSAIR) would be introduced for international aviation as follows:

Pilot phase (from 2021 through 2023) and first phase (from 2024 through 2026) would apply to States that have volunteered to participate in the scheme; and Second phase (from 2027 through 2035) would apply to all States that have an individual share of international aviation activities in RTKs in year 2018 above 0.5 per cent of total RTKs or whose cumulative share in the list of States from the highest to the lowest amount of RTKs reaches 90 per cent of total RTKs, except Least Developed Countries (LDCs), Small Island Developing States (SIDS) and Land-locked Developing Countries (LLDCs) unless they volunteer to participate in this phase Battery Costs FIG. 7 illustrates an example of projected battery costs. The projected battery costs in $/KWh are also shown in Table 12. These projected costs were extracted from the projections published by the Journal of Nature Climate Change. The highest costs are based on the projection of the upper limit of the 95% confidence interval for the whole industry (upper boundary of medium grey region). The lowest costs are based on the projection of the lower limit of the 95% confidence interval for the market leaders (lower boundary of light gray region).

TABLE 12

Battery cost $/KWh extracted from FIG.

| Year | Low | High |
|---|---|---|
| 2008 | 600 | 1600 |
| 2010 | 450 | 1200 |
| 2012 | 325 | 900 |
| 2014 | 250 | 670 |
| 2015 | 200 | 600 |
| 2020 | 175 | 450 |
| 2025 | 150 | |
| 2030 | 125 | 300 |
| 2040 | 125 | |

TABLE 13

Regression reproduced battery cost $/KWh

| Year | Low | Medium | High |
|---|---|---|---|
| 2008 | 603 | 1139 | 1675 |
| 2010 | 415 | 774 | 1133 |
| 2012 | 321 | 592 | 863 |
| 2014 | 265 | 483 | 700 |
| 2015 | 245 | 443 | 641 |
| 2020 | 181 | 318 | 456 |
| 2025 | 147 | 253 | 360 |
| 2030 | 127 | 213 | 300 |
| 2040 | 103 | 167 | 231 |

Energy Density

Industry projections anticipate an improvement of 4% per year for Lithium-ion batteries. Some estimate that lithium ion technology can grow up to a theoretical maximum energy density of 850 Wh/Kg. State-of-the-art technology is currently at 200 Wh/Kg which if projected through to 2040 at a 4, 5 or 6% growth rate for low, medium and high progressions derives the values in Table 14.

TABLE 14

Projected growth in battery energy density (theoretically capable with lithium-ion chemistry)

| Year | 4% growth | 5% growth | 6% growth |
|---|---|---|---|
| 2017 | 200 | 200 | 200 |
| 2020 | 225 | 232 | 238 |
| 2025 | 274 | 296 | 319 |
| 2030 | 333 | 377 | 427 |
| 2035 | 405 | 481 | 571 |
| 2040 | 493 | 614 | 764 |

TABLE 15

Additional extrapolation to model sensitivity to advanced battery chemistries

| Year | Low - 1 | Medium - 3 | High - 5 |
|---|---|---|---|
| 2017 | 200 | 200 | 200 |
| 2020 | 225 | 238 | 252 |
| 2025 | 274 | 319 | 370 |
| 2030 | 333 | 427 | 544 |
| 2035 | 405 | 571 | 799 |
| 2040 | 493 | 764 | 1174 |

Total Drive Power Density

Total drive power density is the product of power density of the electrical machine technology progression and the power electronics technology progression. Examples of projections for these technologies are shown in Tables 16 and 17.

TABLE 16

Projection of power density of electrical machine technology

| Column title | Low | Medium | High |
|---|---|---|---|
| 2017 | 5 | 5 | 5 |
| 2025 | 7 | 9 | 12 |
| 2035 | 10 | 13 | 20 |
| 2040 | 11 | 15 | 24 |

TABLE 17

Projection of power density of power electronics technology

| Year | Low | Medium | High |
|---|---|---|---|
| 2017 | 7.5 | 7.5 | 7.5 |
| 2025 | 10 | 13 | 20 |
| 2035 | 14 | 20 | 25 |
| 2040 | 16 | 23 | 27 |

Overall Electrical Efficiency

Overall electrical efficiency is the product of efficiency of the electrical machine technology progression and the power electronics technology progression. Example projections for these technologies are shown in Tables 18 and 19.

TABLE 18

Projection of efficiency of electrical machine technology

| Year | Low | Medium | High |
|---|---|---|---|
| 2017 | 0.97 | 0.97 | 0.97 |
| 2025 | 0.975 | 0.97825 | 0.9825 |
| 2035 | 0.98 | 0.985 | 0.99 |
| 2040 | 0.9825 | 0.9875 | 0.9925 |

TABLE 19

Projection of efficiency of power electronics technology

| Year | Low | Medium | High |
|---|---|---|---|
| 2017 | 0.97 | 0.97 | 0.97 |
| 2025 | 0.975 | 0.97825 | 0.9825 |
| 2035 | 0.98 | 0.985 | 0.99 |
| 2040 | 0.9825 | 0.9875 | 0.9925 |

HIBET Functions

The majority of the columns in HIBET contain functions to calculate the energy requirements for conventional and hybridized aircraft.

TABLE 20

Functions fora conventional aircraft

| Function | Function Description | Excel column/cell |
|---|---|---|
| Fueled TOW (lb) | Total aircraft weight (fuel + oew + payload) | Column E |
| Potential energy (MJ) | MJ of stored potential energy for the lb of fuel; 43.15 MJ/kg; 2.2 lb per kg | Column F |
| Thrust Work (MJ) | Energy converted to thrust after losses associated with core thermal efficiency and propulsive efficiency | Column G |

The functions for a hybridized aircraft (per flight) are summarized in Table 21.

TABLE 21

Functions for a hybridized aircraft

| Function | Function Description | Excel column/cell |
|---|---|---|
| % Energy Limit | Energy from the motors divided by total energy needed. This column selects one of two algorithms based on: Pm <= Pcr or Pm > Pcr, where Pm is the motor rating and Pcr is required cruise power for the total aircraft weight (fuel + payload + OEW as a ratio of MTOW). Refer to section on % energy limit | Column H |
| Optimized Battery works | Refer to section on optimized battery works | Column I |
| OEW (lb) | Updated OEW to account for electrical motors and displaced fuel (no battery mass included) | Column J |
| Thrust Work (MJ) | Updated energy required to provide thrust with the added weight of electrical system components and batteries | Column K |
| Energy/Fuel Work Ratio | Chooses the lowest value of column H (% energy limit) and column I (optimized battery works) | Column L |
| Battery Energy (MJ) | Calculates the applied (thrust) energy to come from the battery: multiplication of column K and column L | Column M |
| Actual Battery Mass | Selects the minimum of column N or column M applies the inefficiencies to get the actual mass for the actual energy carried, i.e. more than applied energy | Column O |
| Stored Battery Energy (MJ) | Based on column O (actual battery mass) and battery energy density | Column P |
| Stored Fuel Energy (MJ) | Calculates the applied (thrust) energy to come from the fuel: column K (thrust work) less the energy in column P with efficiencies applied | Column Q |
| Fuel Mass | Mass of fuel for the hybridized aircraft based on column Q (fuel mass) | Column R |
|  | Is a check of column I (Optimized battery works) | Column S |
| Energy Mass | Summation of battery mass and fuel mass | Column T |
| Total Mass | Total aircraft weight (fuel + oew + payload + battery) | Column U |
| MTOW Energy Limit | Calculates the factor that determines the optimial split between fuel and battery energy based on Mass constraints and required energy. Refer to section on Solver | Column V |
| Range (nm) | Range; a repeat of column A | Column X |

Energy Optimization

In some examples, HIBET leverages two algorithms in order to determine the optimized energy split. First, HIBET determines the maximum amount of energy that can be provided by the electrical machines over the mission range and ratio's this to the total required energy for that mission. This is referred to as the "% Energy Limit," (Column H). Second, based on a user request and the constraint of maximum electrical energy delivery above, HIBET uses the "Optimized Battery Works," (column I) to solve for the any one of the following determined by user input (for example by selection of Operating Mode, Cell B4):
Utilize maximum allowable aircraft weight, MTOW
minimum relative cost
minimum fuel consumption
minimum emissions % Energy Limit (Column H)

This is the maximum amount of energy that can be provided by the electrical machines and is dependent on the following parameters:

$P_{to}$—Power required for take-off per engine (Take-off power per engine multiplied by ratio total mass to fuel mass).

$P_{cr}$—Power required for cruise per engine (Cruise power per engine multiplied by ratio total mass to fuel mass.

$P_m$—Motor Rating (MW) per engine (with a multiplier to account for a Turboelectric Distributed Propulsion configuration)

$R_{to}$—range for take-off (for example, 100 nm)

$R_{tot}$—total range of given flight

Figure 8A:
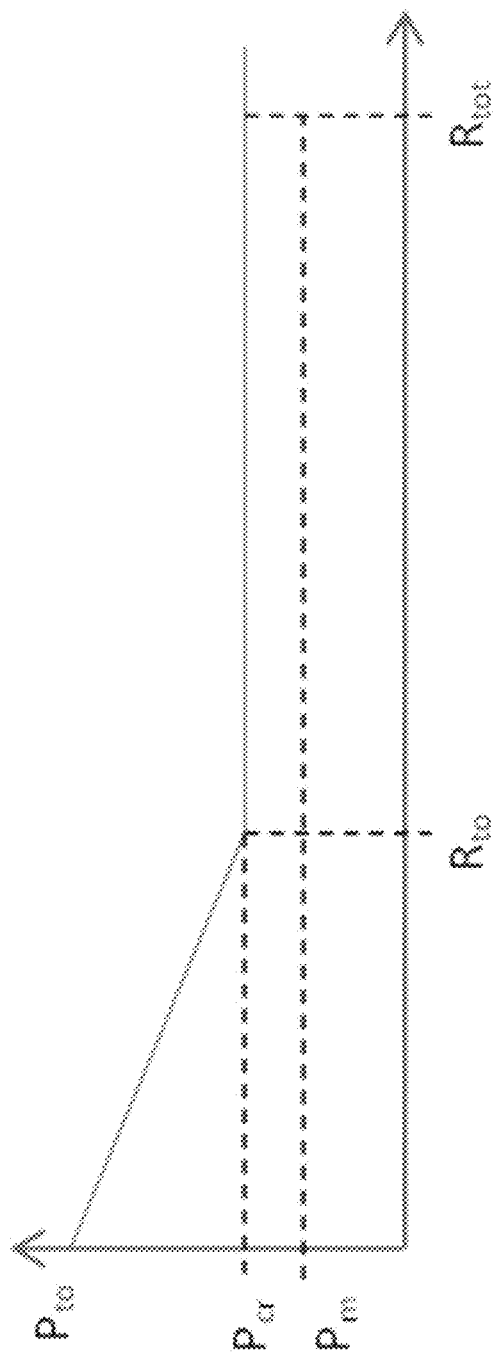
FIG. 8A illustrates energy calculation parameters where $Pm<=Pcr$.
Figure 8B:
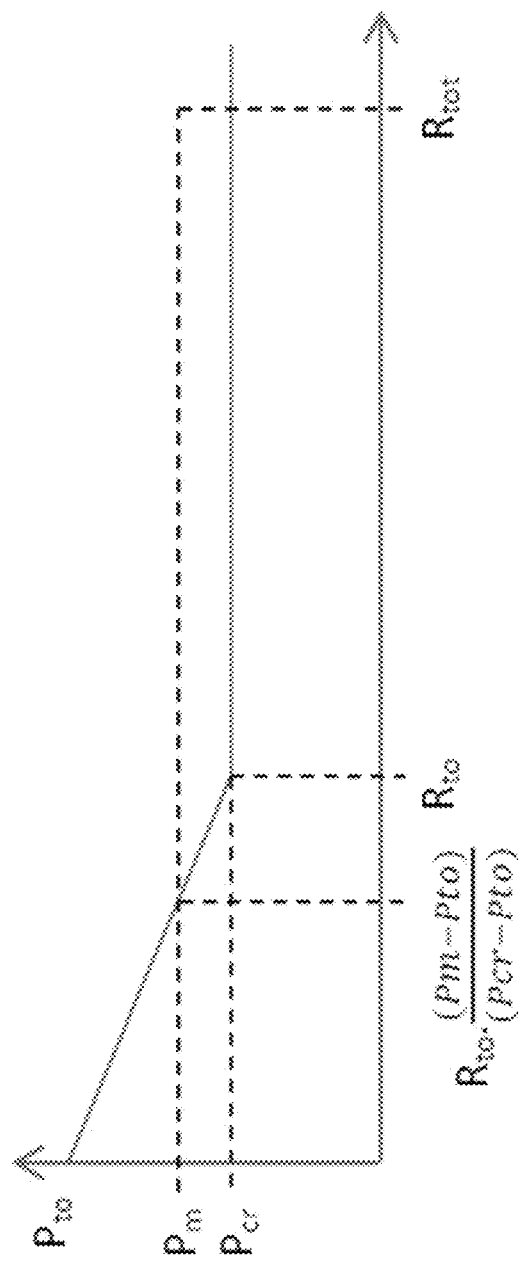
FIG. 8B illustrates energy calculation parameters where $Pm>Pcr$.

The % Energy Limit algorithm accounts for the two conditions, Pm<=Pcr and Pm>Pcr, each of which is derived independently for take-off and cruise flight segments. Descent is not necessarily characterized or taken into account when determining the % Energy Limit. FIG. 8A illustrates energy calculation parameters where Pm<=Pcr. FIG. 8B illustrates energy calculation parameters where Pm>Pcr.

Take-Off Flight Segment

Scenario $P_m <= P_{cr}$

Figure 9A:
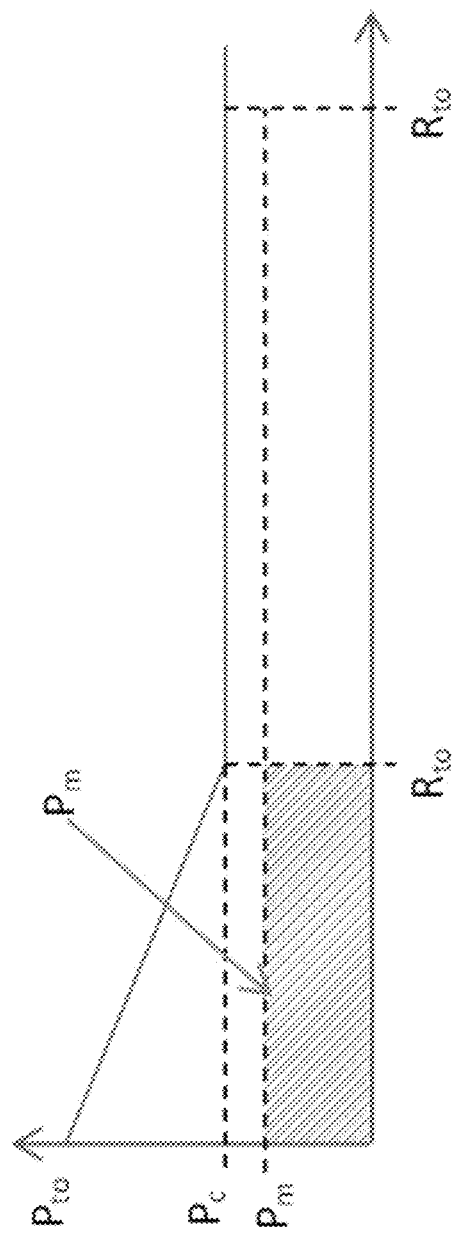
FIGS. 9A and 9B illustrates a % Energy Limit calculation for the take-off flight segment under the condition where $Pm<=Pcr$.
Figure 9B:
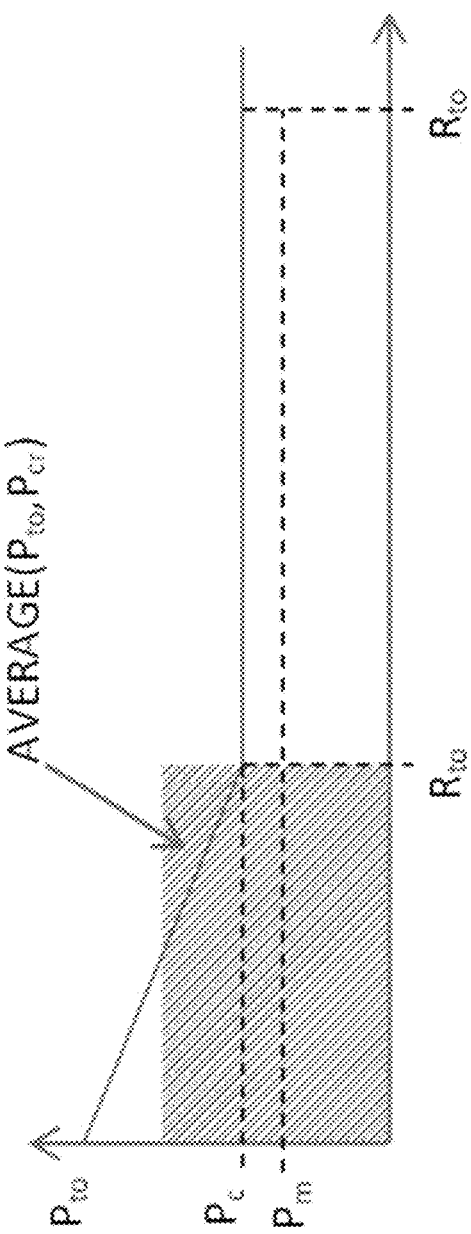

FIGS. 9A and 9B illustrates a % Energy Limit calculation for the take-off flight segment under the condition where Pm<=Pcr and range=100 nm, where FIG. 9A illustrates the calculation of Electrical Energy, and FIG. 9B illustrates the calculation of the Total Energy.

When Pm<=Pcr, % Energy Ratio is defined as the shaded area in FIG. 9A divided by the shaded area in FIG. 9B. Because Rto=Rtot, they cancel and the ratio of electrical energy to total energy is:

$$P_m / \text{AVERAGE}(P_{to}, P_{cr})$$

Scenario $P_m > P_{cr}$

FIGS. 10A and 10B illustrates a % Energy Limit calculation for the take-off flight segment under the condition where Pm>Pcr and range=100 nm, where FIG. 10A illustrates the calculation of Electrical Energy, and FIG. 10B illustrates the calculation of the Total Energy.

When Pm>Pcr, % Energy Ratio is defined as the shaded area in FIG. 10A divided by the shaded area in FIG. 10B, or ratio of electrical energy to total energy is:

$$\frac{\text{Area 1} + \text{Area 2} + \text{Area 3}}{\text{Area 1} + \text{Area 2} + \text{Area 3} + \text{Area 4}}$$

$$\text{Area 1: } P_m * \frac{(P_m - P_{to})}{(P_{cr} - P_{to})} R_{to}$$

-continued $$\text{Area 2: } \frac{1}{2} * \left[R_{to} - \left(\frac{(P_m - P_{to})}{(P_{cr} - P_{to})}\right)R_{to}\right] * (P_m - P_{cr})$$

$$\text{Area 3: } P_{cr} * \left[R_{to} - \left(\frac{(P_m - P_{to})}{(P_{cr} - P_{to})}\right)R_{to}\right]$$

$$\text{Area 4: } \frac{1}{2} * \left(\frac{(P_m - P_{to})}{(P_{cr} - P_{to})}\right)R_{to} \right] * (P_{to} - P_m)$$

Cruise Flight Segment
Scenario Pm<=Pcr

Figure 11A:
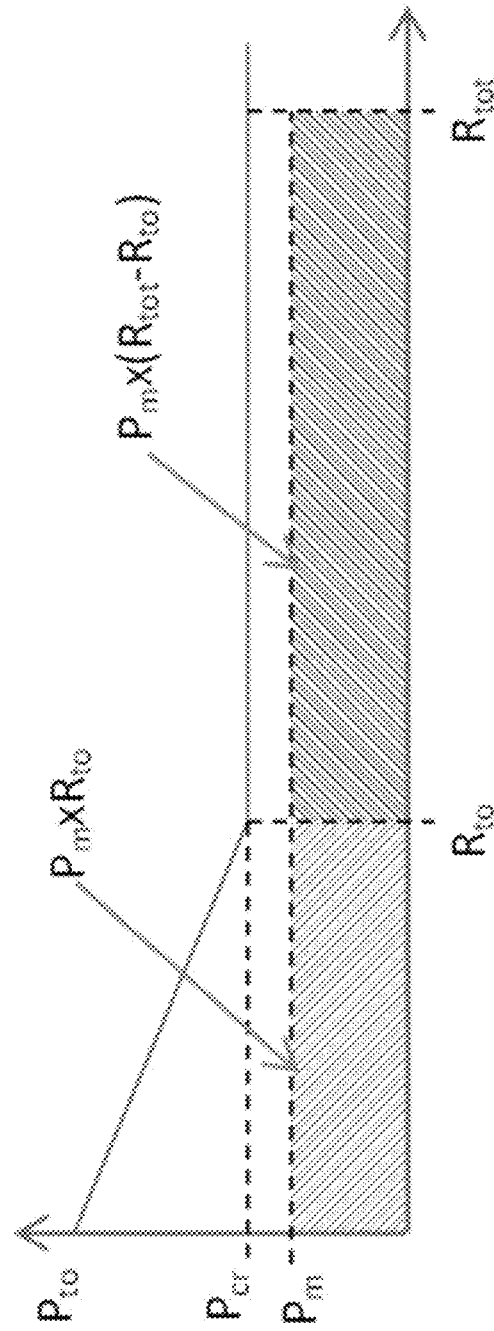
FIGS. 11A and 11B illustrates a % Energy Limit calculation for the cruise flight segment under the condition where $Pm<=Pcr$.
Figure 11B:
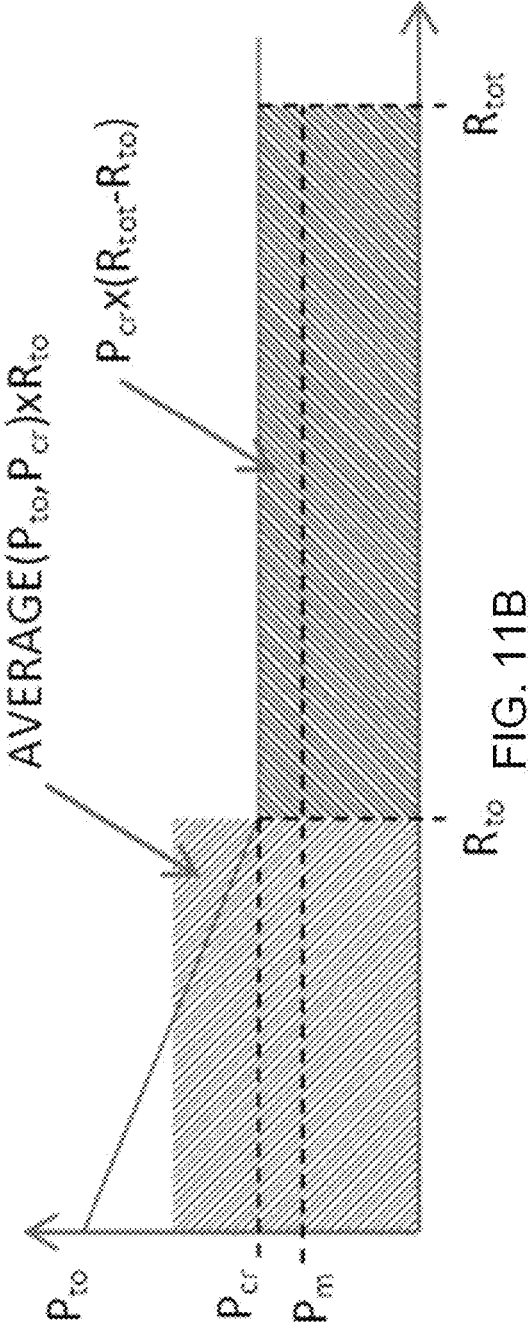

FIGS. 11A and 11B illustrates a % Energy Limit calculation for the cruise flight segment under the condition where Pm<=Pcr and range=100 nm, where FIG. 11A illustrates the calculation of Electrical Energy, and FIG. 11B illustrates the calculation of the Total Energy.

If Pm<=Pcr, % Energy Ratio is defined as the shaded area in FIG. 11A divided by the shaded area in FIG. 11B, or the ratio of electrical energy to total energy is $$(P_m*R_{to})+(P_m*(R_{tot}-R_{to})/\text{AVERAGE}((P_{to},P_{cr})*R_{to})+(P_{cr}*(R_{tot}-R_{to}))$$

Scenario Pm>Pcr

Figure 12A:
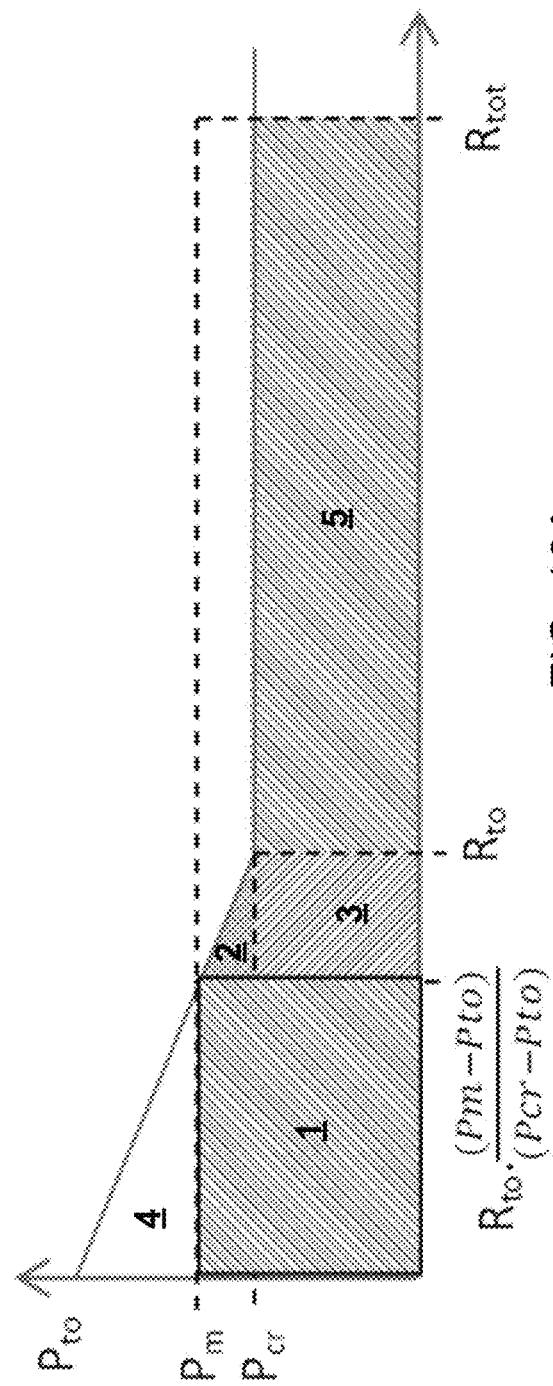
FIGS. 12A and 12B illustrates a % Energy Limit calculation for the cruise flight segment under the condition where $Pm>Pcr$.
Figure 12B:
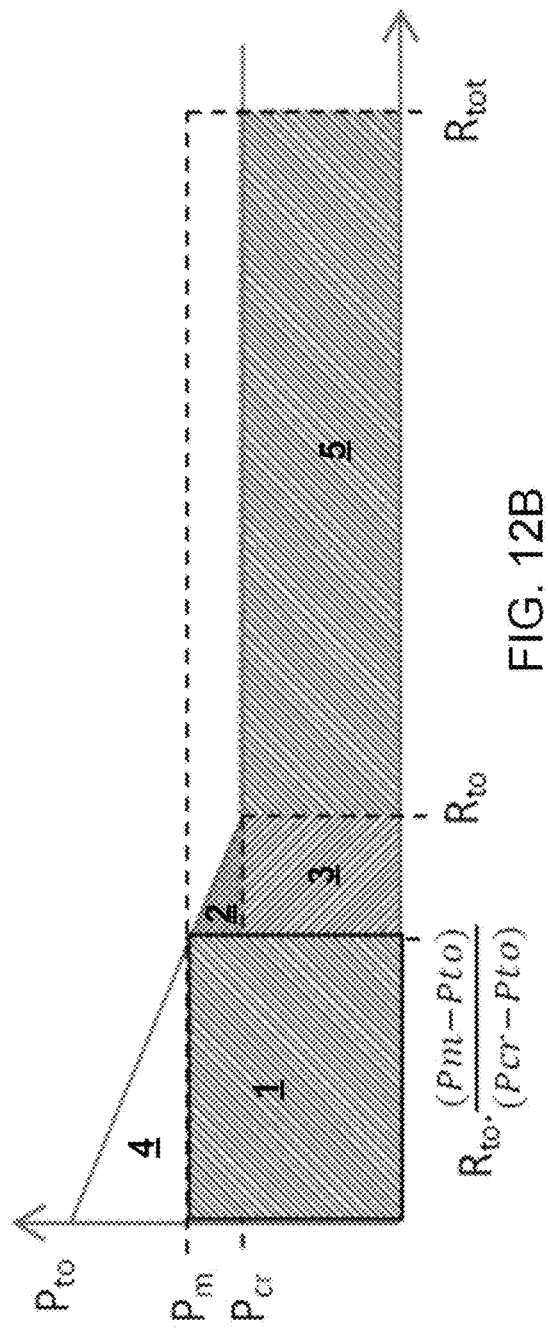

FIGS. 12A and 12B illustrates a % Energy Limit calculation for the cruise flight segment under the condition where Pm>Pcr and range=100 nm, where FIG. 12A illustrates the calculation of Electrical Energy, and FIG. 12B illustrates the calculation of the Total Energy.

If Pm>Pcr, % Energy Ratio is determined as the shaded area in FIG. 12A divided by the shaded area in FIG. 12B, or ratio of electrical energy to total energy is:

$$\frac{\text{Area 1} + \text{Area 2} + \text{Area 3} + \text{Area 5}}{\text{Area 1} + \text{Area 2} + \text{Area 3} + \text{Area 4} + \text{Area 5}}$$

$$\text{Area 1: } P_m * \frac{(P_m - P_{to})}{(P_{cr} - P_{to})} R_{to}$$

$$\text{Area 2: } \frac{1}{2} * \left[R_{to} - \left(\frac{(P_m - P_{to})}{(P_{cr} - P_{to})}\right)R_{to}\right] * (P_m - P_{cr})$$

$$\text{Area 3: } P_{cr} * \left[R_{to} - \left(\frac{(P_m - P_{to})}{(P_{cr} - P_{to})}\right)R_{to}\right]$$

$$\text{Area 4: } \frac{1}{2} * \left(\frac{(P_m - P_{to})}{(P_{cr} - P_{to})}\right)R_{to} \right] * (P_{to} - P_m)$$

$$\text{Area 5: } P_m * (R_{tot} - R_{to})$$

Optimized Battery Works (or Solver) (Column I)

Based on user selection, HIBET optimizes the energy split between jet fuel and battery energy to achieve one of the following:
minimum MTOW—option 1
minimum relative cost—option 2
minimum fuel consumption—option 3
minimum emissions—option 4

Each of the optimizations identified above rely on a factor k, which represents the maximum fraction of energy that to be provide by the battery, which is calculated in Column V.

The parameters used to derive factor k are listed below. The parameters concern the conventional aircraft, the hybridized aircraft operated conventionally (i.e. weight of electrical system, such as machines and drives, but not battery), and the hybridized aircraft utilizing a mix of jet fuel and battery energy.

$M_f$—Mass of fuel—Column R
$M_b$—Mass of battery—Column O
$M_{pay}$—Mass of payload—Column D
$M_{eow}$—Mass of hybridized aircraft (unfueled, no batteries, no payload)—Column J
MTOW—Maximum Take-Off Weight—Cell T7
$M_{FTOW}$—Mass of flight ready conventional aircraft—Column E
$M_c$—Mass of flight ready conventionally operated aircraft, i.e. includes the weight of the electrical system but no batteries—may or may not be calculated by HIBET
$M_h$—Mass of flight ready hybrid aircraft—Column U
$M_{MD}$—Mass of electrical components (machines and drives)
$TW_{FTOW}$—Thrust Work for conventional aircraft—Column G
$TW_c$—Thrust Work (conventionally operated hybrid aircraft, i.e. includes the weight of the electrical system but no batteries)—Value may or may not be outputted by HIBET
$TW_h$—Thrust Work (hybrid)—Column K
$E_b$—Energy stored in battery—Column Q
$E_f$—Energy stored in fuel—Column P
$TW_b$—Thrust Work from battery—same a Column M
$TW_f$—Thrust Work from fuel—Value may or may not be outputted by HIBET
$\eta_t$—gas turbine core thermal efficiency—Cell J5
$\eta_p$—airframe propulsive efficiency—Cell L5
$\eta_e$—overall electrical system efficiency—Cell P7
$\rho_f$—specific energy density of fuel
$\rho_p$—specific energy density of batteries For the special case that the energy split is optimized to utilize the aircraft rated MTOW the total mass for a hybrid aircraft is defined as:

$$MTOW = M_{oew} + M_{pay} + M_f + M_b$$

Therefore:

$$MTOW - M_{oew} - M_{pay} = M_f + M_b$$

Representing mass in terms of the Stored Energy, E:

$$MTOW - M_{oew} - M_{pay} = \frac{E_f}{\rho_f} + \frac{E_b}{\rho_b}$$

Denoting the energy in terms of Thrust Work, TW:

$$MTOW - M_{oew} - M_{pay} = \frac{TW_f}{\eta_t \eta_p \rho_f} + \frac{TW_b}{\eta_e \eta_p \rho_b}$$

If the total applied Thrust Work (battery and jet fuel combined) is represented by $TW_h$:

$$TW_h = TW_f + TW_b = (1-k)TW_h + kTW_h$$

Then:

$$MTOW - M_{oew} - M_{pay} = \frac{1}{\eta_t \eta_p \rho_f}(1-k)TW_h + \frac{1}{\eta_e \eta_p \rho_b}kTW_h$$

$$MTOW - M_{oew} - M_{pay} = kTW_h\left[\frac{1}{\eta_t \eta_p \rho_f} - \frac{1}{\eta_e \eta_p \rho_b}\right] + \frac{1}{\eta_t \eta_p \rho_f}TW_h$$

$$\frac{MTOW - M_{oew} - M_{pay}}{TW_h} = k\left[\frac{1}{\eta_t \eta_p \rho_f} - \frac{1}{\eta_e \eta_p \rho_b}\right] + \frac{1}{\eta_t \eta_p \rho_f}$$

$$\frac{MTOW - M_{oew} - M_{pay}}{TW_h} - \frac{1}{\eta_t \eta_p \rho_f} = k\left[\frac{1}{\eta_t \eta_p \rho_f} - \frac{1}{\eta_e \eta_p \rho_b}\right]$$

-continued $$\frac{\frac{MTOW - M_{oew} - M_{pay}}{TW_h} - \frac{1}{\eta_t \eta_p \rho_f}}{\left[\frac{1}{\eta_t \eta_p \rho_f} - \frac{1}{\eta_e \eta_p \rho_b}\right]} = k$$

Also:

$$\frac{\text{Thrust work hybrid}_{Col.K}}{\text{Thrust work hybridized operating conventionally}} = \frac{\text{Hybrid mass}_{Col.U}}{\text{Mass hybridized operating conv.}}$$

This can be written as:

$$\frac{TW_h}{TW_c} = \frac{M_h}{M_c}$$

Where $M_c$=Fueled Takeoff Weight$_{Col.E}$+Electrical system weight $M_c = M_{FTOW} + M_{MD}$ So:

$$\frac{TW_h}{TW_c} = \frac{M_h}{M_{FTOW} + M_{MD}}$$

$$TW_h = \frac{M_h}{M_{FTOW} + M_{MD}} \times TW_c$$

Then:

$$\frac{\frac{(MTOW - M_{oew} - M_{pay})}{\frac{M_h \times TW_c}{M_{FTOW} + M_{MD}}} - \frac{1}{\eta_t \eta_p \rho_f}}{\left[\frac{1}{\eta_t \eta_p \rho_f} - \frac{1}{\eta_e \eta_p \rho_b}\right]} = k$$

$$\frac{\frac{M_{FTOW} + M_{MD}}{TW_c} \times \frac{(MTOW - M_{oew} - M_{pay})}{M_h} - \frac{1}{\eta_t \eta_p \rho_f}}{\left[\frac{1}{\eta_t \eta_p \rho_f} - \frac{1}{\eta_e \eta_p \rho_b}\right]} = k$$

The ratio of mass between the hybridized aircraft operated conventionally and the conventional aircraft will be equivalent to the ratio between the Thrust Work for the two aircraft, hence:

$$\frac{TW_c}{TW_{FTOW}} = \frac{M_c}{M_{FTOW}}$$

So:

$$TW_c = \frac{M_c}{M_{FTOW}} \times TW_{FTOW}$$

Since $M_c$ is the mass of the hybrid aircraft operated conventional, or put differently, the conventional aircraft the weight of the hybridized electrical system components, then:

$$TW_c = \frac{(M_{FTOW} + M_{MD})}{M_{FTOW}} \times TW_{FTOW}$$

Therefore k is defined by:

$$\frac{\frac{M_{FTOW} + M_{MD}}{TW_{FTOW} \times (M_{FTOW} + M_{MD})/M_{FTOW}} \times \frac{(MTOW - (M_{oew} + M_{MD}) - M_{pay})}{MTOW} - \frac{1}{\eta_t \eta_p \rho_f}}{\left[\frac{1}{\eta_t \eta_p \rho_f} - \frac{1}{\eta_e \eta_p \rho_b}\right]} = k$$

Maximize Battery Usage Based on MTOW Limit

This solver calculates the optimum energy to be provided by the battery regardless of emissions and cost. The intent is to displace as much fuel, or utilize as much battery capacity, as possible while maintaining sufficient overall energy mix to complete the mission range within the MTOW limit. Other limiting factors, such as the maximum zero fuel weight (MZFW) or volumetric constraints for battery storage, are achieved through user selection of the maximum allowable battery weight, which is a parameter in the solver. In terms of FIG. 4 that shows the HIBET limits, this solver allows the value limit to be exceeded, whereas the power limit and the structural/volumetric limit are user defined by the motor power rating and maximum allowable battery weight.

This is achieved by Column I selecting the lowest value between the cell in Column H and the corresponding cell in Column V, where Column H is the % Energy Limit and Column V is the factor of energy to be provided by the battery.

MIN(H11,V11)

Minimum Relative Cost

This solver follows the MTOW limit until it becomes more expensive for the aircraft to utilize batteries, i.e. in terms of FIG. 4, the point at which the bottom plot crosses over the x-axis. At this point HIBET reverts to a conventional aircraft for further increase in range.

This is achieved by Column I comparing total hybrid energy cost, Column AJ to total conventional aircraft cost, Column AB. When hybridization costs exceed convention then the delta costs are set to zero and the conventional aircraft is selected.

IF(AJ11<=AB11,MIN(H11,V11),0

Minimum Fuel Consumption

This solver follows the MTOW limit until the hybridized aircraft utilizes more jet fuel than the conventional due to the increased energy demand required to carry the additional mass of the batteries. I.e. the additional energy requirement is no longer compensated by the available stored battery energy.

This is achieved by Column I comparing the jet fuel emissions of the hybridized aircraft, Column AD, to the emissions of the conventional aircraft, Column Y. When the jet fuel emissions from the hybridized aircraft exceed those of the conventional, then the solver reverts to a conventional aircraft.

IF(AD11>Y11,0,MIN(H11,V11))

Minimum Emissions

This solver follows the MTOW limit until the hybridized aircraft produces more emissions than the conventional; one example is the battery charging source producing more emissions than the burning of jet fuel.

This is achieved by Column I comparing the total emissions (jet fuel and battery charging) of the hybridized aircraft, Column AF, to the emissions of the conventional aircraft, Column Y. When the total emissions for the hybridized aircraft exceed those of the conventional, then the solver reverts to a conventional aircraft.

IF(AF11>Y11,0,MIN(H11,V11)),0)))

Aircraft Usage Distributions

Figures 13A, 13B:
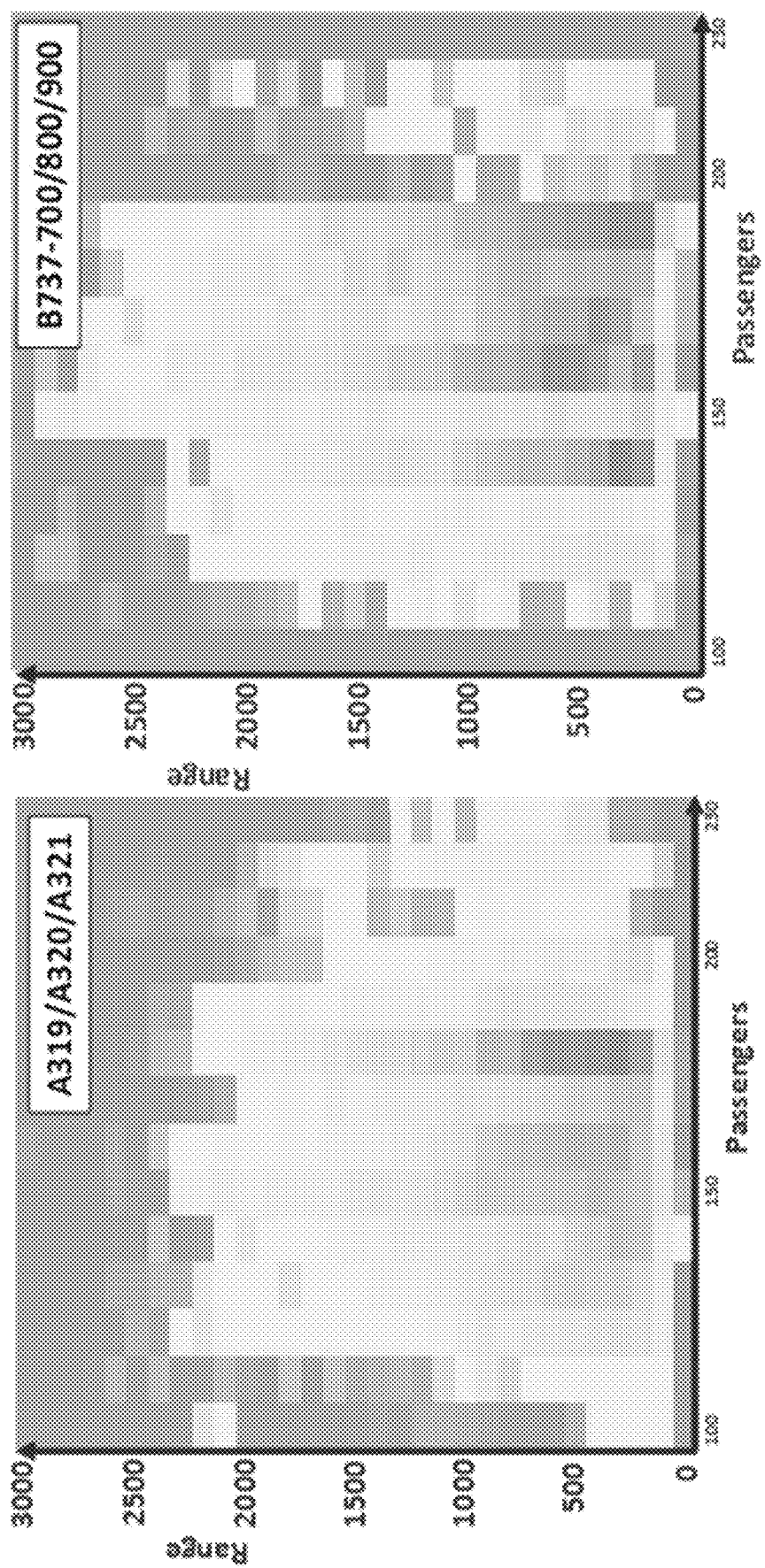
FIG. 13A shows an example distribution of range and number of passengers for an Airbus A320 family.
FIG. 13B shows an example distribution of range and number of passengers for a Boeing B737 family.

HIBET is able to reference a lookup table of typical aircraft utilizations across flight ranges and numbers of passengers. For airframes for which such data exists, this enables the benefit of hybridization to be averaged across the whole fleet usage, in other words, short to long range flights. FIG. 13A shows an example distribution of range and number of passengers for an Airbus A320 family. FIG. 13B shows an example distribution of range and number of passengers for a Boeing B737 family.

Demonstration of Constraints on Hybridization

Figure 14A:
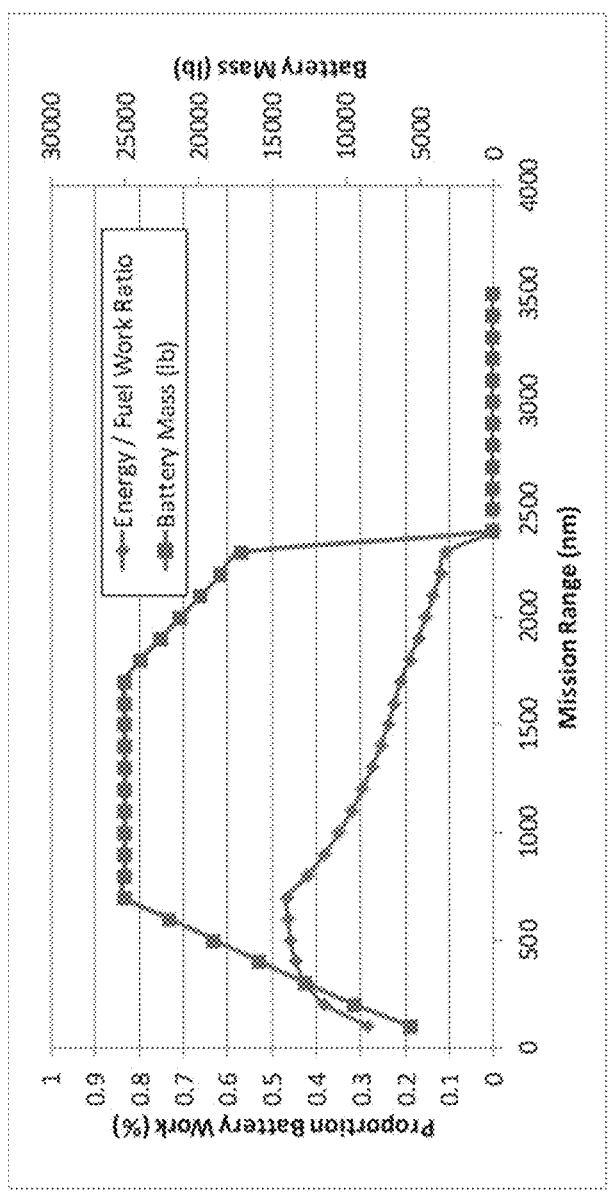
FIG. 14A illustrates a graph generated by HIBET displaying the corresponding battery masses and energy/fuel work ratios.
Figure 14B:
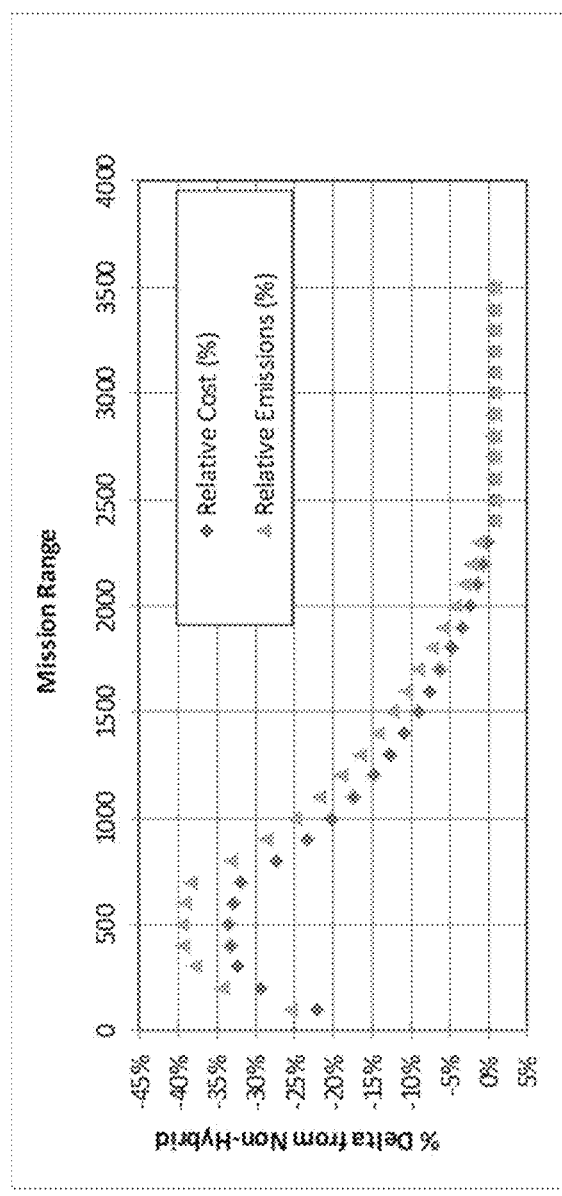
FIG. 14B illustrates a graph generated by HIBET displaying the corresponding relative costs and relative emissions.

As described earlier in connection with FIG. 4, there are constraints that determine the feasibility of hybridization for a given airframe sizing. For a particular airframe, HIBET may perform a simulation in which HIBET follows the constraint curve shown in FIG. 4, namely initially along the power limit, then along the battery mass limit, and then along the MTOW limit until reaching the value limit. This may be referred to as "hitting the constraints." By following the constraint curve (hitting the constraints), HIBET may determine corresponding energy/fuel work ratios, battery masses, relative costs, and relative emissions for an airframe. FIG. 14A illustrates a graph generated by HIBET displaying the corresponding battery masses and energy/fuel work ratios. FIG. 14B illustrates a graph generated by HIBET displaying the corresponding relative costs and relative emissions.

Figure 15A:
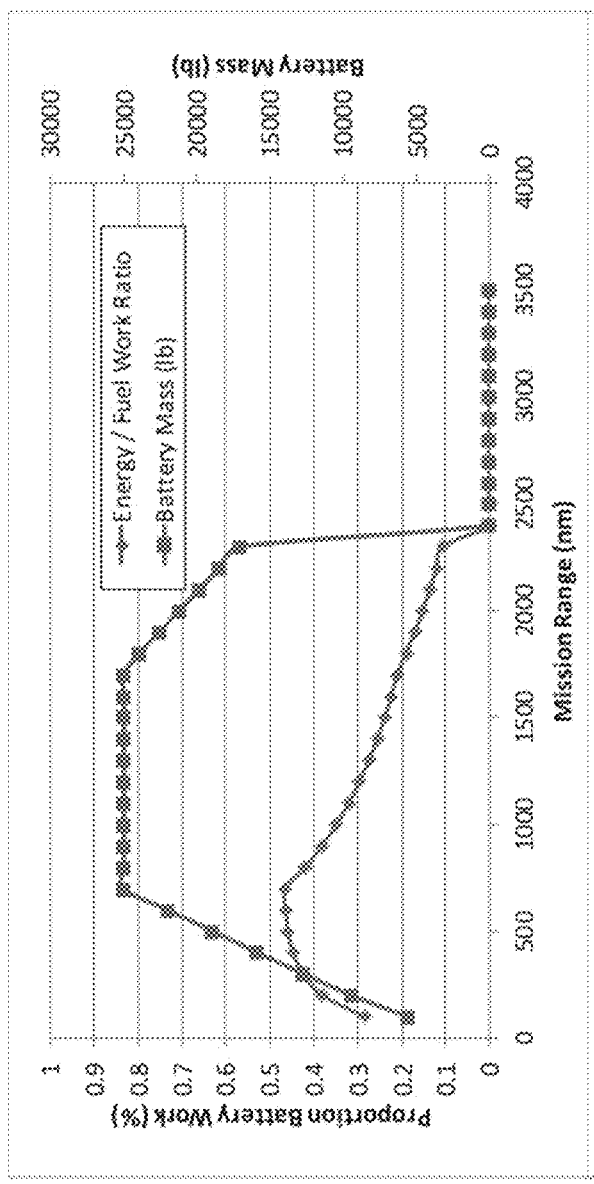
FIGS. 15A and 15B illustrate the effect of doubling the motor power ratings per engine.
Figure 15B:
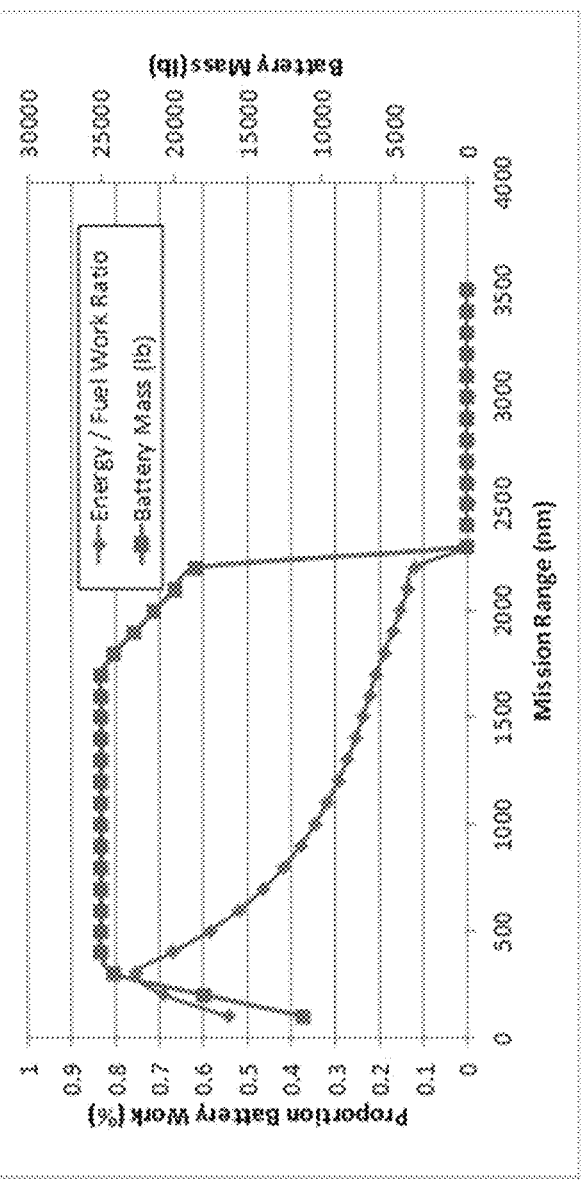

HIBET may determine an effect of a change of one or more characteristics of the airframe or other variables on the energy/fuel work ratios, the battery masses, the relative costs, and the relative emissions for an airframe. FIGS. 15A and 15B illustrate the effect of doubling the motor power ratings per engine. FIG. 15A illustrates the energy/fuel work ratios and the battery masses generated by the HIBET given a first power rating of the motor. FIG. 15B illustrates the energy/fuel work ratios and the battery masses generated by HIBET given a second power rating of the motor, where the second power rating is double the first power rating.

Figure 16A:
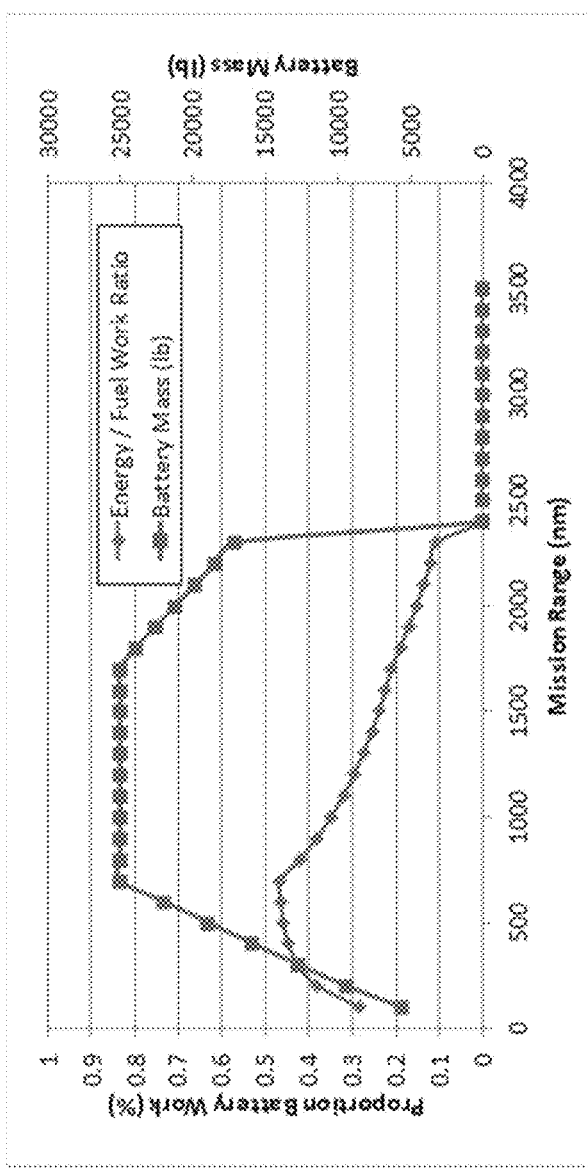
FIGS. 16A and 16B illustrate the effects of increasing an aspect of the structure/volumertic limit of the aircraft.
Figure 16B:
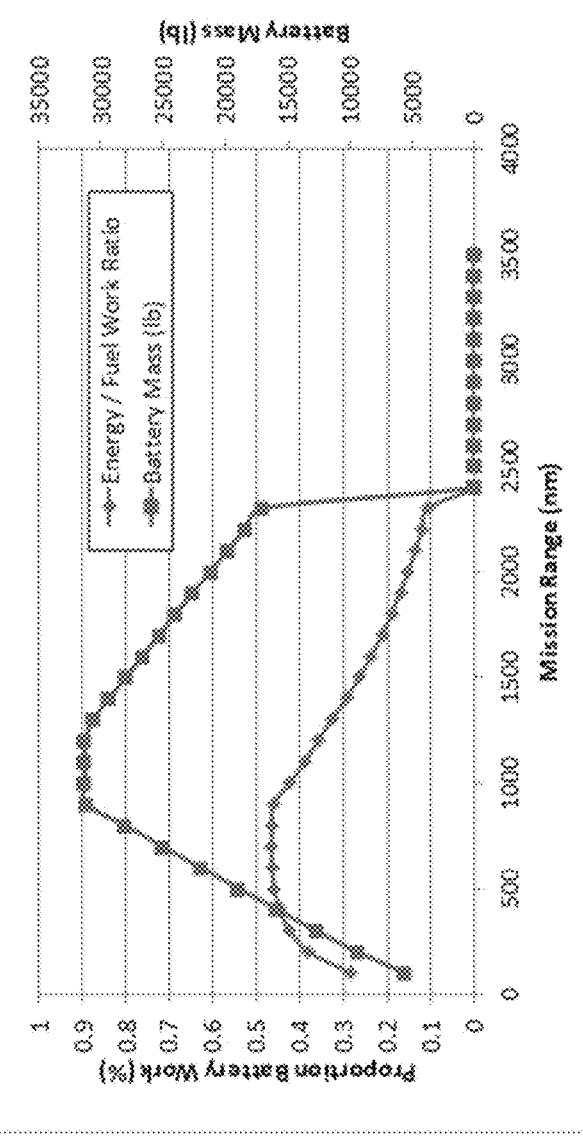

As another example, FIGS. 16A and 16B illustrate the effects of increasing an aspect of the structure/volumertic limit of the aircraft evaluated in HIBET. In particular, FIG. 16A illustrates the energy/fuel work ratios and the battery masses generated by the HIBET given a first allowable battery mass. FIG. 16B illustrates the energy/fuel work ratios and the battery masses generated by HIBET given a second allowable battery mass, where the second allowable battery mass is 25% larger than the first allowable battery mass.

Figure 17A:
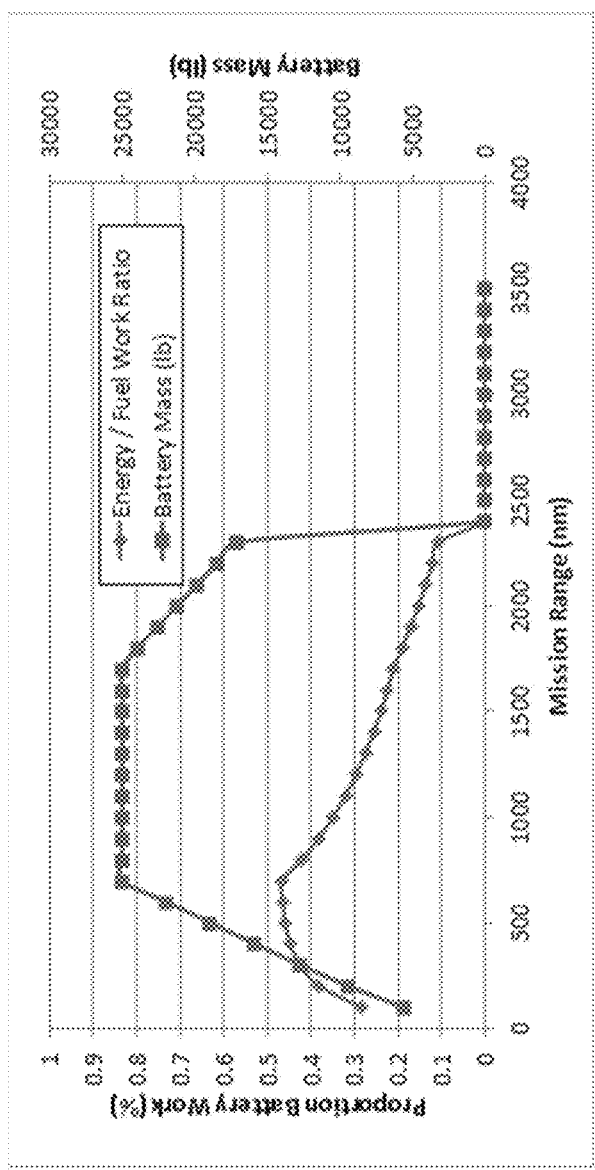
FIGS. 17A and 17B illustrate the effects of increasing the MTOW of the aircraft.
Figure 17B:
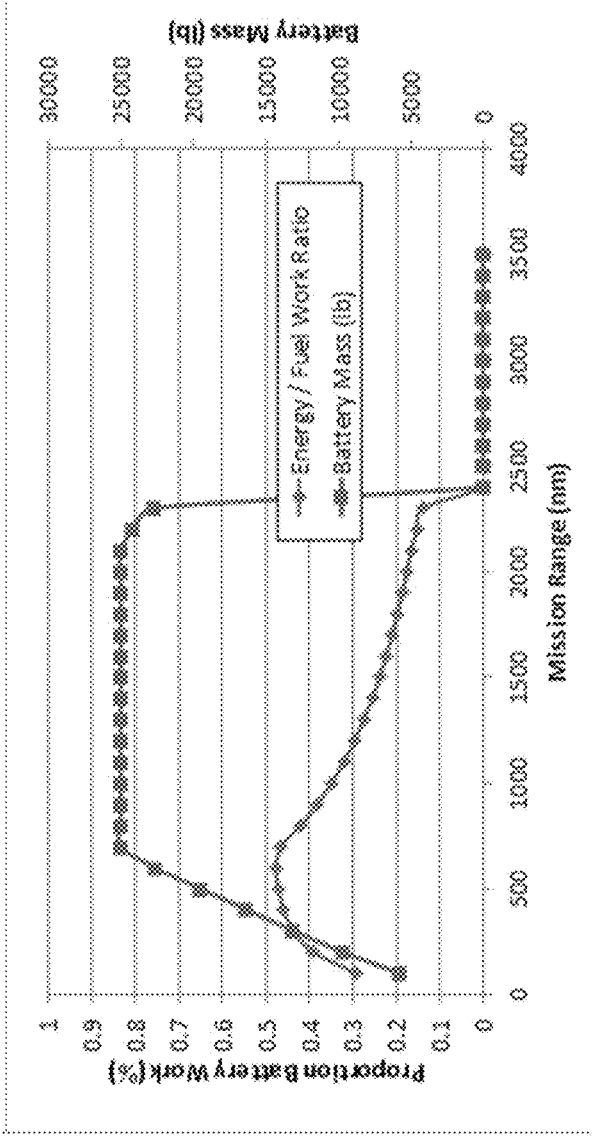

In still another example, FIGS. 17A and 17B illustrate the effects of increasing the MTOW of the aircraft as evaluated by HIBET. In particular, FIG. 17A illustrates the energy/fuel work ratios and the battery masses generated by the HIBET given a first MTOW. FIG. 17B illustrates the energy/fuel work ratios and the battery masses generated by HIBET given a second MTOW, where the second MTOW is 3% larger than the first MTOW.

Figure 18A:
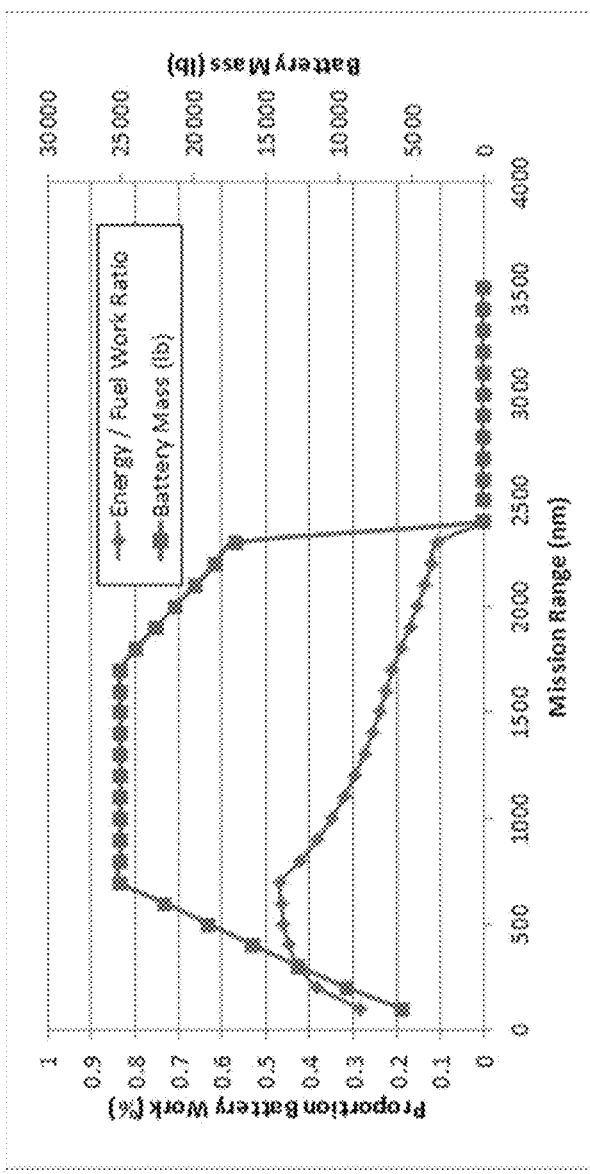
FIGS. 18A and 18B illustrate the effects of changing the value limit constraint.
Figure 18B:
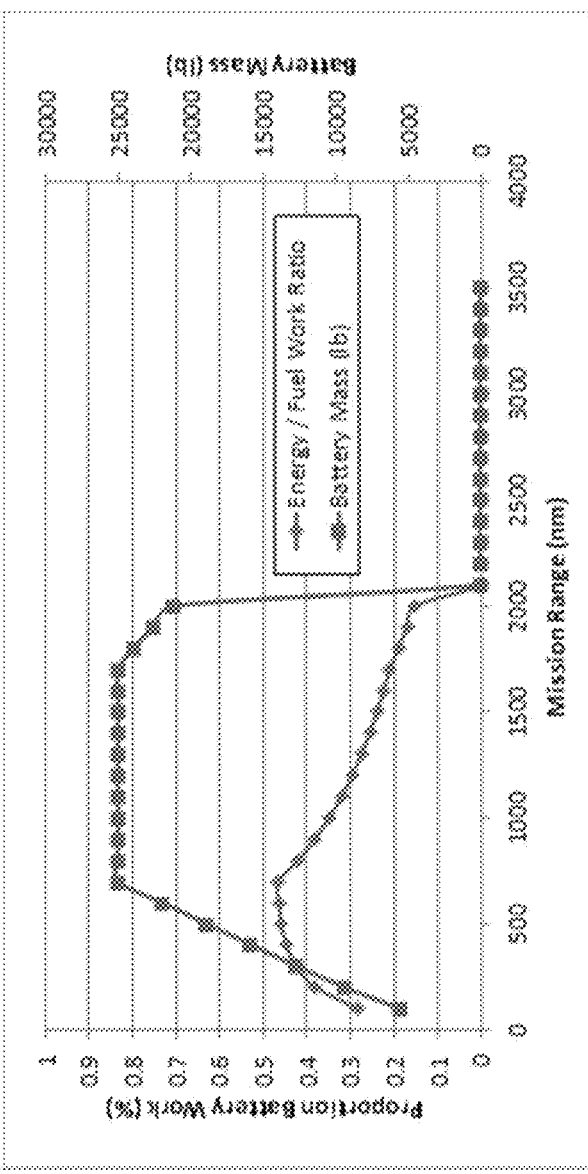

In yet another example, FIGS. 18A and 18B illustrate the effects of changing the value limit constraint as evaluated by HIBET. The value limit constraint changes the range at which hybrid propulsion loses its benefit and is no longer feasible. For example changing the battery cost projection from a low to a high value and reducing the battery salvage value from 50% to 0 may result in lowering the value limit constraint. FIG. 18A illustrates the energy/fuel work ratios and the battery masses generated by the HIBET before changing the battery cost projections and battery salvage value. FIG. 18B illustrates the energy/fuel work ratios and the battery masses generated by HIBET after changing the battery cost projections and battery salvage value.

Listing of HIBET Functions and Variables

Examples of independent input functions are summarized in Table A-1

TABLE A-1

| Independent input variables | Function Description | Excel column/cell |
|---|---|---|
| Projected Year | Year selected for all regression based projection functions/formulas | Cell B3 |
| Operating Mode | Selection of solving parameter. 1 = Solves for maximum displacement of the fuel using battery regardless of cost and emissions whiling achieving mission range, 2 = Solves for minimum cost of energy, 3 = Solves for minimum jet fuel consumption, 4 = Solves for minimum total emissions | Cell B4 |
| Grid Energy Cost Outlook | Level of projection for energy costs, Low through High (L = 1, M = 2, H = 3) | Cell B5 |
| Fuel Cost Projection | Level of projection for jet fuel costs, Low through High (L = 1, M = 2, H = 3) | Cell D3 |
| Nuclear Discount Rate | The discount rate, otherwise referred to as "discounted cash flow analysis" is the effective reduction in future projected profits when accounting for them in today's monetary value. Nuclear is significantly more sensitive to discount rate than coal or gas due to being capital intensive. The discount rate chosen to cost a nuclear power plant's capital over its lifetime is arguably the most sensitive parameter to overall costs and hence levelized cost of electricity (LOCE). At a 3% discount rate nuclear power is typically the cheapest form of energy production. At 7% it is comparable to coal, but still cheaper than gas. At 10% it is comparable to both. | Cell D4 |
| % Nuclear Generation | % of dedicated carbon free energy production for charging batteries, i.e. 40% nuclear would imply 60% is still based on regional grid mix composition | Cell D5 |
| Regional US Grid Composition | Represents the US grid mix of nuclear, renewables, coal and natural gas as per EIA projections | Cell F3 |

TABLE A-1-continued

| Independent Input Variables | | |
|---|---|---|
| Independent input variables | Function Description | Excel column/cell |
| Carbon Tax on Emissions ($/lb) | Tax on total emissions from jet fuel and battery charging | Cell F4 |
| Grid Electricity Rate | Electricity tariff: 1 for Industrial rate, 2 for Commercial rate. It is fair to assume that airport charging would be on the industrial rate. | Cell F5 |
| Battery Salvage Value | % of initial battery cost recaptured in a secondary market | Cell H3 |
| Battery Cost Projection | Level of projection for battery costs, Low through High (L = 1, M = 2, H = 3) | Cell H4 |
| Battery Cycle Life | Number of flights the battery supports prior to its secondary market use | Cell H5 |
| Battery Construction | Lbs carbon produced per lb of produced battery | Cell J3 |
| TeDP | Is the aircraft already a Turbo-electric Distributed Propulsion aircraft (Yes = 1, No = 0). This determines whether the mass of electric machines is already captured in the aircraft OEW mass | Cell J4 |
| Core Thermal Efficiency | Efficiency of extracting the energy from jet fuel to provide thrust energy | Cell J5 |
| Machines & Drives Tech Progress | Level of projection for power density of electrical system, Low through High (L = 1, M = 2, H = 3) | Cell L3 |
| Motor Rating (MW) per Engine | Power rating of each electrical machine in MW | Cell L4 |
| Propulsive Efficiency | Aerodynamic efficiency of the airframe | Cell L5 |
| Battery Progress | Level of projection for energy density of batteries, Low through High (L = 1, M = 2, H = 3). | Cell N3 |
| Maximum Battery Mass | Represents the structural/volumetric limitation of the airframe battery holding capacity | Column N & Cell N4 |
| % Weight Reduction with Optionally Hybrid Engine | If the aircraft is designed to be sold in ether a conventional or hybrid configuration, this represents the % of removal of hybrid equipment when operating in a conventional configuration. If all machines and drives, protection, etc are removed for non-hybrid feasible routes, this would be 100% weight reduction. 0% reduction implies that the motors and power electronics, etc, remain in the aircraft. Note: the batteries are not included in this parameter, their mass is treated separately. | Cell N5 |

Examples of dependent input functions are summarized in Table A-2

TABLE A-2

| Dependent Input Variables | | |
|---|---|---|
| Dependent input variables | Function Descripnon | Excel column/cell |
| $/gallon | Jet fuel price in $/gallon | Cell B7 |
| $/KWh | Electricity cost for charging the batteries in $/KWh | Cell D7 |
| Charging CO2 | Lb of carbon produced per KWh of electrical energy consumed in charging the battery | Cell F7 |
| Carbon Tax on emissions | $/lb of emissions - assumed the same tax rate is applied to jet fuel emissions and emissions from power stations | Cell H7 |
| Battery Cost | $/KWh of battery installed in the aircraft | Cell J7 |
| Total drive power system density | KW/Kg. Average combined power density of power electronics and electrical machines | Cell L7 |
| Energy Density | Battery energy density Wh/Kg | Cell N7 |
| Overall electrical drive efficiency | Average combine efficiency of the power electronics and electrical machine | Cell P7 |

Example airframe input variables are described in Table A-3.

TABLE A-3

| Airframe Input Variables | | |
|---|---|---|
| Independent input variables | Function Description | Excel column/cell |
| Payload/Max Payload | Ratio of actual payload to maximum allowable payload | Cell P3 |
| Takeoff Power per Engine | MW rating of take-off power per engine | Cell P4 |

TABLE A-3-continued

Airframe Input Variables

| Independent input variables | Function Description | Excel column/cell |
|---|---|---|
| Cruise Power per Engine | MW rating cruise power per engine | Cell P5 |
| Max Payload | Max allowable payload | Cell R7 |
| MTOW | Maximum Take-Off Weight | Cell T7 |
| Range (nm) | Flight range in segments of 100 nm | Column A |
| Fuel (lb) | Fuel required for conventional airframe for a given nm - fuel consumption derived from the aircraft model (APD and Mission software) converted to a regression based formula for range, max payload and MTOW | Column B |
| OEW (lb) | Operating Empty Weight;, or Basic Operating Weight for the conventional aircraft; the weight of the conventional aircraft, unfueled with no payload | Column C |
| Payload (lb) | Selected payload for the simulation - product of the maximum payload (Cell R7 and the ratio of Payload to Max Payload (Cell P3). Represents the weight of passengers and their baggage | Column D |

Example functions for a conventional aircraft (per flight) are described in Table A-4.

TABLE A-4

Functions for a conventional aircraft

| Function | Function Description | Excel column/cell |
|---|---|---|
| Fueled TOW (lb) | Total aircraft weight (fuel + oew + payload) | Column E |
| Potential energy (MJ) | MJ of stored potential energy for the lb of fuel; 43.15 MJ/kg; 2.2 lb per kg | Column F |
| Thrust Work (MJ) | Energy converted to thrust after losses associated with core thermal efficiency and propulsive efficiency | Column G |

Example functions for a hybridized aircraft (per flight) are described in Table A-5.

TABLE A-5

Functions for a hybridized aircraft

| Function | Function Description | Excel column/cell |
|---|---|---|
| % Energy Limit | Energy from the motors divided by total energy needed. This column selects one of two algorithms based on: Pm <= Pcr or Pm > Pcr, where Pm is the motor rating and Pcr is required cruise power for the total aircraft weight (fuel + payload + OEW as a ratio of MTOW). Refer to section on % energy limit | Column H |
| Optimized Battery works | Refer to section on optimized battery works | Column I |
| OEW (lb) | Updated OEW to account for electrical motors and displaced fuel (no battery mass included) | Column J |
| Thrust Work (MJ) | Updated energy required to provide thrust with the added weight of electrical system components and batteries | Column K |
| Energy/Fuel Work Ratio | Chooses the lowest value of column H (% energy limit) and column I (optimized battery works) | Column L |
| Battery Energy (MJ) | Calculates the applied (thrust) energy to come from the battery: multiplication of column K and column L | Column M |
| Actual Battery Mass | Selects the minimum of column N or column M applies the inefficiencies to get the actual mass for the actual energy carried, i.e. more than applied energy | Column O |
| Stored Battery Energy (MJ) | Based on column O (actual battery mass) and battery energy density | Column P |
| Stored Fuel Energy (MJ) | Calculates the applied (thrust) energy to come from the fuel: column K (thrust work) less the energy in column P with efficiencies applied | Column Q |
| Fuel Mass | Mass of fuel for the hybridized aircraft based on column Q (fuel mass) | Column R |
|  | Is a check of column I (Optimized battery works) | Column S |
| Energy Mass | Summation of battery mass and fuel mass | Column T |
| Total Mass | Total aircraft weight (fuel + oew + payload + battery) | Column U |

TABLE A-5-continued

Functions for a hybridized aircraft

| Function | Function Description | Excel column/cell |
| --- | --- | --- |
| MTOW Energy Limit | Calculates the factor that determines the optimal split between fuel and battery energy based on Mass constraints and required energy. Refer to section on Solver | Column V |
| Range (nm) | Range; a repeat of column A | Column X |

Example costs for conventional aircraft (per flight) are described in Table A-6

TABLE A-6

Cost variable data for a conventional aircraft

| Costing variables | Function Description | Excel column/cell |
| --- | --- | --- |
| Baseline emissions (lb) | Calculates the mass of carbon emitted by jet fuel as used in engine. For energy lb of fuel there is 3.1 lb of carbon emission. | Column Y |
| Fuel Cost ($) | Column B (fuel mass) multiplied by cost rate | Column Z |
| Carbon Tax ($) | column Y (baseline emissions) multiplied by carbon tax on emissions ($/lb) | Column AA |
| Baseline Cost ($) | Column Z (fuel cost) added to column AA (carbon tax) | Column AB |

Example costs for hybridized aircraft (per flight) are described in Table A-7

TABLE A-7

Cost variable data for a hybridized aircraft

| Costing variables | Function Description | Excel column/cell |
| --- | --- | --- |
| Emissions fuel (lb) | Calculates the mass of carbon emitted by jet fuel as used in hybridized engine. For energy lb of fuel there is 3.1 lb of carbon emission. | Column AD |
| Emissions Battery/Energy (lb) | Calculates the emissions produced in charging the battery and in construction of the battery | Column AE |
| Total Emissions (lb) | Addition of the fuel and battery emissions | Column AF |
| Cost Fuel ($) | Column R (fuel mass) multiplied by cost rate | Column AG |
| Cost Battery/Energy ($) | Addition of the cost of charging the battery and the cost of purchasing the battery | Column AH |
| Carbon Tax ($) | Column AF (total emissions) multiplied by carbon tax on emissions ($/lb) | Column AI |
| Total energy Cost ($) | Addition of cost of fuel (column AG), cost of battery & its energy(column AH) and the cost of carbon tax (column AI) | Column AJ |

Examples of hybridized outputs are provided in Table A-8.

TABLE A-8

Output data for a conventional aircraft

| Output variables | Function Description | Excel column/cell |
| --- | --- | --- |
| Relative Cost (%) | Difference between hybrid and conventional total energy costs ratioed to the conventional. Negative value represents a reduction in cost compared to the conventional | Column AL |
| Relative emissions (%) | Difference between hybrid and conventional emissions ratioed to the conventional. Negative value represents a reduction in cost compared to the conventional | Column AM |
| Relative on-board emissions (%) | Difference between hybrid and conventional jet fuel emissions ratioed to the conventional. Negative value represents a reduction in jet fuel based emissions compared to the conventional | Column AN |

TABLE A-8-continued

Output data for a conventional aircraft

| Output variables | Function Description | Excel column/cell |
|---|---|---|
| Fleet usage distribution | Uses a lookup function to extract weightings on the usage distribution of an aircraft for each of the ranges. This applies the weightings for aircraft mission usage against each 100 nm range. Refer to aircraft usage distribution. | Column AP |
| Fleet usage distribution | | Column AQ |

Examples of single payload results are provided in Table A-9.

TABLE A-9

Single payload results data for a hybridized aircraft

| Results | Function Description | Excel column/cell |
|---|---|---|
| Average energy cost delta for single payload | Weighted baseline cost (columns AB*AQ) less the weighted total energy cost (columns AJ*AQ) | Cell S3 |
| Delta in fuel cost per flight for single payload | Weighted conventional fuel cost (columns Z*AQ) less the weighted hybrid fuel cost(columns AG*AQ) | Cell S4 |
| Delta in energy cost per flight for single payload | Weighted Cost Battery/Energy (columns AH*AQ) | Cell S5 |
| Max battery range for single payload | Looks up the maximum "stored battery energy" (column P) and returns the corresponding "range" (column X) | Cell U3 |
| Max battery mass for single payload | Looks up the maximum "battery mass" (column O) and returns its value | Cell U4 |
| Fleet average emissions delta for single payload | Weighted baseline emissions (columns Y*AQ) less the weighted total hybrid emissions (columns AF*AQ) | Cell U5 |

Details of Mathematical Functions
Conventional Aircraft:
Column A: Range (nm)
Column B: Fuel (lb)
=(0.00000004*(MaxPayload$_{Cell.R7}$*Payload$_{Cell.P3}$/MaxPayload$_{Cell.R7}$)−0.0007)*Range$_{Col.A}$^2+(−0.00002*(MaxPayload$_{Cell.R7}$*Payload$_{Cell.P3}$/MaxPayload$_{Cell.R7}$)+8.0997)*Range$_{Col.A}$+(0.0076*(MaxPayload$_{Cell.R7}$*Payload$_{Cell.P3}$/MaxPayload$_{Cell.R7}$)+2265.1)
Column C: OEW (lb)
Constant
Column D: Payload (lb)
Constant
Column E: Fueled Take-Off Weight (lb)
=Fuel mass$_{col.B}$+OEW$_{col.C}$+Payload mass$_{col.D}$
Column F: Potential Energy (MJ)
=Fuel mass$_{col.B}$×(43.15/2.2)
Column G: Thrust Work (MJ)
=Potential Energy$_{col.F}$×η$_{t_{cell.j5}}$×η$_{p_{cell.L5}}$
Energy Analysis
Column H: % Energy Limit
Refer to section
Column I: Optimized Battery Works %
Refer to section
Hybridized Aircraft Column J: OEW (lb) =

$$OEW_{col.C} + 2 \times \left(\frac{2.2 \times P_m}{1000}\right) \Big/ \text{total drive system power density}$$

(NOTE: If TeDP, then for the case that hybrid not feasible, hybrid weight reduction per Cell N5)

$$\text{Column } K: \text{Thrust Work } (MJ) = \text{Thrust Work}_{col.G} \times \frac{\text{Total Mass}_{Col.U}}{\text{Fueled } TOW_{Col.E}}$$

Column L: Energy/Fuel Work Ratio
=Minimum of % Energy Limit$_{Col.H}$ and Optimized Battery Works$_{Col.I}$
Column M: Battery Energy (MJ)
=Energy/Fuel Work Ratio$_{Col.L}$×Thrust Work$_{col.K}$
Column N: Max Battery Mass (lb)
Defined by Cell N4
Column O: Actual Battery Mass (lb)
Minimum of Max Battery Mass$_{Col.N}$ and actual required battery mass:

$$\frac{\text{Battery Energy}_{Col.M}}{\eta_{e_{Cell.P7}} \times \eta_{p_{Cell.L5}}} \div \text{Battery energy density}_{Cell.N7} \Big/ \left(\frac{277.778}{2.2}\right)$$

Column P: Stored Battery Energy (MJ) =

$$\text{Actual battery mass}_{Col.O} \times \text{Battery energy density}_{Cell.N7} \Big/ \left(\frac{277.778}{2.2}\right)$$

Column Q: Stored Fuel Energy (MJ) =

$$\text{Thrust Work}_{Col.K} - \left(\frac{\text{Stored battery energy}_{Col.P} \times \eta_{e_{Cell.P7}} \times \eta_{p_{Cell.L5}}}{\eta_{t_{Cell.J5}} \times \eta_{p_{Cell.L5}}}\right)$$

Column R: Fuel Mass (lb) = 2.2 × Stored Fuel Energy$_{Col.Q}$/43.15

Column S: This is check to insure the electrical and fuel energy ratio is as suggested by the optimized battery works; i.e. a check against Column I:

$$\frac{\text{Stored battery energy}_{Col.P} \times \text{Overall electrical erive efficiency}_{Cell.P7}}{(\text{Stored Battery energy}_{Col.P} \times \text{Overall electrical erive efficiency}_{Cell.P7}) + (\text{Stored fuel energy}_{Col.Q} \times \text{Core thermal efficiency}_{Cell.J5})}$$

Column T: Energy Mass (lb)
=Fuel mass$_{Col.R}$+Battery mass$_{Col.O}$
Column U: Total Mass (lb)
=Battery mass$_{Col.O}$+Fuel mass$_{Col.R}$+OEW$_{Col.J}$+Payload$_{Col.D}$
Column V: MTOW Energy Limit
Refer to section
Baseline Operating Costs (Conventional Aircraft)
Column Y: Baseline Emissions (lb)
=Fuel$_{Col.B}$×3.1
Column Z: Fuel Cost ($)
=Fuel$_{Col.B}$×6.79
Column AA: Carbon Tax ($)
=Baseline emissions$_{Col.Y}$×Carbon tax on emissions$_{Cell.H7}$
Column AB: Baseline Cost ($)
=Fuel cost$_{Col.Z}$+Carbon Tax$_{Col.AA}$
Hybrid Operating Costs Column AD: Emissions Fuel (lb) = Fuel mass$_{Col.R}$ × 3.1

Column AE: Emissions Battery/Energy (lb) =

$$\frac{\text{Charging}CO2_{Cell.F7} \times \text{Stored battery energy}_{Col.P} \times 277.778}{1000} + \frac{\text{Battery construction carbon}_{Cell.J3}}{\text{Battery life cycle}_{Cell.H5} \times \text{Battery mass}_{Col.O}}$$

Column AF: Total Emissions (lb) =

Emissionsfuel$_{Col.AD}$ + Emissions battery/energy$_{Col.AE}$

Column AG: Cost Fuel ($) Fuel mass$_{Col.R}$ × $/gallon$_{Cell.B7}$ / 6.79

Column AH: Cost Battery/Energy ($) =

$$\text{Stored battery energy}_{Col.P} \times \$/KWh_{Cell.D7} \times \left(\frac{277.778}{1000}\right) + \left(\frac{\text{Battery mass}_{Col.O}}{\text{Battery cycle life}_{Cell.HS}} \times \frac{\text{Battery costs}_{Cell.J7} \times \text{energy density}_{Cell.N7}}{1000 \times 2.2}\right)$$

Column AI: Carbon Tax ($) =

Total emissions$_{Col.AF}$ × Carbon tax emissions$_{Cell.H7}$

Column AJ: Total Energy Cost ($) =

Cost fuel$_{Col.AG}$ + Cost battery energy$_{Col.AH}$ + Carbon tax$_{Col.AI}$

Outputs

Column AL: Relative Cost (%)

$$\frac{\text{Total energy cost}_{Col.AJ} - \text{Baseline cost}_{Col.AB}}{\text{Baseline cost}_{Col.AB}}$$

Column AM: Relative Emissions ($)

$$\frac{\text{Total emissions}_{Col.AF} - \text{Baseline emissions}_{Col.Y}}{\text{Baseline emissions}_{Col.Y}}$$

Column AN: Relative On-Board Emissions $$\frac{\text{Emissions fuel}_{Col.AD} - \text{Baseline emissions}_{Col.Y}}{\text{Baseline emissions}_{Col.Y}}$$

EXAMPLE FLEET ANALYSIS

As mentioned above, HIBET is able to reference a lookup table of typical aircraft utilizations across flight ranges and numbers of passengers. This enables an analysis of the benefit of hybridization across a whole fleet of one type of aircraft.

A first input received by the HIBET may be information about the aircraft under investigation. FIG. 19 is an example of a graphical user interface generated by HIBET through which aircraft data may be entered. An operator may define characteristics of the aircraft under investigation in, for example, the left two columns. A couple of options in the left column relate to assumptions made in the calculation about the added weight that a hybrid system adds to the baseline aircraft weight. For example, pax payload, MTOW, operating empty weight (OEW), % weight reduction with optionally hybrid aircraft, and maximum battery mass. In the center cells of the graphical user interface, the aircraft's operating sequence is defined, with a power defined for each stage of flight along with either a time and/or a range defined. The cruise range may be a variable for which the tool calculates a series of values for, which will be shown below.

Figure 20:
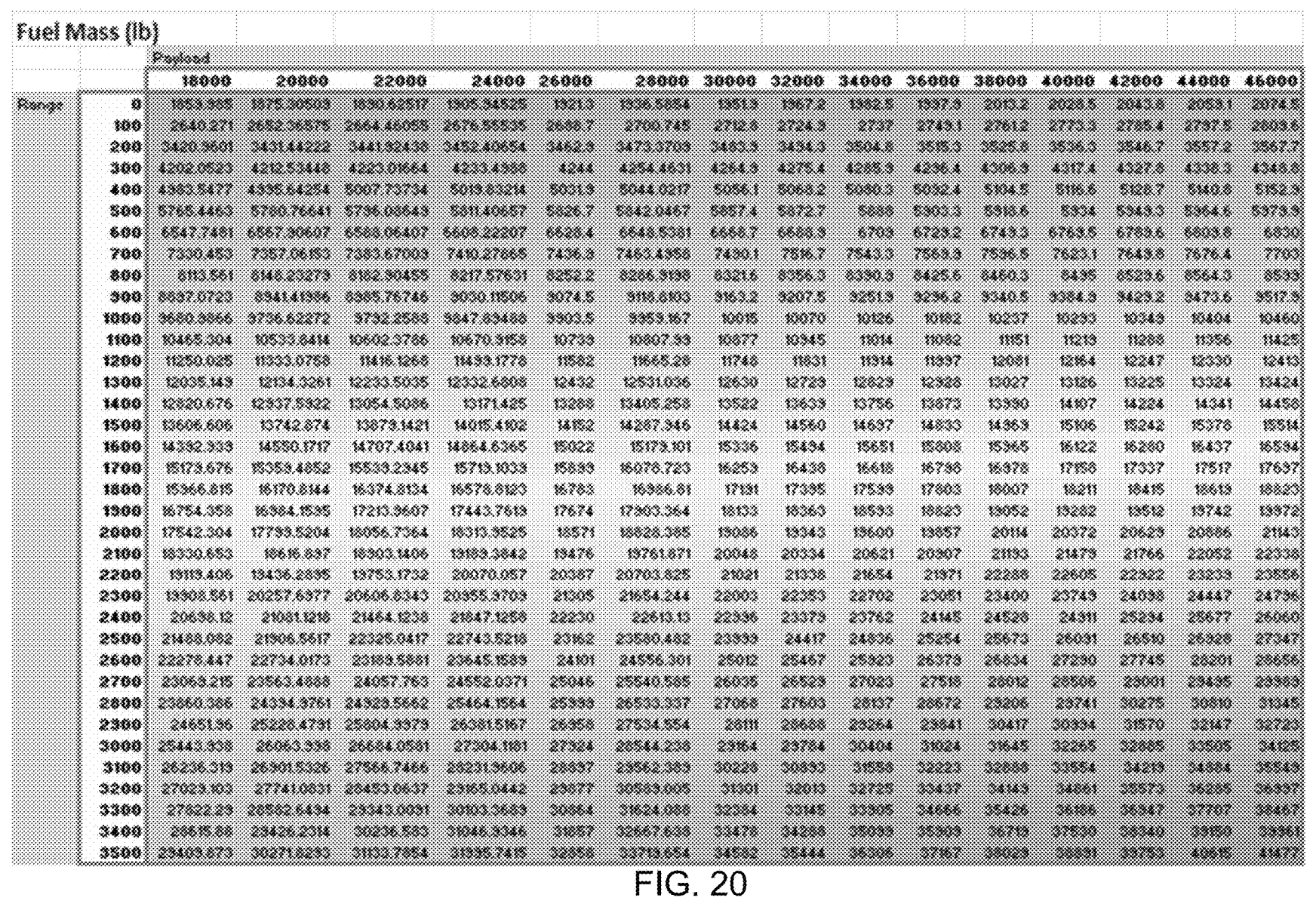

A second input of the HIBET may be a fuel mass map for the aircraft. As shown in FIG. 20, the fuel mass map may include a table of cells, where each cell of the table indicates a fuel mass required for a corresponding payload and corresponding mission range. Shown in FIG. 20, is performance data obtained from the aircraft manufacturer, operators, an engine manufacturer, and/or other source. Here, the required fuel mass is reduced to a function of two variables: the range of the flight and its payload weight. Accordingly, the fuel mass map may be table that includes cells, where each cell includes a fuel mass (for a conventional aircraft) required to complete a flight, and the rows and columns are flight ranges and payload weight, respectively. The fuel mass may be used by the HIBET to provide an estimate of energy required for the given platform for a given flight mission.

Figure 21:
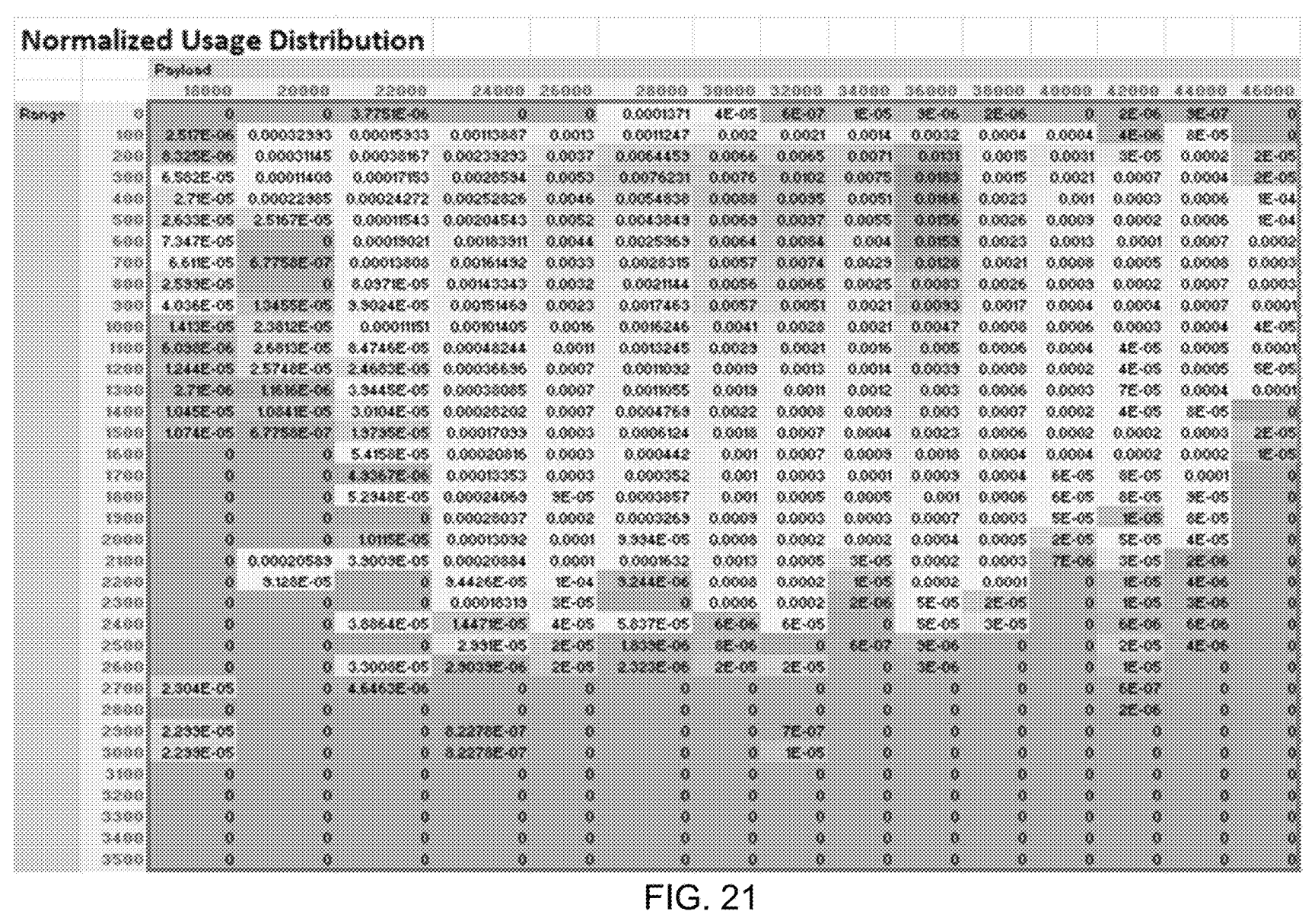

A third input of the HIBET may be a table that includes a distribution of mission profiles (payloads and ranges) that the aircraft under investigation made over a time period. This data may be used by the tool to extrapolate an estimated energy-usage benefit across the entire operating fleet of the type of aircraft under investigation. FIG. 21 illustrates an example table of mission distributions for the aircraft, where each cell in the table indicates the frequency that the aircraft made a flight of a corresponding payload and a corresponding range. For example, each cell may include the number of times any of the aircrafts in the fleet flew a mission with that combination of payload and range divided by the total number of missions flown by the aircraft in the fleet.

With the characteristics of the aircraft under investigation sufficiently provided, the tool may collect information about either current or hypothetical economic and technological factors that may affect the cost of energy (fuel or electric), cost of components, and/or weight of the aircraft in an estimated hybrid-electric configuration. FIG. 22 illustrates an example of a graphical user interface to receive economic and technological variables pertaining to energy and hybrid component cost.

FIG. 23 illustrates an example of a graphical user interface configured to receive additional technological factors and general characteristics of a conventional turbine engine that the hybrid system will be compared against. In this example, the HIBET incorporates projections for each of the economic and technological factors that go into factoring the energy cost of conventional and hybrid electric propulsion systems. The projections are then used to create formulae that accept a projection year and a "level of progress" from, for example, 1-3. This allows the user to quickly and easily run batches of hypothetical scenarios, which helps generate an understanding of which factors heavily influence the energy cost benefit of hybrid-electric systems.

FIG. 24 shows an example of a graphical user interface configured to receive details of the aircraft hybrid-electric system from a user. As an example, user inputs may be received in the two lightest colored input fields 2402 and 2404 relating to a "subfleet" definition. In particular, a subfleet max payload 2402 and a subfleet max range 2404 may be entered. Hybrid-electric propulsion generally benefits shorter-range flights the quickest. To capture the benefit that the hybrid system brings to the short-range flights while not punishing the system for being more inefficient on longer-haul flights, the "subfleet" option was created which sets a cap on the range of a mission that the hybrid system would be calculated to perform. This is equivalent of the HIBET assuming that a short-range hybrid option may be operated in dense, short-haul markets, such as the Eastern US, while the longer-haul flights may be serviced instead by aircraft with conventional turbine variants. The content of the two lightest colored input fields 2402 and 2404 may be copied information from the aircraft inputs shown in FIG. 19.

FIG. 25 illustrates an example of a graphical user interface showing a table of economic and technological variables that pertain to energy and hybrid system component costs. Varying the year and the various input factors affect the output variables in this table, which are then utilized in the upcoming energy and cost calculations.

Figure 26:
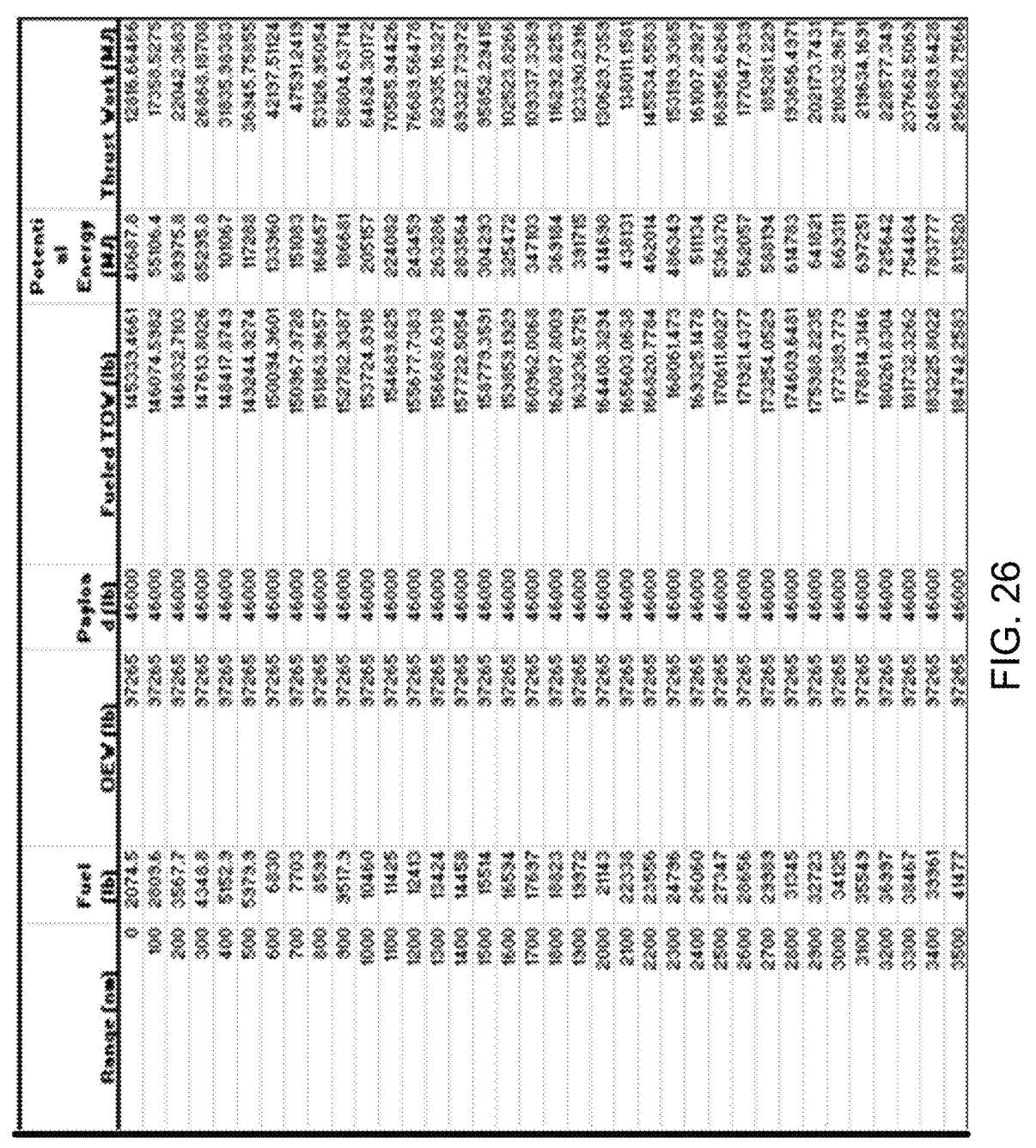

FIG. 26 illustrates an example graphical user interface displaying energy requirement calculations of the aircraft. For example, FIG. 26 depicts the initial energy requirement calculations of the user-defined aircraft using the airframe and mission definition, and fuel mass, from FIGS. 1 and 2. The energy in fuel is then converted to thrust work using the conventional turbine performance inputs from FIGS. 5 and 6.

Once the amount of energy has been calculated for each range increment, the tool uses the economic and technological factors shown in FIG. 25 to convert that into an energy cost for the conventional turbine engine aircraft, in terms of, for example, fuel cost, emissions, and taxes on those emissions. FIG. 27 illustrates an example of a graphical user interface displaying energy cost calculation of conventional turbine-powered aircraft based on the output table of economic and technological variables.

With the required energy and associated cost of the conventionally powered aircraft determined, the tool then calculates the corresponding values for the hybrid-electric system. The first step is depicted in FIG. 28. FIG. 28 illustrates a graphical user interface displaying the required energy calculation during each stage of the mission for a hybrid-electric aircraft. Examples of mission stages include a taxi stage, a climb stage, a cruise stage, and a descent stage.

For each range interval, the mission of the specified hybrid aircraft is broken up into the stages taxi out, climb, cruise, descent and taxi in. The amount of energy required for each stage is calculated then totaled in the right-most column.

Then, similarly to the required energy calculation, the energy available from the electric powertrain for each stage is derived from the aircraft, economic, and technological input parameters. This maximum available hybridization energy (in other words, available from the electric powertrain) is depicted in FIG. 29. FIG. 29 illustrates an example of a graphical user interface displaying maximum energy during each stage of the mission for a hybrid-electric aircraft.

Figure 30:
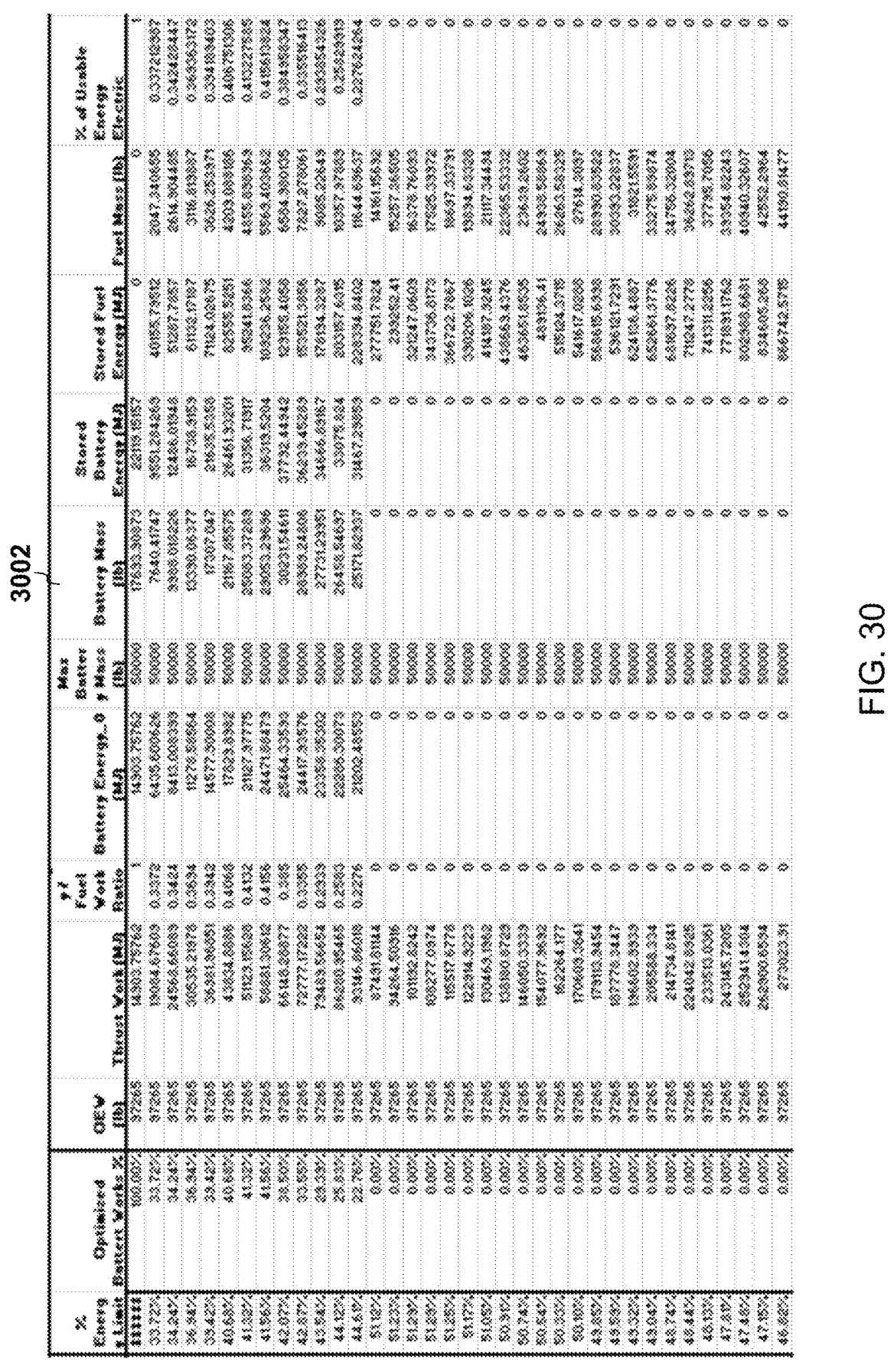

The available energy from the hybrid system is then divided by the total energy needed (for each range increment) to arrive at the maximum percentage of energy that the defined hybrid system may source for the defined flight profile in the defined economic conditions with the defined technological conditions. The result of the division is shown in the column labeled "% Energy Limit" of FIG. 30. FIG. 30 illustrates an example of a graphical user interface displaying this "% Energy Limit", which is related to the power limit. The power limit may be a percentage of total energy required and averaged over the entire flight mission. The hybrid system is then analyzed by first adding to the amount of thrust work the hybrid aircraft based on the increased weight of the system and the increased drag needed to cool the components (an adjustable setting in FIG. 24). The battery/fuel work ratio is chosen as the minimum of the optimized battery works percentage and the % energy limit.

The optimized battery limit is an interesting lever because, in one example, the optimized battery limit is, for any particular range, the minimum of the % Energy Limit (a variation of the power limit) or the Maximum-Take-Off-Weight (MTOW) limit (shown in FIG. 31). Alternatively, by changing the operating mode (in other words, the optimization mode), the HIBET may determine the optimized battery limit as, for any particular range, the minimum of the % Energy Limit and: the lowest-cost energy mixture, the energy mixture resulting in the lowest fuel emissions, or even total emissions (including the carbon released in generating the electricity stored in the batteries).

Once the percentage of battery (in other words, the optimized battery limit) is determined, the HIBET may calculate the battery weight and energy based on the economic and technological inputs. The remaining energy needed comes from fuel, so the required fuel energy and weight is obtained therefrom. This section of the calculation may be recursive, because the amount of battery energy to install on the aircraft depends on the thrust work required, which depends on the weight of the aircraft, which depends on the amount of battery in the aircraft. The HIBET is designed in a way which allows this calculation to occur rapidly. FIG. 30 illustrates an example of a graphical user interface that displays an indication 3002 of the amount of battery to install on defined hybrid-electric aircraft for each interval of a mission range. The indication 3002 of the amount of battery to install includes a battery mass in this example.

FIG. 31 shows the last three columns of the calculations described in the previous paragraph about FIG. 30. In particular, FIG. 31 shows the total energy and mass defined for the hybrid-electric aircraft and the MTOW Limit that is described above.

FIG. 32 illustrates an example of a graphical user interface displaying the emissions and the costs associated with the conventional gas-turbine version of the aircraft under investigation from the fuel quantity shown in FIG. 26 and from the economic inputs. Each of the depicted emissions and costs corresponds to a respective mission range.

Figure 33:
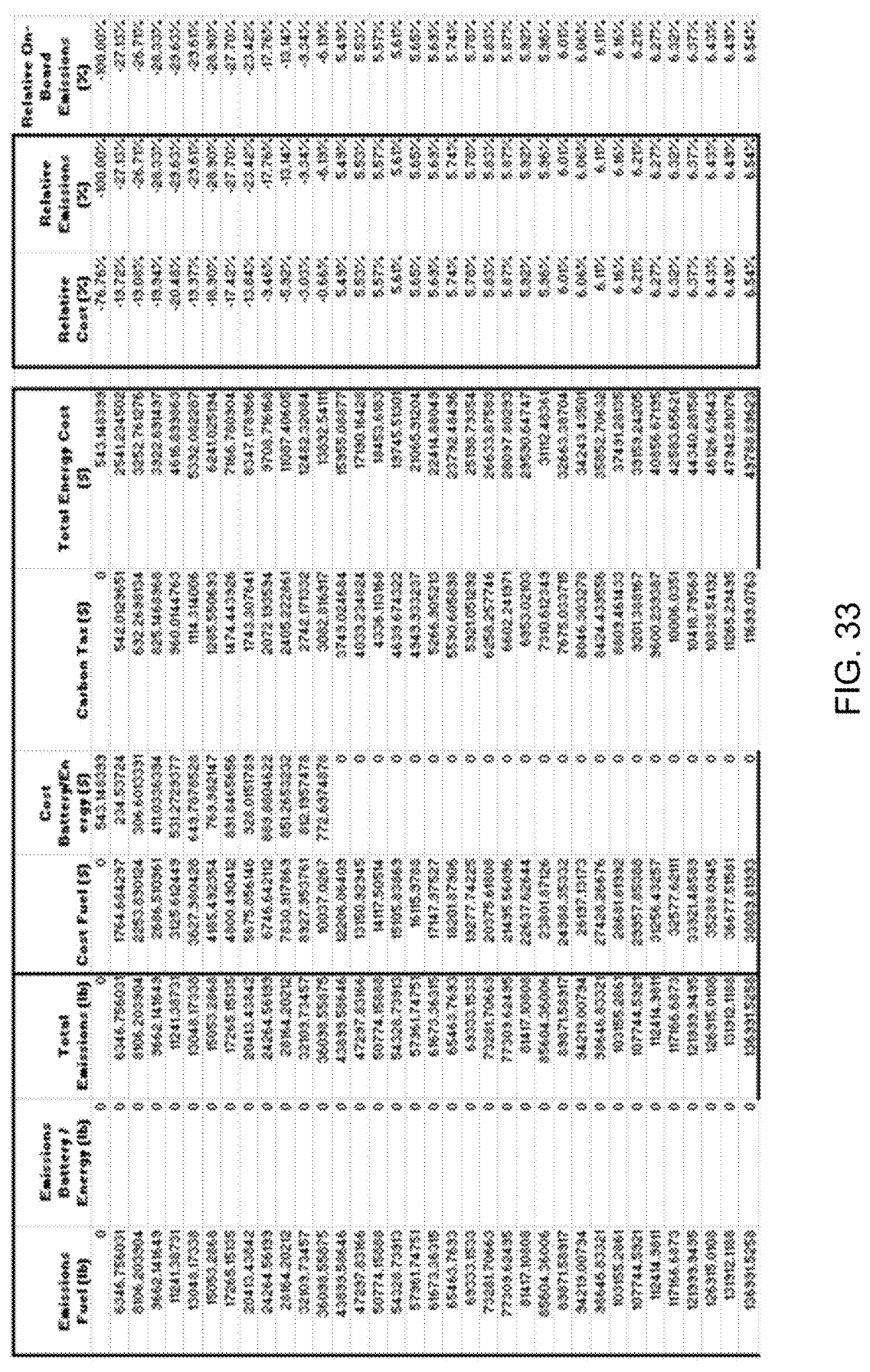

FIG. 33 illustrates an example of a graphical user interface displaying the emissions and the costs associated with the hybrid-electric version of the aircraft from the fuel quantity in FIG. 30 and the economic inputs. The battery energy emissions may be calculated from user-input on the percentage of renewable energy powering the electrical grid. In the right-most columns, the cost and emissions of the hybrid system are compared directly with the conventional gas-turbine.

With the individual flight costs and emissions determined for each mission range of the defined aircraft and economic conditions, the tool can utilize the fleet data (from FIG. 21) to estimate the benefit of an entire fleet of hybrid-electric aircraft. The size of the measured benefit can range in scope from a subset of a single operator to the entirety of the specified aircraft globally, and is entirely user-defined.

To accomplish this calculation, the distribution of flights at the user-defined payload is selected and normalized. FIG. 34 illustrates an example of a graphical user interface displaying a table for normalizing the distribution of flights of the defined airframe with the defined payload. Then the fuel-usage of the conventionally-powered aircraft version is compared to the hybrid-powered version of the aircraft, calculated as described above. Some columns contain zeros where numbers might be expected. The max hybrid flight range is user-defined in the table shown in FIG. 24, as "SubFleet Max Range". This allows the user to define a maximum range of hybrid-electric flight missions under investigation, which is currently the most efficient (and cost effective) way for an operator to plan flights. It is one way to help prevent the tool from penalizing the hybrid architecture for the less-efficient longer flights versus the more-efficient shorter flights.

The product of the conventionally-powered energy cost for each mission range and usage distribution and subtracted from the hybridized cost to arrive at a cost savings on an average per-flight basis. The same is also performed for the emissions.

FIG. 35 illustrates an example of a graphical user interface displaying average per-flight fuel cost and emissions savings of the defined aircraft and payload. The HIBET in some examples may extrapolate the average per-flight cost and emissions to a user-defined fleet size in the table shown in FIG. 36. FIG. 36 illustrates an example of a graphical user interface displaying fleet-averaged results of aircraft hybridization.

In some examples, the user may set the size of the fleet under investigation to arrive at the total fleet-wide cost effect of implementing hybrid-electric propulsion systems on the targeted aircraft. FIG. 37 illustrates an example of a graphical user interface displaying the total annual fleet-wide savings due to hybridizing the fleet.

Figure 38:
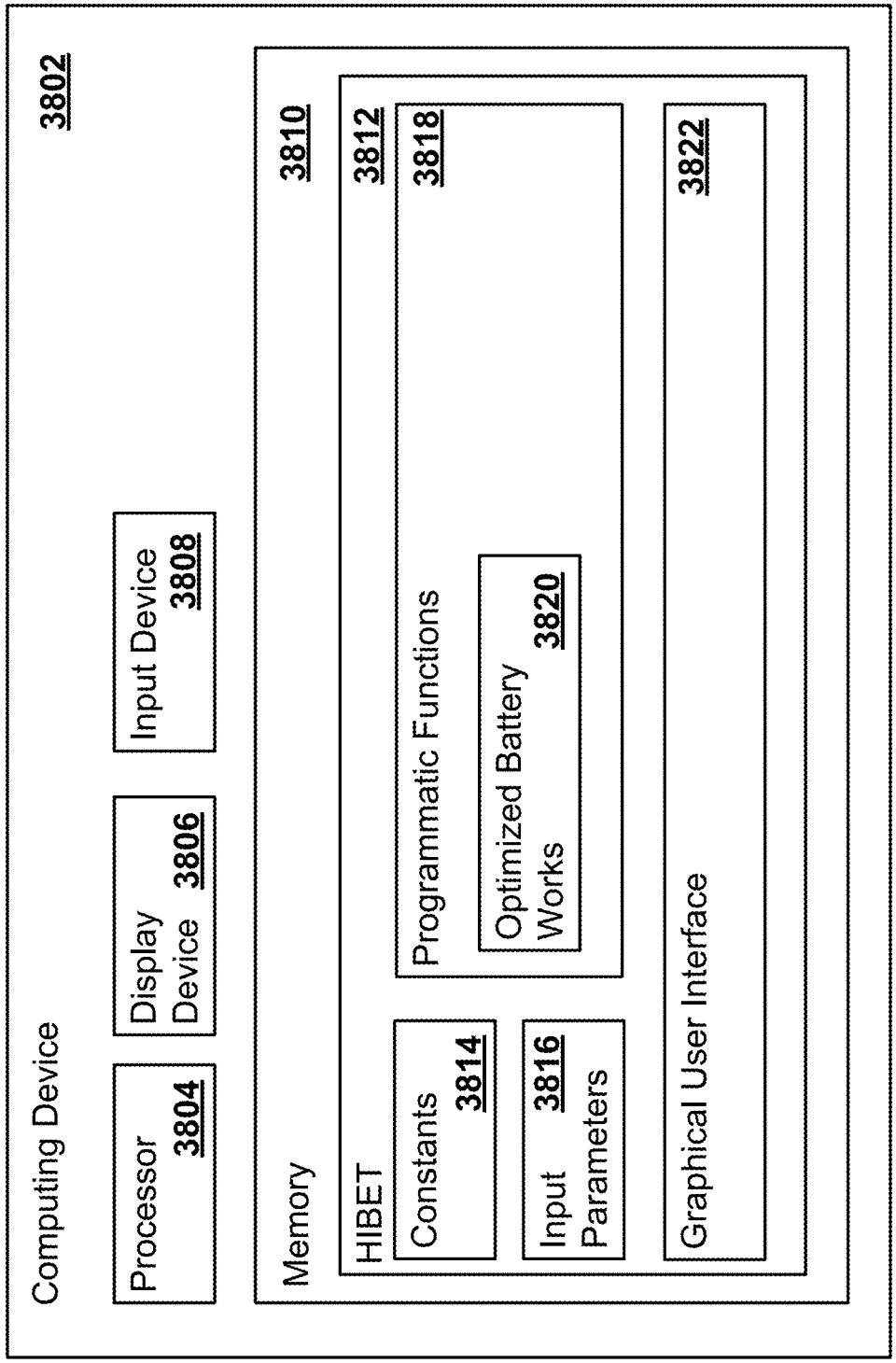
FIG. 38 illustrates an example of a computing device or system that includes HIBET.

As mentioned above, HIBET may be implemented in software. FIG. 38 illustrates an example of a computing device 3802 or system that includes HIBET 3812. Examples of the computing device 3802 include a desktop computer, a laptop computer, a server machine, a blade server, a mobile device, a tablet device, a mobile phone, an internet of things (IoT) device, an embedded system, or any other apparatus configured to execute software.

The computing device 3802 or system shown in FIG. 38 includes a processor 3804, a display device 3806, an input device 3808, and a memory 3810. HIBET 3812 is included in the memory 3810. HIBET 3812 includes constants 3814, input parameters 3816, programmatic functions 3818, and a graphical user interface 3822. Examples of the constants 3814, the input parameters 3816, and the programmatic functions 3818 are described above. One example of the programmatic functions 3818 described herein includes an optimized battery works module 3820. The optimized battery works module is configured to perform the optimized battery works programmatic function described in detail above.

The memory 3810 may be any device for storing and retrieving data or any combination thereof. The memory 3810 may include non-volatile and/or volatile memory, such as a random access memory (RAM), a read-only memory (ROM), an erasable programmable read-only memory (EPROM), or flash memory. Alternatively or in addition, the memory 3810 may include an optical, magnetic (hard-drive) or any other form of data storage device.

The processor 3804 may be any device that performs logic operations. The processor 3804 may be in communication with the memory 3810. The processor 3804 may also be in communication with additional components, such as the display device 3806 and the input device 3808. The processor 3804 may include a general processor, a central processing unit, a server device, an application specific integrated circuit (ASIC), a digital signal processor, a field programmable gate array (FPGA), a digital circuit, an analog circuit, a controller, a microcontroller, any other type of processor, or any combination thereof. The processor 3804 may include one or more elements operable to execute computer executable instructions or computer code embodied in the memory 3810 or in other memory.

The display device 3806 may be any electro-optical device for displaying data. Examples of the display device 3806 may include a liquid crystal display (LCD), an organic light-emitting diode (OLED), a cathode ray tube (CRT), an electro-luminescent display, a plasma display panel (PDP), a vacuum florescent display (VFD), a touch screen or any other type of display device. The display device 3806 may be integral to the computing device 3802 or a discrete component separate from the computing device 3802. Examples of the input device 3808 include a keyboard, a mouse, a keypad, a stylus, a touch screen, and/or any other device configured to receive human input.

The graphical user interface (GUI) 3822 is a type of user interface which facilitates human interaction with electronic devices, such as computers, hand-held devices, mobile devices, household appliances and office equipment. The GUI 3822 may offer graphical icons, and visual indicators as opposed to text-based interfaces, typed command labels or text navigation to fully represent the information and actions available to a user. The actions may be performed through direct manipulation of the graphical elements. The GUI 382 may include software, hardware, or a combination thereof through which people interact with a machine, device, computer program or any combination thereof. Examples of the GUI 3822 may include a web page, a rendered display page, or any other data structure describing how a display screen or a portion of a display screen is to be displayed. The GUI 3822 is depicted as being included in HIBET 3812. Alternatively, the GUI 3822 may be generated by a different component, such as a spreadsheet application, in response to programmatic functions 3818 included in HIBET 3812.

Each component may include additional, different, or fewer components than depicted. For example, the programmatic functions 3818 may include many modules in addition to the optimized battery works 3820.

Figure 39:
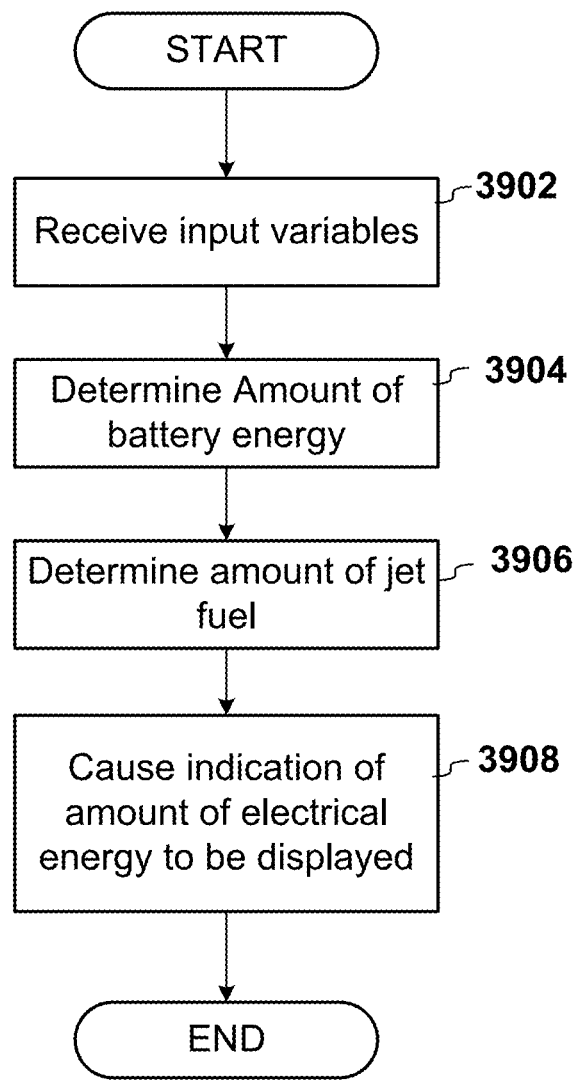
FIG. 39 illustrates a flow diagram of an example of steps performed by HIBET.

FIG. 39 illustrates a flow diagram of an example of steps performed by HIBET 3812. The steps may include additional, different, or fewer operations than illustrated in FIG. 39. The steps may be executed in a different order than illustrated in FIG. 39.

Operations may begin by receiving (3902), prior to a flight by a hybrid electric aircraft, an indication of a limitation of battery mass for the hybrid electric aircraft.

Operations may continue by determining (3904), based on the indication of the limitation of battery mass and prior to the flight, an amount of electrical energy and determining (3906) an amount of jet fuel necessary for the hybrid electric aircraft to complete the flight based on an optimization of an energy split between the electrical energy and the jet fuel.

Operations may complete by causing (3908) an indication of the amount of electrical energy and/or the amount of jet fuel to be displayed in the graphical user interface 3822 and/or to be otherwise outputted. For example, the indication of the amount of electrical energy may be outputted as an audio signal.

The computing device 3802 or system may be implemented in many different ways. Each module, such as the optimized battery works module 3820, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 3810, for example, that comprises instructions executable with the processor 3804 or other processor to implement one or more of the features of the module. When any one of the modules includes the portion of the memory that comprises instructions executable with the processor, the module may or may not include the processor. In some examples, each module may just be the portion of the memory 3810 or other physical memory that comprises instructions executable with the processor 3804 or other processor to implement the features of the corresponding module without the module including any other hardware. Because each module includes at least some hardware even when the included hardware comprises software, each module may be interchangeably referred to as a hardware module.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device. However, the computer readable storage medium is not a transitory transmission medium for propagating signals.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

What is claimed is:

1. A non-transitory computer readable storage medium comprising a plurality of computer executable instructions, the computer executable instructions executable by a processor, the computer executable instructions comprising:
    instructions executable to receive, prior to a flight by a hybrid electric aircraft, an indication of a limitation of battery mass for the hybrid electric aircraft;
    instructions executable to determine, based on the indication of the limitation of battery mass and prior to the flight, an amount of electrical energy and an amount of jet fuel necessary for the hybrid electric aircraft to complete the flight based on an optimization of an energy split between the electrical energy and the jet fuel; and
    instructions executable to cause an indication of the amount of electrical energy and the amount of jet fuel to be displayed in a graphical user interface and/or to be otherwise outputted.

2. The computer readable storage medium of claim 1, wherein the optimization of the energy split includes maximizing a battery usage based on the hybrid electric aircraft initially having a Maximum Take-Off Weight (MTOW), while maintaining a sufficient overall energy mix in order to complete the flight.

3. The computer readable storage medium of claim 2, wherein the optimization includes maximizing the battery usage regardless of a cost of the battery usage relative to jet fuel usage and regardless of emissions.

4. The computer readable storage medium of claim 2, wherein the optimization includes maximizing the battery usage yet minimizing relative cost by preventing a cost of the battery usage by the hybrid electric aircraft with a battery from exceeding a cost of jet fuel usage by the hybrid electric aircraft without the battery.

5. The computer readable storage medium of claim 2, wherein the optimization includes maximizing the battery usage yet minimizing fuel consumption by preventing a burn of more fuel by the hybrid electric aircraft with a battery than the hybrid electric aircraft without the battery due to an increased energy demand caused by the weight of the battery.

6. The computer readable storage medium of claim 2, wherein the optimization includes maximizing the battery usage yet minimizing emissions by preventing emissions generated by the hybrid electric aircraft carrying a battery from exceeding emissions generated by the hybrid electric aircraft not carrying the battery because of an increased energy demand caused by the weight of the battery.

7. The computer readable storage medium of claim 1, wherein the indication of the amount of electrical energy and the amount of jet fuel indicates a battery size and/or a number of batteries to install in the hybrid electric aircraft.

8. The computer readable storage medium of claim 1, wherein the indication of the amount of electrical energy and the amount of jet fuel includes a ratio of fuel to electric energy storage.

9. The computer readable storage medium of claim 1, wherein the computer executable instructions that are executable by the processor are included in a spreadsheet file stored on the computer readable storage medium.

10. A method comprising:
    determining an amount of electrical energy and an amount of jet fuel necessary for a hybrid electric aircraft to complete a flight based on a range of the flight, a payload of the hybrid electric aircraft, an indication of a battery mass limitation of the hybrid electric aircraft, and an optimization of an energy split between the electrical energy and the jet fuel; and
    causing an indication of the amount of electrical energy to be displayed in a graphical user interface and/or to be otherwise outputted.

11. The method of claim 10, wherein the indication of the amount of electrical energy comprises battery sizing information.

12. The method of claim 10 further comprising determining a ratio of fuel to electric energy storage based on characteristics of the hybrid-electric aircraft and economic factors including fuel cost, electricity cost, and carbon taxes.

13. The method of claim 10 further comprising determining, based on fleet-wide usage data of a conventional aircraft, to determine a value that an introduction of a hybrid-electric propulsion system would bring to an entire fleet of the conventional aircraft.

14. The method of claim 13 wherein the value includes an estimation of economic benefit based on user-specified economic conditions.

15. The method of claim 13 wherein the value includes fleet average energy costs.

16. The method of claim 13 wherein the value includes fleet average emissions reduction.

17. The method of claim 10 further comprising determining and displaying a delta energy cost per flight resulting from use of the hybrid-electric aircraft over a comparable conventional aircraft for the flight.

18. The method of claim 10 further comprising determining and displaying a delta emissions delta per flight resulting from use of the hybrid-electric aircraft over a comparable conventional aircraft for the flight.

19. The method of claim 10 wherein determining the amount of electrical energy and the amount of jet fuel necessary for the hybrid electric aircraft to complete the flight is based on estimates of future values for economic factors including future cost of fuel.

20. The method of claim 10 wherein determining the amount of electrical energy and the amount of jet fuel necessary for the hybrid electric aircraft to complete the flight is based on estimates of future values for technology including future weight of battery per unit of applied electrical energy.

21. A system comprising:
    an optimized battery works module configured to determine an amount of electrical energy and an amount of jet fuel necessary for a hybrid electric aircraft to complete a flight based on a range of the flight, a payload of the hybrid electric aircraft, an indication of a battery mass limitation of the hybrid electric aircraft, and an optimization of an energy split between the electrical energy and the jet fuel; and
    a graphical user interface comprising the amount of electrical energy to be displayed.

* * * * *